United States Patent
Agiwal et al.

(10) Patent No.: US 12,041,682 B2
(45) Date of Patent: Jul. 16, 2024

(54) METHOD AND APPARATUS FOR TRANSMITTING AND RECEIVING PAGING AND DEDICATED SYSTEM INFORMATION IN A WIRELESS COMMUNICATION SYSTEM

(71) Applicant: Samsung Electronics Co., Ltd., Suwon-si (KR)

(72) Inventors: Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 17/802,021

(22) PCT Filed: May 20, 2021

(86) PCT No.: PCT/KR2021/006273
§ 371 (c)(1),
(2) Date: Aug. 24, 2022

(87) PCT Pub. No.: WO2021/235860
PCT Pub. Date: Nov. 25, 2021

(65) Prior Publication Data
US 2023/0144750 A1    May 11, 2023

Related U.S. Application Data

(60) Provisional application No. 63/027,422, filed on May 20, 2020, provisional application No. 63/094,553, filed on Oct. 21, 2020.

(51) Int. Cl.
*H04W 72/04* (2023.01)
*H04W 48/14* (2009.01)
*H04W 76/27* (2018.01)

(52) U.S. Cl.
CPC .......... *H04W 76/27* (2018.02); *H04W 48/14* (2013.01)

(58) Field of Classification Search
None
See application file for complete search history.

(56) References Cited

U.S. PATENT DOCUMENTS 10,231,208 B2    3/2019   Agiwal et al.
11,212,784 B2 *  12/2021  Ishii ............... H04W 72/21
(Continued)

FOREIGN PATENT DOCUMENTS

IN    201641021194 A    12/2017

OTHER PUBLICATIONS

Extended European Search Report dated Jul. 18, 2023, issued in a European Patent Application No. 21808906.8.
(Continued)

*Primary Examiner* — Gary Lafontant
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides methods and apparatuses for monitoring paging and acquiring dedicated system information in a wireless communication system.

10 Claims, 20 Drawing Sheets

(56) References Cited

U.S. PATENT DOCUMENTS

2019/0045379 A1   2/2019   Ishii
2019/0045419 A1   2/2019   Shrestha et al.
2019/0306784 A1   10/2019  Chen et al.
2020/0100315 A1   3/2020   Jia et al.

OTHER PUBLICATIONS

Ericsson, 'Introduction of on-demand SI procedure in RRC_Connected', R2-2002396, 3GPP TSGRAN WG2 Meeting #109-e, Electronic Meeting, Mar. 12, 2020.
Ericsson, 'Introduction of on-demand SIB', R2-2003836, 3GPP TSG-RAN WG2 Meeting #109bis-e, Electronic Meeting, May 1, 2020.

* cited by examiner

METHOD AND APPARATUS FOR TRANSMITTING AND RECEIVING PAGING AND DEDICATED SYSTEM INFORMATION IN A WIRELESS COMMUNICATION SYSTEM

TECHNICAL FIELD

The disclosure relates to a wireless communication system. Specifically, the disclosure relates to an apparatus, a method and a system for paging monitoring and acquiring dedicated system information in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

Solution to Problem

In accordance with an aspect of the disclosure, a method by a terminal in a wireless communication system is provided. The method includes receiving, from a base station, a first radio resource control (RRC) reconfiguration message including a configuration for an on-demand system information block (SIB) request; transmitting, to the base station, a first dedicated SIB request message based on the configuration in an RRC connected state; starting a timer based on the first dedicated SIB request message; receiving, from the base station, a second RRC reconfiguration message including information on a reconfiguration with synchronization for a master cell group associated with the base station; stopping the timer based on the second RRC reconfiguration message; and transmitting, to a target base station of the master cell group, a second dedicated SIB request message based on the second RRC reconfiguration message.

In the method, a value of the timer is set to a value of prohibit timer information included in the configuration.

In the method, the second dedicated SIB request message is transmitted upon completion of a random access procedure with the target base station.

Further, the method includes receiving, from the target base station, at least one required SIB based on the second dedicated SIB request message.

Further, the method includes starting the timer based on the second dedicated SIB request message.

In accordance with an aspect of the disclosure, a method performed by a base station is provided. The method includes: transmitting, to a terminal, a first radio resource control (RRC) reconfiguration message including a configuration for an on-demand system information block (SIB) request; receiving, from the terminal, a first dedicated SIB request message based on the configuration in an RRC connected state; and transmitting, to the terminal, a second RRC reconfiguration message including information on a reconfiguration with synchronization for a master cell group associated with the first base station, wherein a timer is started based on the first RRC reconfiguration message and stopped based on the second RRC reconfiguration message, and wherein a second dedicated SIB request message is transmitted to a target base station of the master cell group based on the second RRC reconfiguration message.

In accordance with an aspect of the disclosure, a terminal in a wireless communication system is provided. The terminal includes: a transceiver configured to transmit and receive a signal; and a controller coupled with the transceiver and configured to: receive, from a base station, a first radio resource control (RRC) reconfiguration message including a configuration for an on-demand system information block (SIB) request, transmit, to the base station, a first dedicated SIB request message based on the configuration in an RRC connected state, start a timer based on the first dedicated SIB request, receive, from the base station, a second RRC reconfiguration message including information on a reconfiguration with synchronization for a master cell group associated with the base station, stop the timer based on the second RRC reconfiguration message, and transmit, to a target base station of the master cell group, a second dedicated SIB request message based on the second RRC reconfiguration message.

In accordance with an aspect of the disclosure, a base station in a wireless communication system is provided. The base station includes: a transceiver configured to transmit and receive a signal; and a controller coupled with the transceiver and configured to: transmit, to a terminal, a first radio resource control (RRC) reconfiguration message including a configuration for an on-demand system information block (SIB) request, receive, from the terminal, a first dedicated SIB request message based on the configuration in an RRC connected state, and transmit, to the terminal, a second RRC reconfiguration message including information on a reconfiguration with synchronization for a master cell group associated with the first base station, wherein a timer is started based on the first RRC reconfiguration message and stopped based on the second RRC reconfiguration message, and wherein a second dedicated SIB request message is transmitted to a target base station of the master cell group based on the second RRC reconfiguration message.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR THE INVENTION

Figure 1:
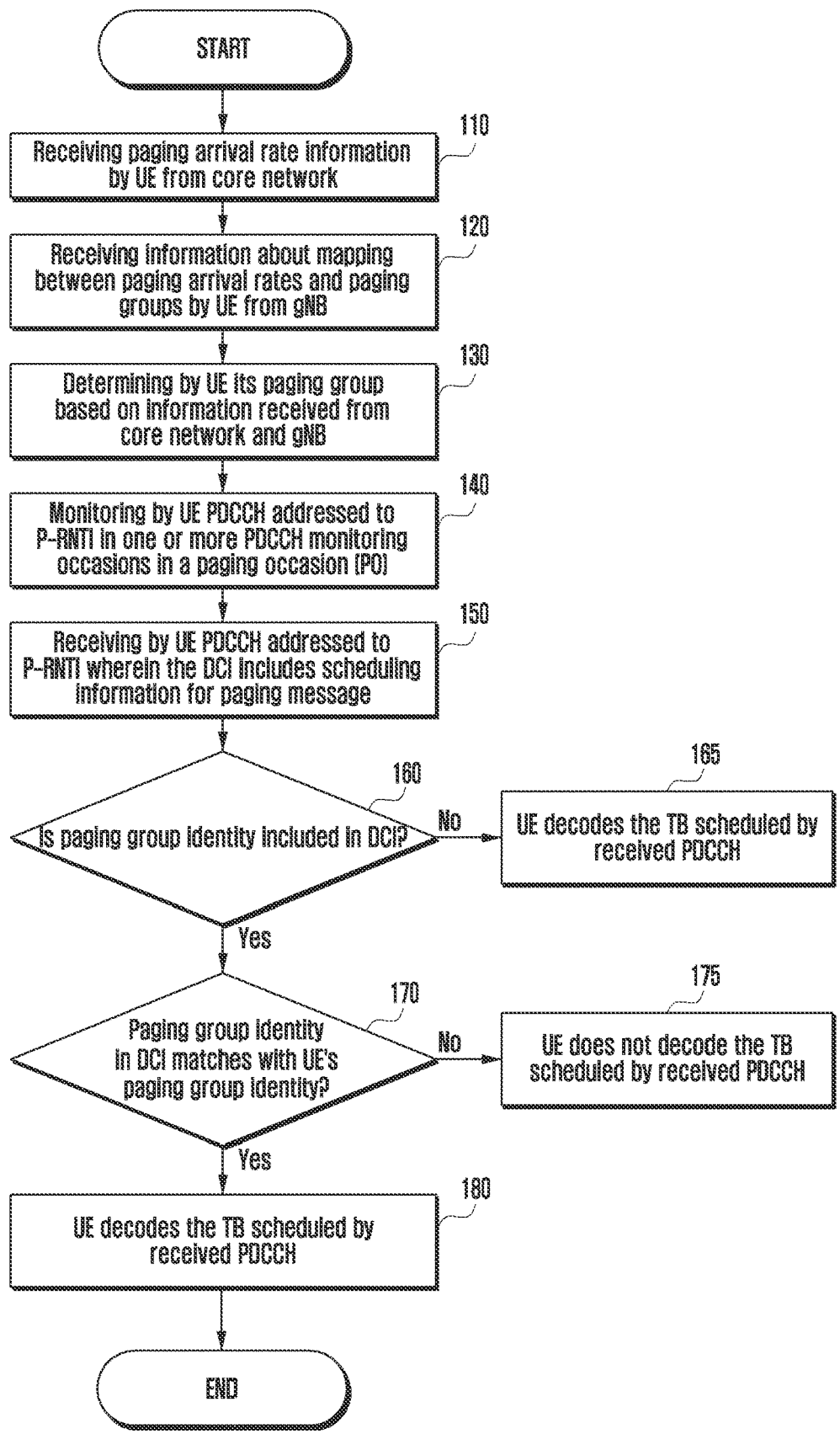
FIG. 1 illustrates an example flow of UE operation on paging grouping based on paging arrival rate indicated by a network in accordance with a method of this disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB (next generation node B).

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLLC), etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLLC requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, UE and gNB communicates with each other using beamforming. Beamforming techniques are used to mitigate the propagation path losses and to increase the propagation distance for communication at higher frequency band. Beamforming enhances the transmission and reception performance using a high-gain antenna. Beamforming can be classified into transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of RX beam patterns of different directions. Each of these receive patterns can be also referred as RX beam.

The fifth generation wireless communication system, supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in radio resource connected state (RRC_CONNECTED) is configured to utilize radio resources provided by two distinct schedulers, located in two different nodes connected via a non-ideal backhaul and providing either Evolved Universal Mobile Telecommunications System (UMTS) Terrestrial Radio Access (E-UTRA) (i.e. if the node is an ng-eNB) or New Radio (NR) access (i.e. if the node is a gNB). In NR for a UE in RRC_CONNECTED not configured with carrier aggregation/dual connectivity (CA)/DC, there is only one serving cell comprising of the primary cell (PCell). For a UE in RRC_CONNECTED configured with CA/DC the term 'serving cells' is used to denote the set of cells comprising of the Special Cell (SpCell)(s) and all secondary cells (SCells). In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the primary SCG cell (PSCell) and optionally one or more SCells. In NR PCell refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. PSCell refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In the fifth generation wireless communication system, node B (gNB) or base station in cell broadcast Synchronization Signal and physical broadcast channel (PBCH) block (SS/PBCH block or SSB) consists of primary and secondary synchronization signals (PSS, SSS) and system information. System information includes common parameters needed to communicate in cell. In the fifth generation wireless communication system (also referred as next generation radio or NR), System Information (SI) is divided into the MIB and a number of SIBs where:

the MIB is always transmitted on the PBCH with a periodicity of 80 ms and repetitions made within 80 ms and it includes parameters that are needed to acquire SIB1 from the cell.

the SIB1 is transmitted on the DL-SCH with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;

SIBs other than SIB1 are carried in SystemInformation (SI) messages, which are transmitted on the DL-SCH. Only SIBs having the same periodicity can be mapped to the same SI message.

In the fifth generation wireless communication system, Physical Downlink Control Channel (PDCCH) is used to schedule downlink (DL) transmissions on physical downlink shared channel (PDSCH) and uplink (UL) transmissions on physical uplink shared channel (PUSCH), where the Downlink Control Information (DCI) on PDCCH includes: Downlink assignments containing at least modulation and coding format, resource allocation, and hybrid-automatic repeat request (ARQ) (HARQ) information related to downlink shared channel (DL-SCH); Uplink scheduling grants containing at least modulation and coding format, resource allocation, and HARQ information related to uplink shared channel (UL-SCH). In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource block(s) (PRB(s)) and orthogonal frequency division multiplexing (OFDM) symbol(s) where the UE may assume no transmission is intended for the UE; Transmission of transmission power control (TPC) commands for physical uplink control channel (PUCCH) and PUSCH; Transmission of one or more TPC commands for sounding reference signal (SRS) transmissions by one or more UEs; Switching a UE's active bandwidth part; Initiating a random access procedure. A UE monitors a set of PDCCH candidates in the configured monitoring occasions in one or more configured control resource sets (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In fifth generation wireless communication system, a list of search space configurations are signaled by gNB for each configured BWP wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot}) \bmod (\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of CORESET configuration associated with it. A list of CORESET configurations are signaled by gNB for each configured BWP wherein each CORESET configuration is uniquely identified by an identifier. Note that each radio frame is of 10 ms duration. Radio frame is identified by a radio frame number or system frame number (SFN). Each radio frame comprises of several slots wherein the number of slots in a radio frame and duration of slots depends on sub carrier spacing. The number of slots in a radio frame and duration of slots depends radio frame for each supported subcarrier spacing (SCS) is pre-defined in NR. Each CORESET configuration is associated with a list of TCI (Transmission configuration indicator) states. One DL reference signal (RS) ID (either SSB or channel state information (CSI) RS (CSI-RS)) is configured per TCI state. The list of TCI states corresponding to a CORESET configuration is signaled by gNB via RRC signaling. One of the TCI state in TCI state list is activated and indicated to UE by gNB. TCI state indicates the DL TX beam (DL TX beam is quasi-co-located (QCLed) with SSB/CSI RS of TCI state) used by gNB for transmission of PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwpInactivityTimer, by RRC signaling, or by the medium access control (MAC) entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. Random access (RA) is used to achieve UL time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state. Several types of random access procedure is supported such as contention based random access, contention free random access and each of these can be one 2 step or 4 step random access.

Contention based random access (CBRA): This is also referred as 4 step CBRA. In this type of random access, UE first transmits Random Access preamble (RAP or also referred as Msg1) and then waits for Random access response (RAR) in the RAR window. RAR is also referred as Msg2. gNB transmits the RAR on PDSCH. PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=1+s_id+14*t_id+14*80*f_id+14*80*8*ul_carrier_id, where s_id is the index of the first OFDM symbol of the PRACH occasion where UE has transmitted Msg1, i.e. RA preamble; $0 \leq s\_id \leq 14$; t_id is the index of the first slot of the PRACH occasion ($0 \leq t\_id < 80$); f_id is the index of the PRACH occasion within the slot in the frequency domain ($0 \leq f\_id < 8$), and ul_carrier_id is the UL carrier used for Msg1 transmission (0 for normal UL (NUL) carrier and 1 for supplementary UL (SUL) carrier. Several RARs for various Random access preambles detected by gNB can be multiplexed in the same RAR MAC protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e. select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a PDCCH addressed to C-RNTI included in Msg3, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step i.e. select random access resource (preamble/RACH occasion) and transmits the RA preamble.

Contention free random access (CFRA): This is also referred as legacy CFRA or 4 step CFRA. CFRA procedure is used for scenarios such as handover where low latency is required, timing advance establishment for Scell, etc. eNB assigns to UE dedicated Random access preamble. UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RA preamble identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

2 step contention based random access (2 step CBRA): In the first step, UE transmits random access preamble on PRACH and a payload (i.e. MAC PDU) on PUSCH. The random access preamble and payload transmission is also referred as MsgA. In the second step, after MsgA transmission, the UE monitors for a response from the network (i.e. gNB) within a configured window. The response is also referred as MsgB. If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e. upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedure i.e. UE only transmits the PRACH preamble.

MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include UE ID (e.g. random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g. in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e. dedicated preamble/PUSCH resource/RO). In the second step, after MsgA transmission, the UE monitors for a response from the network (i.e. gNB) within a configured window. If UE receives PDCCH addressed to C-RNTI, random access procedure is considered successfully completed. If UE receives fallback information corresponding to its transmitted preamble, random access procedure is considered successfully completed.

In the $5^{th}$ generation (also referred as NR or New Radio) wireless communication system UE can be in one of the following RRC state: RRC_IDLE, RRC_INACTIVE and RRC_CONNECTED. The RRC states can further be characterized as follows:

In RRC_IDLE state, a UE specific DRX may be configured by upper layers (i.e. NAS). The UE, monitors Short Messages transmitted with paging-radio network temporary identifier (P-RNTI) over DCI; Monitors a Paging channel for CN paging using 5G-S-TMSI; Performs neighboring cell measurements and cell (re-)selection; Acquires system information and can send SI request (if configured).

In RRC_INACTIVE state, a UE specific DRX may be configured by upper layers or by RRC layer; in this state, UE stores the UE Inactive AS context. A RAN-based notification area is configured by RRC layer. The UE monitors Short Messages transmitted with P-RNTI over DCI; Monitors a Paging channel for CN paging using 5G-S-TMSI and RAN paging using full inactive-radio network temporary identifier (I-RNTI); Performs neighboring cell measurements and cell (re-)selection; Performs RAN-based notification area updates periodically and when moving outside the configured RAN-based notification area; Acquires system information and can send SI request (if configured).

In the RRC_CONNECTED, the UE stores the AS context. Unicast data is transmitted/received to/from UE. At lower layers, the UE may be configured with a UE specific DRX. The UE, monitors Short Messages transmitted with P-RNTI over DCI, if configured; Monitors control channels associated with the shared data channel to determine if data is scheduled for it; Provides channel quality and feedback information; Performs neighboring cell measurements and measurement reporting; Acquires system information.

The 5G or Next Generation Radio Access Network (NG-RAN) based on NR consists of NG-RAN nodes where NG-RAN node is a gNB, providing NR user plane and control plane protocol terminations towards the UE. The gNBs are also connected by means of the NG interfaces to the 5GC, more specifically to the AMF (Access and Mobility Management Function) by means of the NG-C interface and to the UPF (User Plane Function) by means of the NG-U interface. In the 5$^{th}$ generation (also referred as NR or New Radio) wireless communication system, the UE may use Discontinuous Reception (DRX) in RRC_IDLE and RRC_INACTIVE state in order to reduce power consumption. In the RRC_IDLE/RRC_INACTIVE state UE wake ups at regular intervals (i.e. every DRX cycle) for short periods to receive paging, to receive SI update notification and to receive emergency notifications. Paging message is transmitted using physical downlink shared channel (PDSCH). Physical downlink common control channel (PDCCH) is addressed to P-RNTI if there is a paging message in PDSCH. P-RNTI is common for all UEs. UE identity (i.e. S-TMSI for RRC_IDLE UE or I-RNTI for RRC_INACTIVE UE) is included in paging message to indicate paging for a specific UE. Paging message may include multiple UE identities to page multiple UEs. Paging message is broadcasted (i.e. PDCCH is masked with P-RNTI) over data channel (i.e. PDSCH). SI update and emergency notifications are included in DCI and PDCCH carrying this DCI is addressed to P-RNTI. In the RRC idle/inactive mode UE monitors one paging occasion (PO) every DRX cycle. In the RRC idle/inactive mode UE monitors PO in initial DL BWP. In RRC connected state UE monitors one or more POs to receive SI update notification and to receive emergency notifications. UE can monitor any PO in paging DRX cycle and monitors at least one PO in SI modification period. In the RRC idle/inactive mode UE monitors PO in its active DL BWP. A PO is a set of 'S' PDCCH monitoring occasions for paging, where 'S' is the number of transmitted SSBs (i.e. the Synchronization Signal and PBCH block (SSB) consists of primary and secondary synchronization signals (PSS, SSS) and PBCH) in cell. UE first determines the paging frame (PF) and then determines the PO with respect to the determined PF. One PF is a radio frame (10 ms).

The PF for a UE is the radio frame with system frame number 'SFN' which satisfies the equation (SFN+PF_offset) mod T=(T div N)*(UE_ID mod N).

Index (is), indicating the index of the PO is determined by i_s=floor(UE_ID/N) mod Ns.

T is DRX cycle of the UE.

In RRC_INACTIVE state, T is determined by the shortest of the UE specific DRX value configured by RRC, UE specific DRX value configured by NAS, and a default DRX value broadcast in system information.

In RRC_IDLE state, T is determined by the shortest of UE specific DRX value configured by NAS, and a default DRX value broadcast in system information. If UE specific DRX is not configured by upper layers (i.e. NAS), the default value is applied.

N: number of total paging frames in T

Ns: number of paging occasions for a PF

PF_offset: offset used for PF determination

UE_ID: 5G-S-TMSI mod 1024

Parameters Ns, nAndPagingFrameOffset, and the length of default DRX Cycle are signaled in SIB1. The values of N and PF_offset are derived from the parameter nAndPagingFrameOffset. If the UE has no 5G-S-TMSI, for instance when the UE has not yet registered onto the network, the UE shall use as default identity UE_ID=0 in the PF and i_s formulas above.

The PDCCH monitoring occasions for paging are determined based on paging search space configuration (pagingSearchSpace indicates search space identifier of search space configuration to be used for monitoring PDCCH addressed to P-RNTI in PO) signaled by gNB.

When SearchSpaceId=0 is configured for pagingSearchSpace, the PDCCH monitoring occasions for paging are same as for RMSI (i.e. SIB1). When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF. A radio frame consists of two half frames where the duration of each half frame is 5 ms.

When SearchSpaceId other than 0 is configured for pagingSearchSpace, the UE monitors the (i_s+1)th PO. The PDCCH monitoring occasions for paging are determined based on paging search space configuration (pagingSearchSpace) signaled by gNB. The PDCCH monitoring occasions for paging which are not overlapping with UL symbols (where UL symbols are determined according to tdd-UL-DL-Configuration-Common signaled by gNB in system information) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the (i_s+1)th PO is a set of 'S*X' consecutive PDCCH monitoring occasions for paging starting from the PDCCH monitoring occasion number indicated by firstPDCCH-MonitoringOccasionOfPO (i.e. the (i_s+1)th value of the firstPDCCH-MonitoringOccasionOfPO parameter). Otherwise, the (i_s+1)th PO is a set of 'S' consecutive PDCCH monitoring occasions for paging starting from the (i_s*S*X)th PDCCH monitoring occasion for paging. 'S' is the number of actual transmitted SSBs determined according to parameter ssb-PositionsInBurst signalled in SystemInformationBlock1 received from gNB. The parameter firstPDCCH-MonitoringOccasionOfPO is signalled in SIB1 for paging in initial DL BWP. 'X' is the number of PDCCH monitoring occasions per SSB. If X is not signaled, the value of X is assumed to be 1. For paging in a DL BWP other than the initial DL BWP, the parameter first-PDCCH-MonitoringOccasionOfPO is signaled in the corresponding BWP configuration.

The PDCCH addressed to P-RNTI carries information according to DCI format 1_0. The following information is transmitted by means of the DCI format 1_0 with CRC scrambled by P-RNTI:

Short Messages Indicator—2 bits according to Table 1.
Short Messages—8 bits according to Table 2. If only the scheduling information for Paging is carried, this bit field is reserved.
Frequency domain resource assignment—$\lceil \log_2(N_{RB}^{DL,BWP}(N_{RB}^{DL,BWP}+1)/2) \rceil$ bits. If only the short message is carried, this bit field is reserved.
$N_{RB}^{DL,BWP}$ is the size of CORESET 0
Time domain resource assignment—4 bits. If only the short message is carried, this bit field is reserved.
VRB-to-PRB mapping—1 bit. If only the short message is carried, this bit field is reserved.
Modulation and coding scheme—5 bits. If only the short message is carried, this bit field is reserved.
TB scaling—2 bits. If only the short message is carried, this bit field is reserved.
Reserved bits—6 bits Short Message indicator for a corresponding bit field value is shown in a Table 1.

TABLE 1

| Bit field | Short Message indicator |
| --- | --- |
| 00 | Reserved |
| 01 | Only scheduling information for Paging is present in the DCI |
| 10 | Only short message is present in the DCI |
| 11 | Both scheduling information for Paging and short message are present in the DCI |

Table 2 defines Short Message. Bit 1 is the most significant bit.

TABLE 2

| Bit | Short Message |
| --- | --- |
| 1 | systemInfoModification |
| | If set to 1: indication of a BCCH modification other than SIB6, SIB7 and SIB8. |
| 2 | etwsAndCmasIndication |
| | If set to 1: indication of an ETWS primary notification and/or an ETWS secondary notification and/or a CMAS notification. |
| 3-8 | Reserved |

A PO can be monitored by several UEs. As a result, if there is paging message for a UE, several UEs will receive the PDCCH addressed to P-RNTI in the PO and they will receive and decode PDSCH. This increases the UE's power consumption as UE has to wake up for receiving and decoding PDSCH even when there is no paging message for UE. UE also has to wake up earlier to acquire several SSB bursts to decode PDSCH for paging message. Note that UE can identify whether the paging is there for it or not by checking its UE ID in the paging message received in PDSCH.

In the present disclosure, to solve this problem, methods and apparatuses for implementing a paging operation in a group/sub-group unit are proposed.

In various embodiments of this disclosure, UEs are grouped into 'P' paging groups (or paging sub-groups). The parameter 'P' can be pre-defined. The parameter 'P' can be signaled by network (e.g. gNB can signal this in paging configuration or in the BWP configuration in system information or in RRC signaling message (e.g. RRC Release message, RRCReconfiguration message); AMF can signal this parameter in NAS message). The parameter 'P' can also be implicitly known from size of paging group/sub-group information list.

gNB indicates paging group/subgroup in DCI/short message of PDCCH addressed to P-RNTI.

UE determines its PF and PO as explained earlier. UE monitors the determined PO i.e. UE monitors PDCCH addressed to P-RNTI in PDCCH monitoring occasion(s) of determined PO.

Upon receiving PDCCH addressed to P-RNTI scheduling paging message, if DCI/short message in the received PDCCH includes its paging group/sub-group, UE receives and decodes the TB for paging message in the scheduled PDSCH resources for paging message, where scheduled resources for paging message are indicated by DCI. Otherwise UE does not receive and decode the TB for paging message in the scheduled PDSCH resources for paging message. In an embodiment, if the received DCI in PDCCH addressed to P-RNTI includes scheduling information for paging, UE checks if the DCI includes its paging group/sub-group. If the DCI includes its paging group/sub-group, UE receives and decodes the TB according to scheduling information. Otherwise not.

Method 1 (Grouping/Sub Grouping Based on Paging Arrival Rate, where Paging Arrival Rate is Indicated by CN (e.g. AMF) and Mapping Between Paging Arrival Rates and Paging Groups/Sub Groups is Indicated by gnB):

FIG. 1 illustrates an example flow of UE operation on paging grouping/sub grouping based on paging arrival rate indicated by a network in accordance with a method of this disclosure. The embodiment of the flow illustrated in FIG. 1 is for illustration only. FIG. 1 does not limit the scope of this disclosure to any particular implementation of an electronic device.

UEs are grouped into 'P' paging groups/sub groups. The parameter 'P' can be pre-defined. The parameter 'P' can be signaled by network (e.g. gNB can signal this in paging configuration or in the BWP configuration received in system information or RRC signaling message (e.g. RRC Release message, RRCReconfiguration message); AMF can signal this parameter in NAS message) or can be implicitly known.

The grouping is done based on paging arrival rate (also referred as paging rate i.e. number of pages per unit time/per interval). UE's paging arrival rate is informed to UE by core network (i.e. AMF using NAS message) (110). The core network can determine UE's paging arrival rate based on past history of UE's paging, based on traffic characteristic, based on assistance information from UE, etc.

Mapping between paging groups/sub groups and paging arrival rates is informed to UE by gNB (e.g. in system information or in RRC signaling message or in paging configuration) (120). The mapping between paging groups/sub groups and paging arrival rates can be BWP specific (separately signaled for each BWP supporting paging) or cell specific (i.e. common for all BWPs of cell). There can be one to one mapping between paging group/sub group and paging arrival rate. Alternately, one paging group/sub group can be associated with multiple paging arrival rates. Alternately, one paging group can be associated with a range of paging arrival rates. The mapping information can be signaled as a list wherein A) each entry in the list consists of [paging group/sub group identity, paging arrival rate]
B) each entry in the list consists of [paging group/sub group identity, one or more paging arrival rates]
C) each entry in the list consists of [paging group/sub group identity, paging arrival rate min, paging arrival rate max]. paging group/sub group identity of UE whose paging arrival rate is between paging arrival rate min and paging arrival rate max.
D) each entry in the list consists of [paging arrival rate]. The ith entry in the list corresponds to paging group/sub group identity 'i'. or The ith entry in the list corresponds to paging group/sub group identity 'i+1'. The entries in list are sequentially numbered starting from zero or starting from one.
E) each entry in the list consists of [one or more paging arrival rates]. The ith entry in the list corresponds to paging group/sub group identity 'i'. or The ith entry in the list corresponds to paging group/sub group identity 'i+1'.
F) each entry in the list consists of [paging arrival rate min, paging arrival rate max]. paging group/sub group identity of UE whose paging arrival rate is between paging arrival rate min and paging arrival rate max. The ith entry in the list corresponds to paging group/sub group identity 'i'. or The ith entry in the list corresponds to paging group/sub group identity 'i+1'.

UE determines its paging group/sub group based on information received from core network and gNB (130).

UE determines its PF and PO as explained earlier and monitors the determined PO (i.e. one or more PDCCH monitoring occasions of PO) (140).

In case of CN paging, CN (i.e. AMF) sends paging arrival rate of UE to gNB along with the paging message. gNB identifies the paging group/sub group of UE based on mapping between paging groups and paging arrival rate.

In case of RAN paging, the AMF provides to the NG-RAN node (i.e. gNB) the Core Network Assistance Information for the UE. The Core Network Assistance Information includes the registration area configured for the UE, the Periodic Registration Update timer, and the UE Identity Index value, etc. Core Network Assistance Information includes UE's paging arrival rate. This is used by gNB to identify paging group of UE for RAN paging. gNB identifies the paging group/sub group of UE based on mapping between paging groups/sub groups and paging arrival rate. Alternately, UE can inform (e.g. in UE assistance information message) its paging group/sub group to RAN before RRC connection is released.

gNB indicates paging group(s)/sub group(s) in short message or in DCI of PDCCH addressed to P-RNTI transmitted in PO (150). The paging group(s)/sub group(s) corresponds to the UE(s) which are paged. The paging group(s)/sub group(s) can be indicated in one of the following ways:

Option 1: Only one paging group/sub group ID is indicated (UE operation is illustrated in FIG. 1)

1-1: Paging group/sub group ID can be an optional field in DCI or short message.

UE monitors for PDCCH addressed to pre-defined P-RNTI in its PO (140).

(Alternate) UE monitors j+1th P-RNTI, where j=(UE_ID/N*Ns) mod R. For example, if R=2, if j equals zero, UE monitors PDCCH addressed to $1^{st}$ P-RNTI, if j equals 1, UE monitors $2^{nd}$ P-RNTI amongst the list of R P-RNTIs. The list of R P-RNTIs can be pre-defined or configured by gNB. The configuration can be using system information or RRC signaling.

(Alternate) UE monitors j+1th P-RNTI, where j=(UE_ID/N) mod R. For example, if R=2, if j equals zero, UE monitors PDCCH addressed to $1^{st}$ P-RNTI, if j equals 1, UE monitors $2^{nd}$ P-RNTI amongst the list of R P-RNTIs. The list of R P-RNTIs can be pre-defined or configured by gNB. The configuration can be using system information or RRC signaling.

(Alternate) UE monitors j+1th P-RNTI, where j=(UE_ID) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

UE receives PDCCH addressed to P-RNTI (150). DCI includes scheduling information for paging message. After receiving the PDCCH addressed to P-RNTI, UE identifies whether a Paging group/sub group ID is included in the DCI (160).

If Paging group/sub group ID is absent, UE receives and decodes the TB in the PDSCH resources according to the scheduling information for paging message (165) in the received DCI.

If Paging group/sub group ID is present, UE identifies whether the Paging group/sub group ID in the DCI matches with UE's paging/sub group ID (170). If UE belongs to the indicated paging group/sub group (i.e. paging group/sub group ID in DCI matches with UE's paging group/sub group ID), UE decodes the TB according to the scheduling information for paging message (180).

If Paging group/sub group ID is present and UE does not belong to the indicated paging group/sub group (i.e. paging group/sub group ID in DCI does not match with UE's paging group ID), UE does not receive and decode the TB (175) in the PDSCH resources according to the scheduling information for paging message in the received DCI.

In an embodiment, one paging group/sub group ID can be reserved to indicate paging for all paging groups/sub groups. If Paging group/sub group ID in PDCCH belongs to UE's paging group/sub group or if Paging group/sub group ID in PDCCH is the reserved paging group/sub group ID, UE receives and decodes the TB according to the scheduling information for paging message in the received DCI. Otherwise, UE does not receive and decode the TB.

Figure 2:
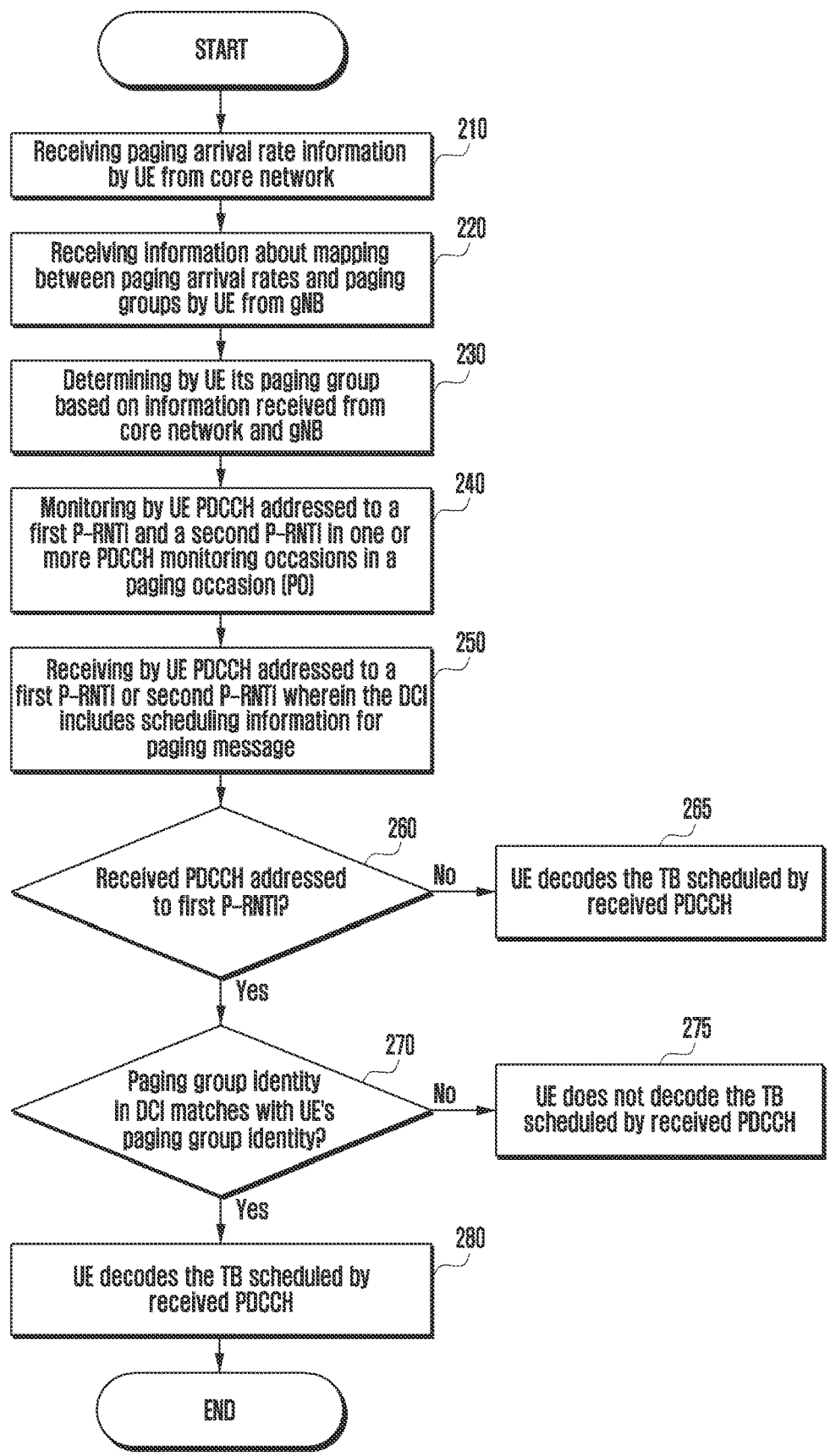
FIG. 2 illustrates an example flow of UE operation on paging grouping using multiple P-RNTIs based on paging arrival rate indicated by a network in accordance with a method of this disclosure.

1-2: Alternatively, Multiple P-RNTIs can be Used (UE Operation is Illustrated in FIG. 2):

FIG. 2 illustrates an example flow of UE operation on paging grouping using multiple P-RNTIs based on paging arrival rate indicated by a network in accordance with a method of this disclosure (The redundant description with Option 1-1 (reference numeral 210, 220, 230) is omitted). The embodiment of the flow illustrated in FIG. 2 is for illustration only. FIG. 2 does not limit the scope of this disclosure to any particular implementation of an electronic device.

UE monitors for PDCCH addressed to P-RNTI 1 (first P-RNTI) and legacy P-RNTI (second P-RNTI) in its PO (240). In an embodiment, if camped cell supports paging group(s)/sub groups and UE supports paging groups/sub groups, UE monitors PDCCH addressed to P-RNTI 1. Otherwise UE monitors PDCCH addressed to legacy P-RNTI.

UE receives PDCCH addressed to P-RNTI 1 or legacy P-RNTI (250).

Paging group/sub group ID is included in DCI/short message of PDCCH addressed to P-RNTI1.

Paging group/sub group ID is not included in DCI/short message of PDCCH addressed to legacy P-RNTI.

If UE receives PDCCH addressed to P-RNTI 1 (260), UE identifies whether the Paging group/sub group ID in the DCI/short message matches with UE's paging group/sub group ID (270). If UE belongs to indicated paging group/sub group (i.e. paging group/sub group ID in DCI matches with UE's paging group/sub group ID) in DCI/short message of PDCCH addressed to P-RNTI1, UE receives and decodes the TB according to the scheduling information for paging message (280) in the received DCI. If UE does not belong to the indicated paging group/sub group (i.e. paging group/sub group ID in DCI does not match with UE's paging group/sub group ID), UE does not receive and decode the TB (275).

In an embodiment, one paging group/sub group ID can be reserved to indicate paging for all paging groups/sub groups. If Paging group/sub group ID in PDCCH belongs to UE's paging group/sub group or is the reserved paging group/sub group ID, UE receives and decodes the TB according to the scheduling information for paging message in the received DCI. Otherwise, UE does not receive and decode the TB.

If UE receives PDCCH addressed to legacy P-RNTI, UE receives and decodes the paging message (265) according to the scheduling information for paging message in the received DCI.

Option 2: List of paging group/sub group IDs is indicated
2-1: List of Paging group/sub group IDs is optional in DCI or short message.

UE monitors for PDCCH addressed to pre-defined P-RNTI in its PO.

(Alternate) UE monitors j+1th P-RNTI, where j=(UE_ID/N*Ns) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

(Alternate) UE monitors j+1th P-RNTI, where j=(UE_ID/N) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

(Alternate) UE monitors j+1th P-RNTI, where j=(UE_ID) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

UE receives PDCCH addressed to P-RNTI. DCI includes scheduling information for paging message.

If the List of Paging group/sub group IDs is absent, UE receives and decodes the TB according to the scheduling information for paging message in the received DCI.

If the List of Paging group/sub group IDs is present and UE belongs to one of the indicated paging group/sub group in the list, UE receives and decodes the TB according to the scheduling information for paging message in the received DCI. If the List of Paging group/sub group IDs is present and UE does not belong to one of the indicated paging group/sub group in the list, UE does not receive and decode the TB.

In an embodiment, one paging group/sub group ID can be reserved to indicate paging for all paging groups/sub groups. If UE belongs to one of the indicated paging group/sub group in the list or the list includes reserved paging group/sub group ID, UE decodes the TB according to the scheduling information for paging message in the received DCI. Otherwise, UE does not receive and decode the TB according to the scheduling information for paging message.

2-2: Multiple P-RNTIs can be used:

UE monitors for PDCCH addressed to P-RNTI 1 and legacy P-RNTI in its PO. In an embodiment, if camped cell supports paging group(s)/sub group(s) and UE supports paging groups/sub groups, UE monitors PDCCH addressed to P-RNTI 1. Otherwise UE monitors PDCCH addressed to legacy P-RNTI.

List of paging group/sub group IDs is included in DCI/short message of PDCCH addressed to P-RNTI1.

List of paging group/sub group IDs is not included in DCI/short message of PDCCH addressed to legacy P-RNTI.

If UE receives PDCCH addressed to P-RNTI 1 and if UE belongs to one of the indicated paging group/sub group in DCI/short message of PDCCH addressed to P-RNTI1, UE receives and decodes the TB according to the scheduling information for paging message. If UE does not belong to one of the indicated paging group/sub group, UE does not receive and decode the TB.

In an embodiment, one paging group/sub group ID can be reserved to indicate paging for all paging groups/sub groups. If UE belongs to one of the indicated paging group/sub group in the list or the list includes reserved paging group/sub group ID, UE receives and decodes the TB according to the scheduling information for paging message in the received DCI. Otherwise, UE does not received and decode the TB according to the scheduling information for paging message in the received DCI.

If UE receives PDCCH addressed to legacy P-RNTI, UE receives and decodes the paging message according to the scheduling information for paging message in the received DCI.

Option 3: Paging group/sub group bitmap is included in DCI or short message 3-1: Paging group/sub group bitmap can be optional field:

Each bit in the bitmap corresponds to different paging group/sub group. The mapping between bits in bitmap and paging groups/sub groups can be pre-defined. For example, if there are P paging groups/subgroups, k=paging group/sub group ID mod P, kth most significant bit in bitmap corresponds to that paging group/sub group ID, where bits in bitmap are numbered sequentially from most significant bit to least significant bit. For example, if there are P paging groups/subgroups, k=paging group/sub group ID mod P, kth least significant bit in bitmap corresponds to that paging group/sub group ID, where bits in bitmap are numbered sequentially from least significant bit to most significant bit The size of bitmap can be pre-defined. The size of bitmap can also be determined based on number of paging groups/sub groups.

UE monitors for PDCCH addressed to pre-defined P-RNTI in its PO.

(Alternate) UE monitors j+1th P-RNTI, where j=(UE_ID/N*Ns) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

(Alternate) UE monitors j+1th P-RNTI, where j=(UE_ID/N) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

(Alternate) UE monitors j+1th P-RNTI, where j=(UE_ID) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

UE receives PDCCH addressed to P-RNTI. DCI includes scheduling information for paging message.

If Paging group/sub group bitmap is absent, UE receives and decodes the TB according to the scheduling information for paging message in the received DCI.

If Paging group/sub group bitmap is present and bit corresponding to UE's paging group/sub group is set (i.e. equals to 1) in bitmap, UE receives and decodes the TB according to the scheduling information for paging message in the received DCI. If Paging group/sub group bitmap is present and bit corresponding to UE's paging group/sub group is not set (i.e. equal to 0) in bitmap, UE does not receive and decode the TB according to the scheduling information for paging message in the received DCI.

In an embodiment, one bit in bitmap can be reserved to indicate paging for all paging groups/sub groups. If bit corresponding to UE's paging group/sub group or bit corresponding to paging for all paging groups/sub groups is set in bitmap, UE receives and decodes the TB according to the scheduling information for paging message in the received DCI. Otherwise, UE does not receive and decode the TB according to the scheduling information for paging message in the received DCI.

3-2: Multiple P-RNTIs can be used:

UE monitors for PDCCH addressed to P-RNTI 1 and legacy P-RNTI in its PO. In an embodiment, if camped cell supports paging group(s)/sub group (s) and UE supports paging groups/sub groups, UE monitors PDCCH addressed to P-RNTI 1. Otherwise UE monitors PDCCH addressed to legacy P-RNTI.

Paging group/sub group bitmap is included in DCI/short message of PDCCH addressed to P-RNTI1.

Paging group/sub group bitmap is not included in DCI/short message of PDCCH addressed to legacy P-RNTI.

If UE receives PDCCH addressed to P-RNTI 1 and bit corresponding to UE's paging group/sub group is set (i.e. equals to 1) in bitmap in DCI/short message of PDCCH addressed to P-RNTI1, UE receives and decodes the TB according to the scheduling information for paging message in the received DCI. If bit corresponding to UE's paging group is not set (i.e. equals to 0) in bitmap, UE does not receive and decode the TB according to the scheduling information for paging message in the received DCI In an embodiment, one bit in bitmap can be reserved to indicate paging for all paging groups/sub groups. If bit corresponding to UE's paging group/sub group or bit corresponding to paging for all paging groups/sub groups is set in bitmap, UE decodes the TB according to the scheduling information for paging message. Otherwise, UE does not receive and decode the TB according to the scheduling information for paging message in the received DCI.

If UE receives PDCCH addressed to legacy P-RNTI, UE receives and decodes the TB according to the scheduling information for paging message in the received DCI.

Alternately, instead of gNB indicating paging group(s)/sub group (s) in short message or in DCI of PDCCH addressed to P-RNTI transmitted in PO, different P-RNTI can be reserved for different paging group/sub group. gNB uses PDCCH addressed to P-RNTI specific to paging group/sub group to which the UE(s) being paged belongs. UE monitors PDCCH addressed to P-RNTI corresponding to its paging group/sub group.

In an embodiment, one paging group/sub group ID or P-RNTI can be reserved to indicate paging for all paging groups/sub groups. UE monitors PDCCH addressed to P-RNTI of its paging group/sub group and P-RNTI of common paging group/sub group.

In an embodiment, instead of paging arrival rate, paging probability (or paging probability threshold) can be used in operations(s) of method 1 explained above. In the description, paging arrival rate can be replaced by paging probability (or paging probability threshold).

Figure 3:
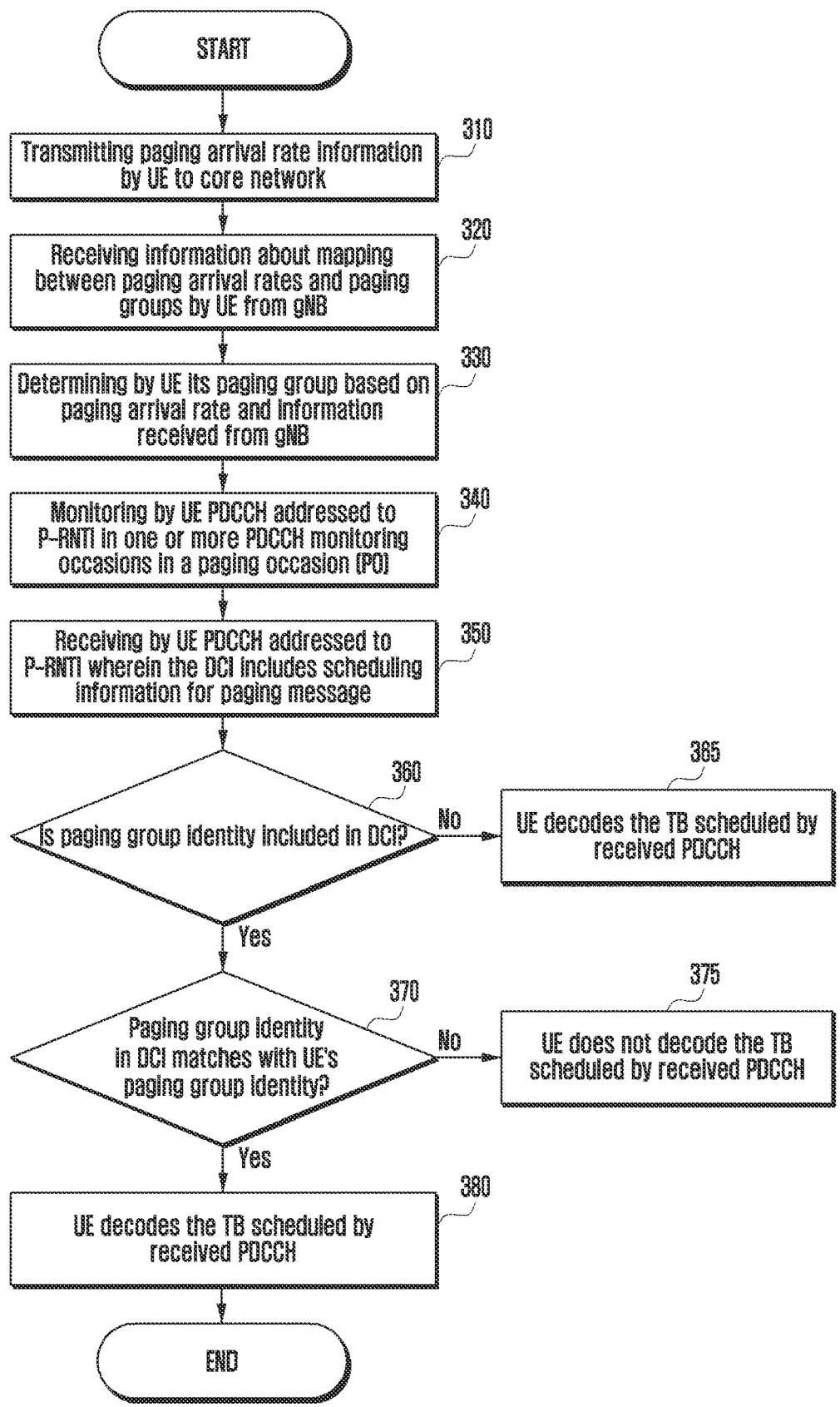
FIG. 3 illustrates an example flow of UE operation on paging grouping based on paging arrival rate indicated by a UE in accordance with a method of this disclosure.

Method 2 (Grouping Based on Paging Arrival Rate, where Paging Arrival Rate is Indicated by UE to CN and Mapping Between Paging Arrival Rates and Paging Groups/Sub Groups is Indicated by gNB):

FIG. 3 illustrates an example flow of UE operation on paging grouping/sub grouping based on paging arrival rate indicated by a UE in accordance with a method of this disclosure. The embodiment of the flow illustrated in FIG. 3 is for illustration only. FIG. 3 does not limit the scope of this disclosure to any particular implementation of an electronic device.

UEs are grouped into 'P' paging groups/sub groups. The parameter 'P' can be pre-defined. The parameter 'P' can be signaled by network (e.g. gNB can signal this in paging configuration or in the BWP configuration received in system information or RRC signaling message (e.g. in RRC Release message or in RRC Reconfiguration message)) or can be implicitly known.

The grouping is done based on paging arrival rate (also referred as paging rate i.e. number of pages per unit time/per interval). UE's paging arrival rate is informed to CN by UE (i.e. using NAS message) (310).

Mapping between paging groups/sub groups and paging arrival rates is informed to UE by gNB (e.g. in system information or in RRC signaling message or in paging configuration) (320). The mapping between paging groups/sub groups and paging arrival rates can be BWP specific (separately signaled for each BWP supporting paging) or cell specific (i.e. common for all BWPs of cell). There can be one to one mapping between paging group/sub group and paging arrival rate. Alternately, one paging group/sub group can be associated with multiple paging arrival rates. Alternately, one paging group/sub group can be associated with a range of paging arrival rates. The mapping information can be signaled as a list wherein A) each entry in the list consists of [paging group/sub group identity, paging arrival rate]
B) each entry in the list consists of [paging group/sub group identity, one or more paging arrival rates]
C) each entry in the list consists of [paging group/sub group identity, paging arrival rate min, paging arrival rate max]. paging group/sub group identity of UE whose paging arrival rate is between paging arrival rate min and paging arrival rate max.
D) each entry in the list consists of [paging arrival rate]. The ith entry in the list corresponds to paging group/sub group identity 'i'. or The ith entry in the list corresponds to paging group/sub group identity 'i+1'. Each entry in the list are sequentially numbered.
E) each entry in the list consists of [one or more paging arrival rates]. The ith entry in the list corresponds to paging group/sub group identity 'i'. or The ith entry in the list corresponds to paging group/sub group identity 'i+1'. Each entry in the list are sequentially numbered.
F) each entry in the list consists of [paging arrival rate min, paging arrival rate max]. paging group/sub group identity of UE whose paging arrival rate is between paging arrival rate min and paging arrival rate max. The ith entry in the list corresponds to paging group identity 'i'. or The ith entry in the list corresponds to paging group/sub group identity 'i+1'. Each entry in the list are sequentially numbered.

UE determines its paging group/sub group based on its paging arrival rate and information received from gNB (330).

UE determines its PF and PO as explained earlier and monitors the determined PO (i.e. one or more PDCCH monitoring occasions of PO) (340).

In case of CN paging, CN (i.e. AMF) sends paging arrival rate of UE to GNB along with the paging message. gNB identifies the paging group/sub group of UE based on mapping between paging groups/sub groups and paging arrival rate.

In case of RAN paging, the AMF provides to the NG-RAN node (i.e. gNB) the Core Network Assistance Information. The Core Network Assistance Information includes the registration area configured for the UE, the Periodic Registration Update timer, and the UE Identity Index value, etc. Core Network Assistance Information includes UE's paging arrival rate. This is used by gNB to identify paging group/sub group of UE for RAN paging. gNB identifies the paging group/sub group of UE based on mapping between paging groups/sub groups and paging arrival rate. Alternately, UE can inform (e.g. in UE assistance information message) its paging group/sub group to RAN before RRC connection is released gNB indicates paging group(s)/sub groups in short message or in DCI of PDCCH addressed to P-RNTI transmitted in PO (350). The paging group(s)/sub groups can be indicated in one of the following ways:

Option 1: Only one paging group/sub group ID is indicated (UE operation is illustrated in FIG. 3)
  1-1: Paging group/sub group ID can be an optional field in DCI or short message.
    UE monitors for PDCCH addressed to pre-defined P-RNTI in its PO (340).
    (Alternate) UE monitors j+1th P-RNTI, where j=(UE_ID/N*Ns) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.
    (Alternate) UE monitors j+1th P-RNTI, where j=(UE_ID/N) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.
    (Alternate) UE monitors j+1th P-RNTI, where j=(UE_ID) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

UE receives PDCCH addressed to P-RNTI (350). DCI includes scheduling information for paging message. After receiving the PDCCH addressed to P-RNTI, UE identifies whether a Paging group/sub group ID is included in the DCI (360).

If Paging group/sub group ID is absent, UE receives and decodes the TB according to the scheduling information for paging message (365).

If Paging group/sub group ID is present, UE identifies whether the Paging group/sub group ID in the DCI matches with UE's paging group/sub group ID (370). If UE belongs to the indicated paging group/sub group (i.e. paging group/sub group ID in DCI matches with UE's paging group/sub group ID), UE receives and decodes the TB according to the scheduling information for paging message (380). If Paging group/sub group ID is present and UE does not belong to the indicated paging group/sub group (i.e. paging group/sub group ID in DCI does not match with UE's paging group/sub group ID), UE does not receive and decode the TB according to the scheduling information for paging message (375).

In an embodiment, one paging group/sub group ID can be reserved to indicate paging for all paging groups/sub groups. If Paging group/sub group ID in PDCCH belongs to UE's paging group/sub group or is the reserved paging group/sub group ID, UE receives and decodes the TB according to the scheduling information for paging message. Otherwise, UE does not decode receive and decode the TB according to the scheduling information for paging message.

Figure 4:
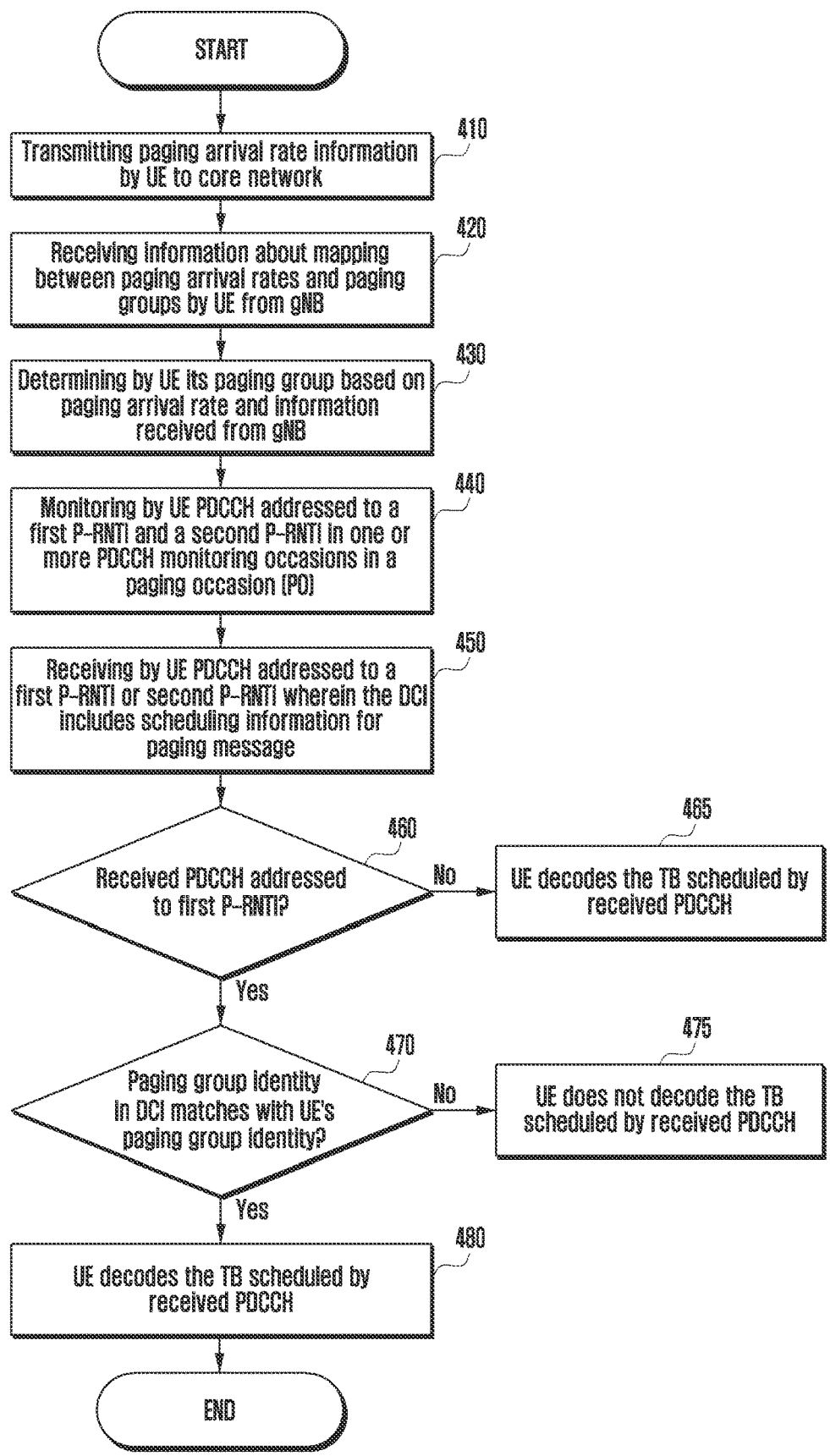
FIG. 4 illustrates an example flow of UE operation on paging grouping using multiple P-RNTIs based on paging arrival rate indicated by a UE in accordance with a method of this disclosure.

1-2: Alternatively, multiple P-RNTIs can be used (UE operation is illustrated in FIG. 4):

FIG. 4 illustrates an example flow of UE operation on paging grouping/sub grouping using multiple P-RNTIs based on paging arrival rate indicated by a UE in accordance with a method of this disclosure (The redundant description with Option 1-1 (reference numeral 410, 420, 430) is omitted). The embodiment of the flow illustrated in FIG. 4 is for illustration only. FIG. 4 does not limit the scope of this disclosure to any particular implementation of an electronic device.

UE monitors for PDCCH addressed to P-RNTI 1 and legacy P-RNTI in its PO (440). In an embodiment, if camped cell supports paging group(s)/sub group(s) and UE supports paging groups/sub groups, UE monitors PDCCH addressed to P-RNTI 1. Otherwise UE monitors PDCCH addressed to legacy P-RNTI.

UE receives PDCCH addressed to P-RNTI 1 or legacy P-RNTI (450).

Paging group/sub group ID is included in DCI/short message of PDCCH addressed to P-RNTI1.

Paging group/sub group ID is not included in DCI/short message of PDCCH addressed to legacy P-RNTI.

If UE receives PDCCH addressed to P-RNTI 1 (460), UE identifies whether the Paging group/sub group ID in the DCI/short message matches with UE's paging group/sub group ID (470). If UE belongs to indicated paging group/sub group (i.e. paging group/sub group ID in DCI matches with UE's paging group/sub group ID) in DCI/short message of PDCCH addressed to P-RNTI1, UE receives and decodes the TB according to the scheduling information for paging message (480). If UE does not belong to the indicated paging group/sub group (i.e. paging group/sub group ID in DCI does not match with UE's paging group/sub group ID), UE does not receive and decode the TB (475).

In an embodiment, One paging group/sub group ID can be reserved to indicate paging for all paging groups/sub groups. If Paging group/sub group ID in PDCCH belongs to UE's paging group/sub group or is the reserved paging group/sub group ID, UE receives and decodes the TB according to the scheduling information for paging message. Otherwise, UE does not receive and decode the TB according to the scheduling information for paging message.

If UE receives PDCCH addressed to legacy P-RNTI, UE receives and decodes the TB for paging message (465) according to the scheduling information for paging message.

Option 2: List of paging group/sub group IDs is indicated 2-1: List of Paging group/sub group IDs is optional in DCI or short message.

UE monitors for PDCCH addressed to pre-defined P-RNTI in its PO.

(Alternate) UE monitors j+1th P-RNTI, where j=(UE_ID/N*Ns) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

(Alternate) UE monitors j+1th P-RNTI, where j=(UE_ID/N) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

(Alternate) UE monitors j+1th P-RNTI, where j=(UE_ID) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

UE receives PDCCH addressed to P-RNTI. DCI includes scheduling information for paging message.

If the List of Paging group/sub group IDs is absent, UE receives and decodes the TB according to the scheduling information for paging message.

If the List of Paging group/sub group IDs is present and UE belongs to one of the indicated paging group/sub group in the list, UE receives and decodes the TB according to the scheduling information for paging message. If the List of Paging group/sub group IDs is present and UE does not belong to one of the indicated paging group/sub group in the list, UE does not receive and decode the TB according to the scheduling information for paging message.

In an embodiment, one paging group sub group ID can be reserved to indicate paging for all paging groups sub groups. If UE belongs to one of the indicated paging group/sub group in the list or the list includes reserved paging group/sub group ID, UE receives and decodes the TB according to the scheduling information for paging message. Otherwise, UE does not receive and decode the TB according to the scheduling information for paging message.

2-2: Multiple P-RNTIs can be used:
UE monitors for PDCCH addressed to P-RNTI 1 and legacy P-RNTI in its PO. In an embodiment, if camped cell supports paging group(s)/sub group (s) and UE supports paging groups/sub groups, UE monitors PDCCH addressed to P-RNTI 1. Otherwise UE monitors PDCCH addressed to legacy P-RNTI.

List of paging group/sub group IDs is included in DCI/short message of PDCCH addressed to P-RNTI1.

List of paging group/sub group IDs is not included in DCI/short message of PDCCH addressed to legacy P-RNTI.

If UE receives PDCCH addressed to P-RNTI 1 and if UE belongs to one of the indicated paging group/sub group in DCI/short message of PDCCH addressed to P-RNTI1, UE receives and decodes the TB according to the scheduling information for paging message. If UE does not belong to one of the indicated paging group/sub group, UE does not receive and decode the TB according to the scheduling information for paging message.

In an embodiment, one paging group/sub group ID can be reserved to indicate paging for all paging groups/sub groups. If UE belongs to one of the indicated paging group/sub group in the list or the list includes reserved paging group/sub group ID, UE receives and decodes the TB according to the scheduling information for paging message. Otherwise, UE does not receive and decode the TB according to the scheduling information for paging message If UE receives PDCCH addressed to legacy P-RNTI, UE decodes the paging message.

Option 3: Paging group/sub group bitmap is included in DCI or short message 3-1: Paging group/sub group bitmap can be optional field:
Each bit in the bitmap corresponds to different paging group/sub group. The mapping between bits in bitmap and paging groups/sub groups can be pre-defined. For example, if there are P paging groups/subgroups, k=paging group/sub group ID mod P, kth most significant bit in bitmap corresponds to that paging group/sub group ID, where bits in bitmap are numbered sequentially from most significant bit to least significant bit. For example, if there are P paging groups/subgroups, k=paging group/sub group ID mod P, kth least significant bit in bitmap corresponds to that paging group/sub group ID, where bits in bitmap are numbered sequentially from least significant bit to most significant bit.

The size of bitmap can be pre-defined. The size of bitmap can also be determined based on number of paging groups/sub groups.

UE monitors for PDCCH addressed to pre-defined P-RNTI in its PO.
(Alternate) UE monitors j+1th P-RNTI, where j=(UE_ID/N*Ns) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

(Alternate) UE monitors j+1th P-RNTI, where j=(UE_ID/N) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

(Alternate) UE monitors j+1th P-RNTI, where j=(UE_ID) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

UE receives PDCCH addressed to P-RNTI. DCI includes scheduling information for paging message.

If Paging group/sub group bitmap is absent, UE decodes the TB according to the scheduling information for paging message.

If Paging group/sub group bitmap is present and bit corresponding to UE's paging group/sub group is set (i.e. equals to 1) in bitmap, UE receives and decodes the TB according to the scheduling information for paging message. If Paging group/sub group bitmap is present and bit corresponding to UE's paging group/sub group is not set (i.e. equals to 0) in bitmap, UE does not receive and decode the TB according to the scheduling information for paging message.

In an embodiment, one bit in bitmap can be reserved to indicate paging for all paging groups/sub group. If bit corresponding to UE's paging group/sub group or bit corresponding to paging for all paging groups/sub groups is set in bitmap, UE receives and decodes the TB according to the scheduling information for paging message. Otherwise, UE does not receive and decode the TB according to the scheduling information for paging message 3-2: Multiple P-RNTIs can be used:
UE monitors for PDCCH addressed to P-RNTI 1 and legacy P-RNTI in its PO. In an embodiment, if camped cell supports paging group(s)/sub group(s) and UE supports paging groups/sub groups, UE monitors PDCCH addressed to P-RNTI 1. Otherwise UE monitors PDCCH addressed to legacy P-RNTI.

Paging group/sub group bitmap is included in DCI/short message of PDCCH addressed to P-RNTI1.

Paging group/sub group bitmap is not included in DCI/short message of PDCCH addressed to legacy P-RNTI.

If UE receives PDCCH addressed to P-RNTI 1 and bit corresponding to UE's paging group/sub group is set (i.e. equals to 1) in bitmap in DCI/short message of PDCCH addressed to P-RNTI1, UE receives and decodes the TB according to the scheduling information for paging message. If bit corresponding to UE's paging group/sub group is not set (i.e. equals to 0) in bitmap, UE does not receive and decode the TB according to the scheduling information for paging message.

In an embodiment, one bit in bitmap can be reserved to indicate paging for all paging groups/sub groups. If bit corresponding to UE's paging group/sub group or bit corresponding to paging for all paging groups/sub groups is set (i.e. equals to 1) in bitmap, UE receives and decodes the TB according to the scheduling information for paging message. Otherwise, UE does not receive and decode the TB according to the scheduling information for paging message.

If UE receives PDCCH addressed to legacy P-RNTI, UE receives and decodes the TB for paging message according to the scheduling information for paging message.

Alternately, instead of gNB indicating paging group(s)/sub group (s) in short message or in DCI of PDCCH addressed to P-RNTI transmitted in PO, different P-RNTI can be reserved for different paging group/sub group. gNB uses PDCCH addressed to P-RNTI specific to paging group/sub group to which the UE(s) being paged belongs. UE monitors PDCCH addressed to P-RNTI corresponding to its paging group/sub group.

In an embodiment, one paging group/sub group ID or P-RNTI can be reserved to indicate paging for all paging groups/sub groups. UE monitors PDCCH addressed to P-RNTI of its paging group/sub group and P-RNTI of common paging group/sub group.

In an embodiment, instead of paging arrival rate, paging probability (or paging probability threshold) can be used in operations(s) of method 2 explained above. In the description, paging arrival rate can be replaced by paging probability (or paging probability threshold).

Figure 5:
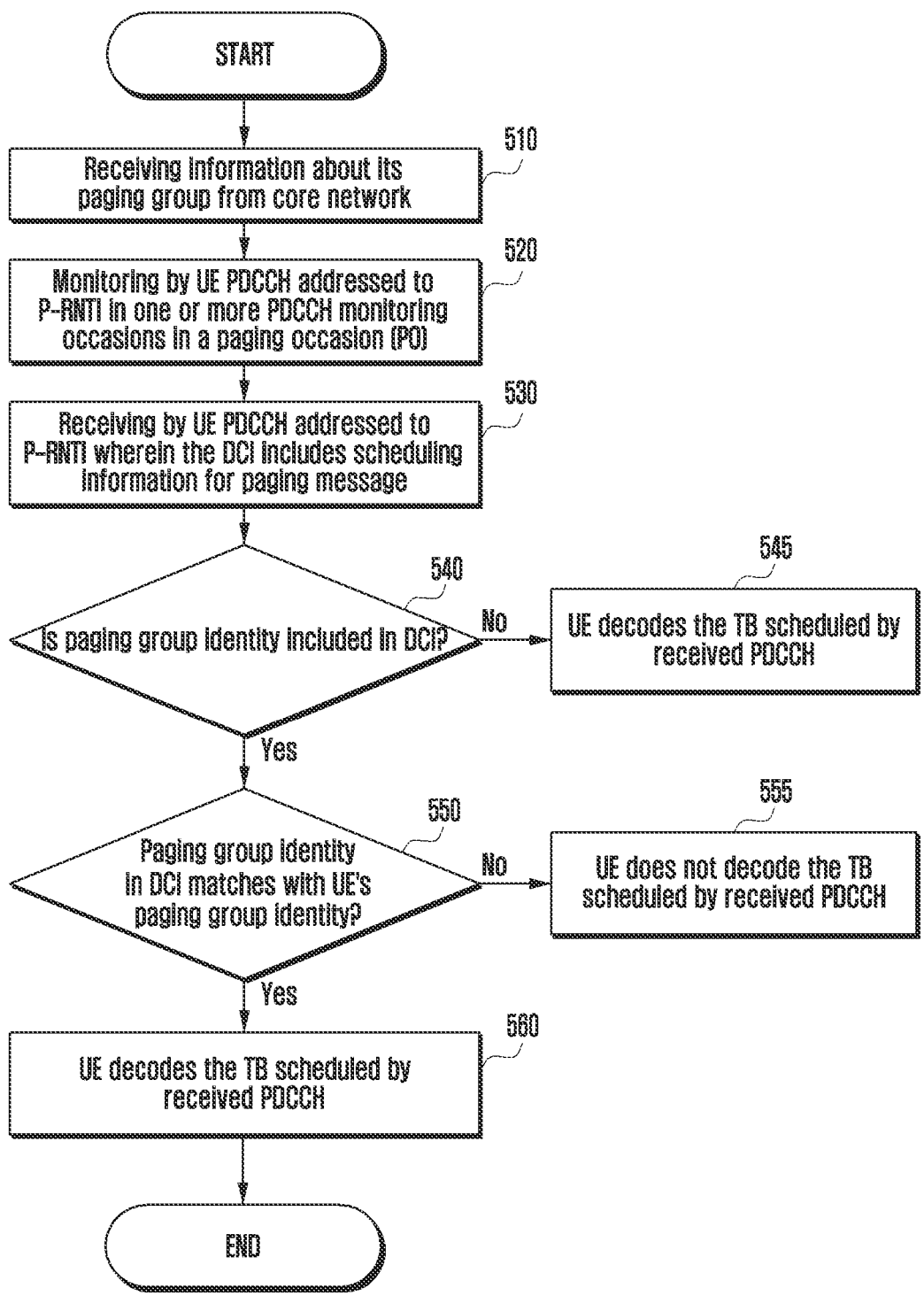
FIG. 5 illustrates an example flow of UE operation on paging grouping grouped by CN based on paging arrival rate indicated by a UE in accordance with a method of this disclosure.

Method 3 (Grouping by Network (e.g. AMF in CN), where Paging Group/Sub Group is Indicated by Network (e.g. AMF in CN). UE May Inform its Paging Arrival Rate or Other Assistance Information (e.g. UE Type or UE's Power Class, Etc) to CN to Determine Paging Group/Sub Group):

FIG. 5 illustrates an example flow of UE operation on paging grouping grouped by network (e.g. AMF in CN) based on paging arrival rate indicated by a UE in accordance with a method of this disclosure. The embodiment of the flow illustrated in FIG. 5 is for illustration only. FIG. 5 does not limit the scope of this disclosure to any particular implementation of an electronic device.

UEs are grouped into 'P' paging groups/sub groups. The parameter 'P' can be pre-defined. The parameter 'P' can be signaled by network (e.g. gNB can signal this in paging configuration or in the BWP configuration received in system information or RRC signaling message (e.g. RRC release message or RRC Reconfiguration message); AMF can signal this in NAS message) or can be implicitly known.

The grouping is done by network (e.g. AMF in CN). UE's paging group/sub group is informed to UE by core network (i.e. AMF using NAS message) (510). In an embodiment, UE's paging arrival rate (also referred as paging rate i.e. number of pages per unit time/per interval) or other assistance information (e.g. UE type or UE's power class, etc.) is informed to CN by UE (i.e. using NAS message) and CN uses it to determine UE's paging group/sub group. In an embodiment, the grouping can be done by radio access network (e.g. gNB) and informed to UE.

UE determines its PF and PO as explained earlier and monitors the determined PO (i.e. one or more PDCCH monitoring occasions of PO) (520).

In case of CN paging, CN (i.e. AMF) sends paging group/sub group of UE to gNB along with the paging message.

In case of RAN paging, the AMF provides to the NG-RAN node (i.e. gNB) the Core Network Assistance Information. The Core Network Assistance Information includes the registration area configured for the UE, the Periodic Registration Update timer, and the UE Identity Index value, etc. Core Network Assistance Information includes UE's paging group/sub group. Alternately, UE can inform its paging group/sub group to RAN before RRC connection is released.

gNB indicates paging group(s)/sub group(s) of UEs which are paged in short message or in DCI of PDCCH addressed to P-RNTI transmitted in PO (530). The paging group(s)/sub group (s) can be indicated in one of the following ways:

Option 1: Only one paging group/sub group ID is indicated (UE operation is shown in FIG. 5)

1-1: Paging group/sub group ID can be an optional field in DCI or short message.

UE monitors for PDCCH addressed to pre-defined P-RNTI in its PO (520).

(alternate) UE monitors j+1th P-RNTI, where j=(UE_ID/N*Ns) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

(Alternate) UE monitors j+1th P-RNTI, where j=(UE_ID/N) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

(Alternate) UE monitors j+1th P-RNTI, where j=(UE_ID) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

UE receives PDCCH addressed to P-RNTI (530). DCI includes scheduling information for paging message. After receiving the PDCCH addressed to P-RNTI, UE identifies whether a Paging group/sub group ID is included in the DCI (540).

If Paging group/sub group ID is absent, UE receives and decodes the TB according to the scheduling information for paging message (545).

If Paging group/sub group ID is present, UE identifies whether the Paging group/sub group ID in the DCI matches with UE's paging group/sub group ID (550). If UE belongs to the indicated paging group/sub group (i.e. paging group/sub group ID in DCI matches with UE's paging group/sub group ID), UE receives and decodes the TB according to the scheduling information for paging message (560). If Paging group/sub group ID is present and UE does not belong to the indicated paging group/sub group (i.e. paging group/sub group ID in DCI does not match with UE's paging group/sub group ID), UE does not receive and decode the TB (555) according to the scheduling information for paging message.

In an embodiment, one paging group/sub group ID can be reserved to indicate paging for all paging groups/sub groups. If Paging group/sub group ID in PDCCH belongs to UE's paging group/sub group or is the reserved paging group/sub group ID, UE receives and decodes the TB according to the scheduling information for paging message. Otherwise, UE does not receive and decode the TB for paging message according to the scheduling information for paging message.

Figure 6:
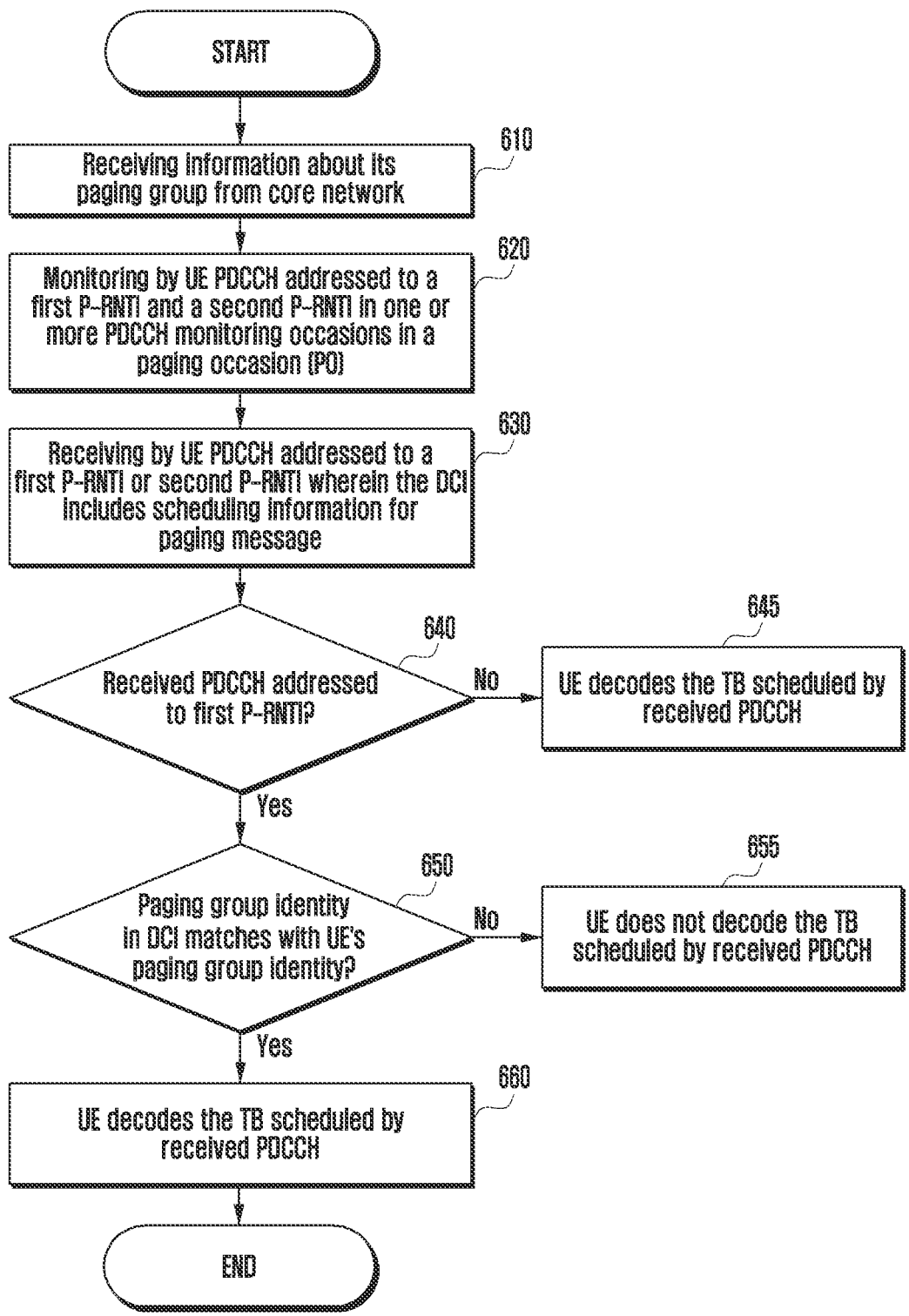
FIG. 6 illustrates an example flow of UE operation on paging grouping using multiple P-RNTIs grouped by CN based on paging arrival rate indicated by a UE in accordance with a method of this disclosure.

1-2: Alternatively, multiple P-RNTIs can be used (UE operation is shown in FIG. 6):

FIG. 6 illustrates an example flow of UE operation on paging grouping using multiple P-RNTIs grouped by network (e.g. AMF in CN) based on paging arrival rate indicated by a UE in accordance with a method of this disclosure (The redundant description with Option 1-1 (reference numeral 610) is omitted). The embodiment of the flow illustrated in FIG. 6 is for illustration only. FIG. 6 does not limit the scope of this disclosure to any particular implementation of an electronic device.

UE monitors for PDCCH addressed to P-RNTI 1 and legacy P-RNTI in its PO (620). In an embodiment, if camped cell supports paging group(s)/sub group (s) and UE supports paging groups/sub groups, UE monitors PDCCH addressed to P-RNTI 1. Otherwise UE monitors PDCCH addressed to legacy P-RNTI.

UE receives PDCCH addressed to P-RNTI 1 or legacy P-RNTI (630).

Paging group/sub group ID is included in DCI/short message of PDCCH addressed to P-RNTI1.

Paging group/sub group ID is not included in DCI/short message of PDCCH addressed to legacy P-RNTI.

If UE receives PDCCH addressed to P-RNTI 1 (640), UE identifies whether the Paging group/sub group ID in the DCI/short message matches with UE's paging group/sub group ID (650). If UE belongs to indicated paging group/sub group (i.e. paging group/sub group ID in DCI matches with UE's paging group/sub group ID) in DCI/short message of PDCCH addressed to P-RNTI1, UE receives and decodes the TB according to the scheduling information for paging message (660). If UE does not belong to the indicated paging group/sub group (i.e. paging group/sub group ID in DCI does not match with UE's paging group/sub group ID), UE does not receive and decode the TB (655) for paging message.

In an embodiment, One paging group/sub group ID can be reserved to indicate paging for all paging groups/sub groups. If Paging group/sub group ID in PDCCH belongs to UE's paging group/sub group or is the reserved paging group/sub group ID, UE receives and decodes the TB according to the scheduling information for paging message. Otherwise, UE does not receive and decode the TB for paging message.

If UE receives PDCCH addressed to legacy P-RNTI, UE receives and decodes the TB for paging message (645) according to the scheduling information for paging message.

Option 2: List of paging group/sub group IDs is indicated
2-1: List of Paging group/sub group IDs is optional in DCI or short message.
UE monitors for PDCCH addressed to pre-defined P-RNTI in its PO.
(Alternate) UE monitors j+1th P-RNTI, where j=(UE_ID/N*Ns) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.
(Alternate) UE monitors j+1th P-RNTI, where j=(UE_ID/N) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.
(Alternate) UE monitors j+1th P-RNTI, where j=(UE_ID) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.
UE receives PDCCH addressed to P-RNTI. DCI includes scheduling information for paging message.
If the List of Paging group/sub group IDs is absent, UE decodes the TB according to the scheduling information for paging message.
If the List of Paging group/sub group IDs is present and UE belongs to one of the indicated paging group/sub group in the list, UE receives and decodes the TB according to the scheduling information for paging message. If the List of Paging group/sub group IDs is present and UE does not belong to one of the indicated paging group/sub group in the list, UE does not receive and decode the TB.
In an embodiment, One paging group/sub group ID can be reserved to indicate paging for all paging groups/sub groups. If UE belongs to one of the indicated paging group/sub group in the list or the list includes reserved paging group/sub group ID, UE receives and decodes the TB according to the scheduling information for paging message. Otherwise, UE does not receive and decode the TB for paging message.
2-2: Multiple P-RNTIs can be used:
UE monitors for PDCCH addressed to P-RNTI 1 and legacy P-RNTI in its PO. In an embodiment, if camped cell supports paging group(s)/sub group (s) and UE supports paging groups/sub groups, UE monitors PDCCH addressed to P-RNTI 1. Otherwise UE monitors PDCCH addressed to legacy P-RNTI.
List of paging group/sub group IDs is included in DCI/short message of PDCCH addressed to P-RNTI1.
List of paging group/sub group IDs is not included in DCI/short message of PDCCH addressed to legacy P-RNTI.
If UE receives PDCCH addressed to P-RNTI 1 and if UE belongs to one of the indicated paging group/sub group in DCI/short message of PDCCH addressed to P-RNTI1, UE receives and decodes the TB according to the scheduling information for paging message. If UE does not belong to one of the indicated paging group/sub group, UE does not receive and decode the TB for paging message.

In an embodiment, one paging group/sub group ID can be reserved to indicate paging for all paging groups/sub groups. If UE belongs to one of the indicated paging group/sub group in the list or the list includes reserved paging group/sub group ID, UE receives and decodes the TB according to the scheduling information for paging message. Otherwise, UE does not receive and decode the TB for paging message.

If UE receives PDCCH addressed to legacy P-RNTI, UE receives and decodes the TB for paging message according to the scheduling information for paging message.* Option 3: Paging group/sub group bitmap is included in DCI or short message 3-1: Paging group/sub group bitmap can be optional field:

Each bit in the bitmap corresponds to different paging group/sub group. The mapping between bits in bitmap and paging groups/sub groups can be pre-defined.

The size of bitmap can be pre-defined. The size of bitmap can also be determined based on number of paging groups/sub groups. For example, if there are P paging groups/subgroups, k=paging group/sub group ID mod P, kth most significant bit in bitmap corresponds to that paging group/sub group ID, where bits in bitmap are numbered sequentially from most significant bit to least significant bit. For example, if there are P paging groups/subgroups, k=paging group/sub group ID mod P, kth least significant bit in bitmap corresponds to that paging group/sub group ID, where bits in bitmap are numbered sequentially from least significant bit to most significant bit.

UE monitors for PDCCH addressed to pre-defined P-RNTI in its PO.

UE monitors j+1th P-RNTI, where j=(UE_ID/N*Ns) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

(Alternate) UE monitors j+1th P-RNTI, where j=(UE_ID/N) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

UE monitors j+1th P-RNTI, where j=(UE_ID) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB. The configuration can be using system information or RRC signaling.

UE receives PDCCH addressed to P-RNTI. DCI includes scheduling information for paging message.

If Paging group/sub group bitmap is absent, UE decodes the TB according to the scheduling information for paging message.

If Paging group/sub group bitmap is present and bit corresponding to UE's paging group/sub group is set (i.e. equals to 1) in bitmap, UE receives and decodes the TB according to the scheduling information for paging message. If Paging group/sub group bitmap is present and bit corresponding to UE's paging group/sub group is not set (i.e. equals to 0) in bitmap, UE does not receive and decode the TB for paging message.

In an embodiment, one bit in bitmap can be reserved to indicate paging for all paging groups/sub groups. If bit corresponding to UE's paging group/sub group or bit corresponding to paging for all paging groups/sub groups is set in bitmap, UE receives and decodes the TB according to the scheduling information for paging message. Otherwise, UE does not receive and decode the TB for paging message according to the scheduling information for paging message.

3-2: Multiple P-RNTIs can be used:

UE monitors for PDCCH addressed to P-RNTI 1 and legacy P-RNTI in its PO. In an embodiment, if camped cell supports paging group(s) and UE supports paging groups, UE monitors PDCCH addressed to P-RNTI 1. Otherwise UE monitors PDCCH addressed to legacy P-RNTI.

Paging group/sub group bitmap is included in DCI/short message of PDCCH addressed to P-RNTI1.

Paging group/sub group bitmap is not included in DCI/short message of PDCCH addressed to legacy P-RNTI.

If UE receives PDCCH addressed to P-RNTI 1 and bit corresponding to UE's paging group/sub group is set (i.e. equals to 1) in bitmap in DCI/short message of PDCCH addressed to P-RNTI1, UE receives and decodes the TB according to the scheduling information for paging message. If bit corresponding to UE's paging group/sub group is not set (i.e. equals to 0) in bitmap, UE does not receive and decode the TB according to the scheduling information for paging message.

In an embodiment, one bit in bitmap can be reserved to indicate paging for all paging groups/sub groups. If bit corresponding to UE's paging group/sub group or bit corresponding to paging for all paging groups/sub groups is set in bitmap, UE receives and decodes the TB according to the scheduling information for paging message. Otherwise, UE does not receive and decode the TB according to the scheduling information for paging message.

If UE receives PDCCH addressed to legacy P-RNTI, UE receives and decodes the TB for paging message according to the scheduling information for paging message.

Alternately, instead of gNB indicating paging group(s)/sub group(s) in short message or in DCI of PDCCH addressed to P-RNTI transmitted in PO, different P-RNTI can be reserved for different paging group/sub group. gNB uses PDCCH addressed to P-RNTI specific to paging group/sub group to which the UE(s) being paged belongs. UE monitors PDCCH addressed to P-RNTI corresponding to its paging group/sub group.

In an embodiment, one paging group/sub group ID or P-RNTI can be reserved to indicate paging for all paging groups/sub groups. UE monitors PDCCH addressed to P-RNTI of its paging group/sub group and P-RNTI of common paging group/sub group.

In an embodiment, instead of paging arrival rate, paging probability (or paging probability threshold) can be used in operations(s) of method 1 explained above. The same description is applicable by replacing paging arrival rate by paging probability (or paging probability threshold).

In an embodiment, in inactive state, paging group/sub group can be independently decided by RAN and indicated to UE during RRC connection release (can be update during RAN update).

- Alt 1: In inactive state, UE monitor PDCCH addressed to P-RNTI for paging group/sub group indicated by RAN (i.e. UE will check for its paging group/sub group (assigned by RAN) in DCI/short message). In idle state, UE monitor PDCCH addressed to P-RNTI for paging group/sub group indicated by CN (i.e. UE will check for its paging group/sub group (assigned by CN) in DCI/short message).
- Alt 2: In inactive state, UE monitor PDCCH addressed to P-RNTI for paging groups/sub groups indicated by RAN and CN. In idle state, UE monitor PDCCH addressed to P-RNTI for paging group/sub group indicated by CN (i.e. UE will check for its paging group/sub group (assigned by CN) in DCI/short message).
- Alt 3: if paging group/sub group is assigned by RAN, UE monitor PDCCH addressed to P-RNTI for paging group/sub group indicated by RAN (i.e. UE will check for its paging group/sub group (assigned by RAN) in DCI/short message). If paging group/sub group is not assigned by RAN and If paging group/sub group is assigned by CN, UE monitor PDCCH addressed to P-RNTI for paging group/sub group indicated by CN (i.e. UE will check for its paging group/sub group (assigned by CN) in DCI/short message).

Figure 7:
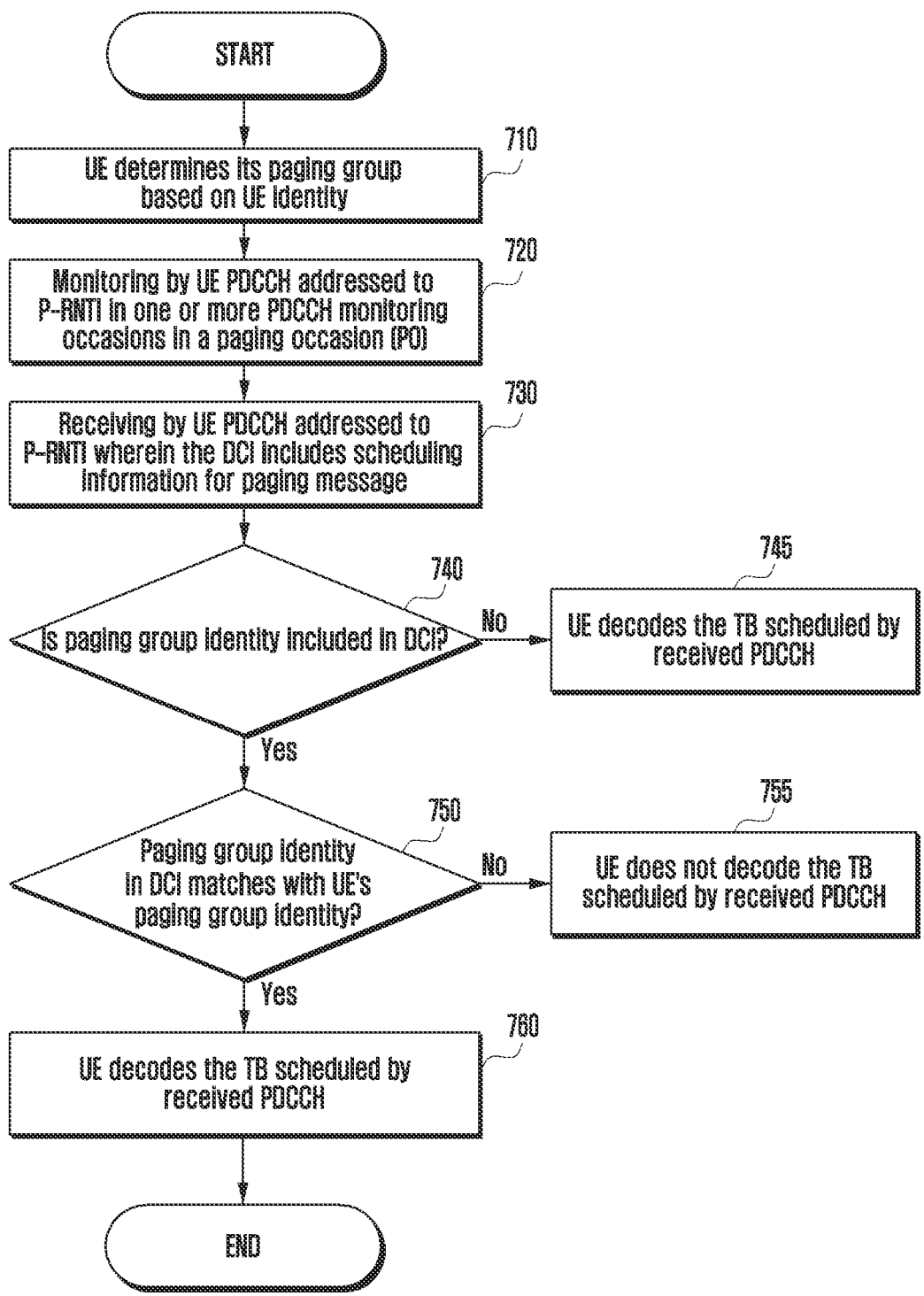
FIG. 7 illustrates an example flow of UE operation on paging grouping by itself based on some bits of UE ID in accordance with a method of this disclosure.

Separate fields are used for CN and RAN paging group/sub group in DCI/short message or Same fields are used for CN and RAN paging group/sub group in DCT/short message.
  - Paging group/sub group ID space is partitioned into RAN paging groups/sub groups and CN paging groups/sub groups. Alternately, instead of partitioning paging group/sub group id space, different P-RNTI can be used for CN and RAN paging Method 4 (Grouping by UE Itself, where Paging Group/Sub Group is Determined Based on Some Bits of UE ID.):

FIG. 7 illustrates an example flow of UE operation on paging grouping/sub grouping by itself based on some bits of UE ID in accordance with a method of this disclosure. The embodiment of the flow illustrated in FIG. 7 is for illustration only. FIG. 1 does not limit the scope of this disclosure to any particular implementation of an electronic device.

- UEs are grouped into 'P' paging groups/sub groups. The parameter 'P' can be pre-defined. The parameter 'P' can be signaled by network (e.g. gNB can signal this in paging configuration or in the BWP configuration received in system information or RRC signaling message (e.g. RRC Release message or RRC Reconfiguration message, etc.).
- UE identify its paging group/sub group based on 'X' bits of its UE ID (710). The UE_ID can be one of the following:
- UE_ID: 5G-S-TMSI mod 1024
- UE_ID: IMSI mod 1024
- UE_ID can be any other UE identity
- X=log 2(P). For example, if there are 8 paging groups, X=3.
- Y=log 2(N*Ns), where N is the number of paging frames and Ns is the number of POs per paging frame. N and Ns are signaled by gNB in paging configuration. X Lsbs starting from Y+1th Lsb of UE_ID indicates UE's paging group/sub group or is the UE's paging group/sub group identity. For example, if N=16, Ns=4, P=8, (bit9bit8bit7) indicates UE's paging group/sub group.
- In an embodiment, Paging group/sub group ID of UE= (UE_ID/N*Ns) mod P, where N is the number of paging frames and Ns is the number of POs per paging frame. N and Ns are signaled by gNB in paging configuration. In this case paging group/sub group ID P can be common paging group/sub group. For example, if P is 5, paging group/sub group ID of UE will be one of 0 to 4. Paging group/sub group ID 5 is common paging group. In an embodiment, 'N*Ns' in above equation can be replaced by 'N*Ns*M' where parameter M indicates the number of groups into which UEs are divided for wakeup signal or early paging indication monitoring.
- In an embodiment, Paging group/sub group ID of UE=1+ [(UE_ID/N*Ns) mod P], where N is the number of paging frames and Ns is the number of POs per paging frame. N and Ns are signaled by gNB in paging configuration. In this case paging group/sub group ID 0 can be common paging group/sub group. For example, if P is 5, paging group/sub group ID of UE will be one of 1 to 5. Paging group/sub group ID 0 is common paging group/sub group. In an embodiment, 'N*Ns' in above equation can be replaced by 'N*Ns*M' where parameter M indicates the number of groups into which UEs are divided for wakeup signal or early paging indication monitoring.
- In an alternate embodiment, Paging group/sub group ID of UE=(UE_ID/N) mod P, where N is the number of paging frames. N and Ns are signaled by gNB in paging configuration. In this case paging group/sub group ID P can be common paging group/sub group.
- In an alternate embodiment, Paging group/sub group ID of UE=1+[(UE_ID/N) mod P], where N is the number of paging frames. N and Ns are signaled by gNB in paging configuration. In this case paging group/sub group ID 0 can be common paging group/sub group.
- In an alternate embodiment, Paging group/sub group ID of UE=(UE_ID) mod P. In this case paging group/sub group ID P can be common paging group/sub group.
- In an alternate embodiment, Paging group/sub group ID of UE=1+[(UE_ID) mod P]. In this case paging group/sub group ID 0 can be common paging group/sub group.
- UE determines its PF and PO as explained earlier and monitors the determined PO (i.e. one or more PDCCH monitoring occasions of PO) (720).
- In case of CN paging, CN (i.e. AMF) sends UE ID to GNB along with the paging message. GNB determines the UE's paging group/sub group using UE_ID in same manner as determined by UE.
- In case of RAN paging, the AMF provides to the NG-RAN node the Core Network Assistance Information.

The Core Network Assistance Information includes the registration area configured for the UE, the Periodic Registration Update timer, and the UE Identity Index value (UE_ID), etc. GNB determines the UE's paging group/sub group using UE_ID in same manner as determined by UE.

gNB indicates paging group(s)/sub group(s) in short message or in DCI of PDCCH addressed to P-RNTI transmitted in PO (730). The paging group(s)/sub group (s) can be indicated in one of the following ways:

Option 1: Only one paging group/sub group ID is indicated (UE operation is shown in FIG. 7)

Figure 8:
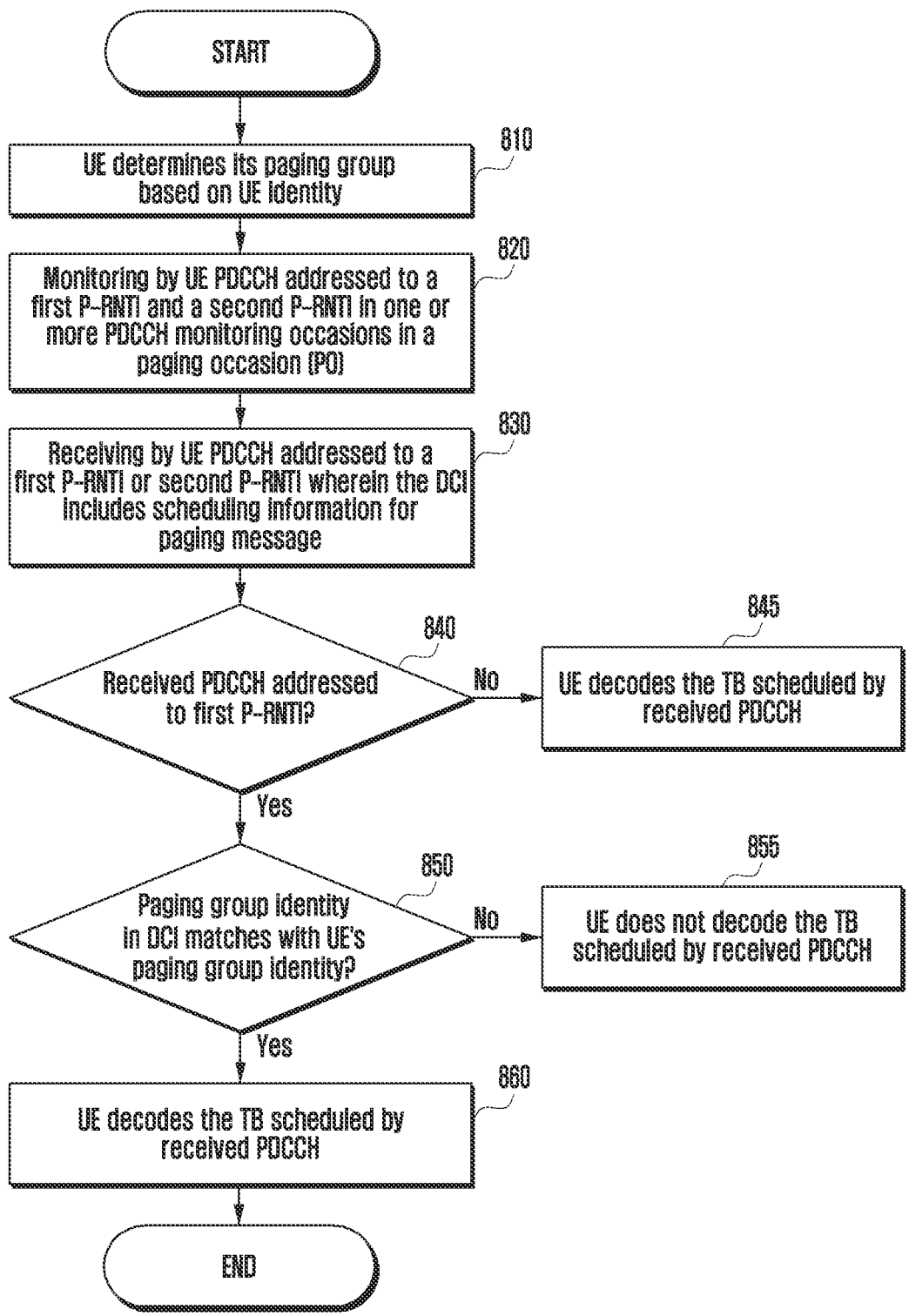
FIG. 8 illustrates an example flow of UE operation on paging grouping by itself using multiple P-RNTIs based on some bits of UE ID in accordance with a method of this disclosure.

1-1: Paging group/sub group ID can be an optional field in DCI or short message.
      UE monitors for PDCCH addressed to P-RNTI in its PO (720).
      UE receives PDCCH addressed to P-RNTI (730). DCI includes scheduling information for paging message. After receiving the PDCCH addressed to P-RNTI, UE identifies whether a Paging group/sub group ID is included in the DCI (740).
      If Paging group/sub group ID is absent, UE decodes the TB according to the scheduling information for paging message (745).
      If Paging group/sub group ID is present, UE identifies whether the Paging group/sub group ID in the DCI matches with UE's paging group/sub group ID (750). If UE belongs to the indicated paging group/sub group (i.e. paging group/sub group ID in DCI matches with UE's paging group/sub group ID), UE receives and decodes the TB according to the scheduling information for paging message (760). If Paging group/sub group ID is present and UE does not belong to the indicated paging group/sub group (i.e. paging group/sub group ID in DCI does not match with UE's paging group/sub group ID), UE does not receive and decode the TB (755) for paging message.
      In an embodiment, one paging group/sub group ID can be reserved to indicate paging for all paging groups/sub groups. If Paging group/sub group ID in PDCCH belongs to UE's paging group/sub group or is the reserved paging group/sub group ID, UE receives and decodes the TB according to the scheduling information for paging message. Otherwise, UE does not receive and decode the TB for paging message.
   1-2: Alternatively, multiple P-RNTIs can be used (UE operation is shown in FIG. 8):

FIG. 8 illustrates an example flow of UE operation on paging grouping by itself using multiple P-RNTIs based on some bits of UE ID in accordance with a method of this disclosure (The redundant description with Option 1-1 (reference numeral 810 is omitted). The embodiment of the flow illustrated in FIG. 8 is for illustration only. FIG. 8 does not limit the scope of this disclosure to any particular implementation of an electronic device.

UE monitors for PDCCH addressed to P-RNTI 1 and legacy P-RNTI in its PO (820). In an embodiment, if camped cell supports paging group(s)/sub group (s) and UE supports paging groups/sub group(s), UE monitors PDCCH addressed to P-RNTI 1. Otherwise UE monitors PDCCH addressed to legacy P-RNTI.
      UE receives PDCCH addressed to P-RNTI 1 or legacy P-RNTI (830).
      Paging group/sub group ID is included in DCI/short message of PDCCH addressed to P-RNTI1.
      Paging group/sub group ID is not included in DCI/short message of PDCCH addressed to legacy P-RNTI.
      If UE receives PDCCH addressed to P-RNTI 1 (840), UE identifies whether the Paging group/sub group ID in the DCI/short message matches with UE's paging group/sub group ID (850). If UE belongs to indicated paging group/sub group (i.e. paging group/sub group ID in DCI matches with UE's paging group/sub group ID) in DCI/short message of PDCCH addressed to P-RNTI1, UE receives and decodes the TB according to the scheduling information for paging message (860). If UE does not belong to the indicated paging group/sub group (i.e. paging group ID/sub group in DCI does not match with UE's paging group/sub group ID), UE does not receive and decode the TB (855) for paging message.
      In an embodiment, One paging group/sub group ID can be reserved to indicate paging for all paging groups/sub groups. If Paging group/sub group ID in PDCCH belongs to UE's paging group/sub group or is the reserved paging group/sub group ID, UE receives and decodes the TB according to the scheduling information for paging message. Otherwise, UE does not receive and decode the TB for paging message.
      If UE receives PDCCH addressed to legacy P-RNTI, UE receives and decodes the TB for paging message (845).

Option 2: List of paging group/sub group IDs is indicated 2-1: List of Paging group/sub group IDs is optional in DCI or short message.
      UE monitors for PDCCH addressed to P-RNTI in its PO.
      UE receives PDCCH addressed to P-RNTI. DCI includes scheduling information for paging message.
      If the List of Paging group/sub group IDs is absent, UE receives and decodes the TB according to the scheduling information for paging message.
      If the List of Paging group/sub group IDs is present and UE belongs to one of the indicated paging group/sub group in the list, UE receives and decodes the TB according to the scheduling information for paging message. If the List of Paging group/sub group IDs is present and UE does not belong to one of the indicated paging group/sub group in the list, UE does not receive and decode the TB for paging message.
      In an embodiment, one paging group/sub group ID can be reserved to indicate paging for all paging groups/sub groups. If UE belongs to one of the indicated paging group/sub group in the list or the list includes reserved paging group/sub group ID, UE receives and decodes the TB according to the scheduling information for paging message. Otherwise, UE does not receive and decode the TB for paging message.

2-2: Multiple P-RNTIs can be used:
      UE monitors for PDCCH addressed to P-RNTI 1 and legacy P-RNTI in its PO. In an embodiment, if camped cell supports paging group(s)/sub group (s) and UE supports paging groups/sub groups, UE monitors PDCCH addressed to P-RNTI 1. Otherwise UE monitors PDCCH addressed to legacy P-RNTI.
      List of paging group/sub group IDs is included in DCI/short message of PDCCH addressed to P-RNTI1.

List of paging group/sub group IDs is not included in DCI/short message of PDCCH addressed to legacy P-RNTI.

If UE receives PDCCH addressed to P-RNTI 1 and if UE belongs to one of the indicated paging group/sub group in DCI/short message of PDCCH addressed to P-RNTI1, UE receives and decodes the TB according to the scheduling information for paging message. If UE does not belong to one of the indicated paging group/sub group, UE does not receive and decode the TB for paging message.

In an embodiment, one paging group/sub group ID can be reserved to indicate paging for all paging groups/sub group. If UE belongs to one of the indicated paging group/sub group in the list or the list includes reserved paging group/sub group ID, UE receives and decodes the TB according to the scheduling information for paging message. Otherwise, UE does not receive and decode the TB for paging message.

If UE receives PDCCH addressed to legacy P-RNTI, UE receives and decodes the TB for paging message.

Option 3: Paging group/sub group bitmap is included in DCI or short message 3-1: Paging group/sub group bitmap can be optional field:

Each bit in the bitmap corresponds to different paging group/sub group. The mapping between bits in bitmap and paging groups/sub groups can be pre-defined. For example, if there are P paging groups/subgroups, k=paging group/sub group ID mod P, kth most significant bit in bitmap corresponds to that paging group/sub group ID, where bits in bitmap are numbered sequentially from most significant bit to least significant bit. For example, if there are P paging groups/subgroups, k=paging group/sub group ID mod P, kth least significant bit in bitmap corresponds to that paging group/sub group ID, where bits in bitmap are numbered sequentially from least significant bit to most significant bit.

The size of bitmap can be pre-defined. The size of bitmap can also be determined based on number of paging groups/sub groups.

UE monitors for PDCCH addressed to P-RNTI in its PO.

UE receives PDCCH addressed to P-RNTI. DCI includes scheduling information for paging message.

If Paging group/sub group bitmap is absent, UE receives and decodes the TB according to the scheduling information for paging message.

If Paging group/sub group bitmap is present and bit corresponding to UE's paging group/sub group is set (i.e. equals to 1) in bitmap, UE receives and decodes the TB according to the scheduling information for paging message. If Paging group/sub group bitmap is present and bit corresponding to UE's paging group is not set (i.e. equal to 0) in bitmap, UE does not receive and decode the TB for paging message.

In an embodiment, one bit in bitmap can be reserved to indicate paging for all paging groups/sub groups. If bit corresponding to UE's paging group/sub group or bit corresponding to paging for all paging groups/sub groups is set in bitmap, UE receives and decodes the TB according to the scheduling information for paging message. Otherwise, UE does not receive and decode the TB for paging message.

3-2: Multiple P-RNTIs can be used:

UE monitors for PDCCH addressed to P-RNTI 1 and legacy P-RNTI in its PO. In an embodiment, if camped cell supports paging group(s)/sub group (s) and UE supports paging groups/sub groups, UE monitors PDCCH addressed to P-RNTI 1. Otherwise UE monitors PDCCH addressed to legacy P-RNTI.

Paging group/sub group bitmap is included in DCI/short message of PDCCH addressed to P-RNTI1.

Paging group/sub group bitmap is not included in DCI/short message of PDCCH addressed to legacy P-RNTI.

If UE receives PDCCH addressed to P-RNTI 1 and bit corresponding to UE's paging group/sub group is set (i.e. equals to 1) in bitmap in DCI/short message of PDCCH addressed to P-RNTI1, UE receives and decodes the TB according to the scheduling information for paging message. If bit corresponding to UE's paging group/sub group is not set (i.e. equals to 0) in bitmap, UE does not receive and decode the TB for paging message.

In an embodiment, one bit in bitmap can be reserved to indicate paging for all paging groups/sub group. If bit corresponding to UE's paging group/sub group or bit corresponding to paging for all paging groups/sub groups is set in bitmap, UE receives and decodes the TB according to the scheduling information for paging message. Otherwise, UE does not receive and decode the TB for paging message.

If UE receives PDCCH addressed to legacy P-RNTI, UE receives and decodes the TB for paging message.

Alternately, instead of gNB indicating paging group(s)/sub group (s) in short message or in DCI of PDCCH addressed to P-RNTI transmitted in PO, different P-RNTI can be reserved for different paging group/sub group. gNB uses PDCCH addressed to P-RNTI specific to paging group/sub group to which the UE(s) being paged belongs. UE monitors PDCCH addressed to P-RNTI corresponding to its paging group/sub group.

In an embodiment, one paging group/sub group ID or P-RNTI can be reserved to indicate paging for all paging groups/sub group. UE monitors PDCCH addressed to P-RNTI of its paging group/sub group and P-RNTI of common paging group/sub group.

Figure 9:
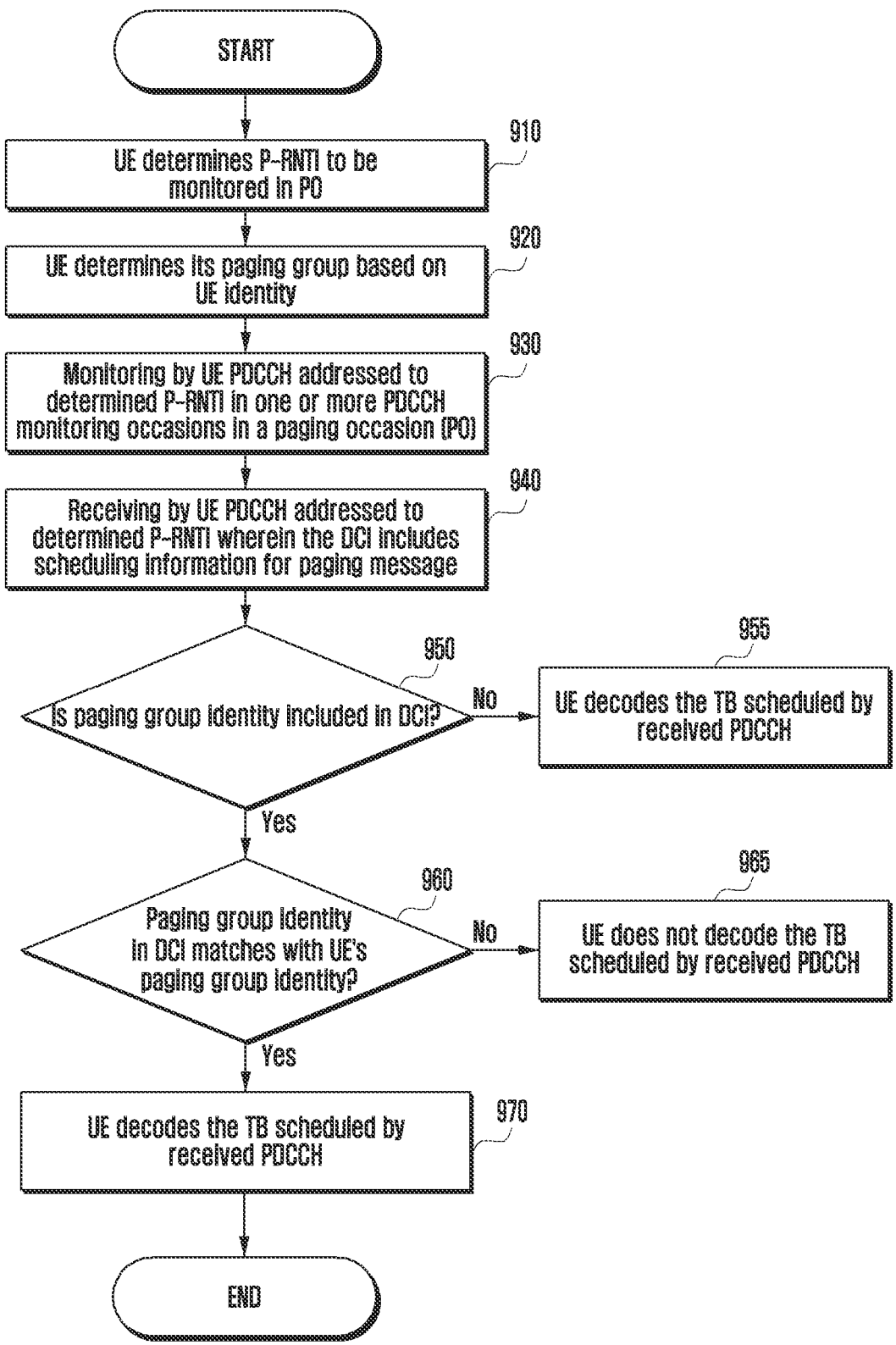
FIG. 9 illustrates an example flow of UE operation on paging grouping by itself using multiple P-RNTIs in accordance with a method of this disclosure.

Method 5 (Grouping by UE Itself, P Paging Groups/Sub Groups Per P-RNTI, Multiple P-RNTIs.):

FIG. 9 illustrates an example flow of UE operation on paging grouping by itself using multiple P-RNTIs in accordance with a method of this disclosure. The embodiment of the flow illustrated in FIG. 9 is for illustration only. FIG. 9 does not limit the scope of this disclosure to any particular implementation of an electronic device.

UEs are grouped into 'P' paging groups/sub group. The parameter 'P' can be pre-defined. The parameter 'P' can be signaled by network (e.g. gNB can signal this in paging configuration or in the BWP configuration received in system information or RRC signaling message e.g. RRCRelease message or RRCReconfiguration message).

UE determines P-RNTI to be monitored in PO based on paging configuration (910).

UE identify its paging group/sub group based on its UE ID (920). The UE ID can be one of the following:

UE_ID: 5G-S-TMSI mod 1024

UE_ID: IMSI mod 1024

UE_ID can be any other UE identity

In an embodiment, Paging group/sub group ID of UE=(UE_ID/N*Ns*R) mod P, where N is the number of paging frames, Ns is the number of POs per paging frame and R is the number of P-RNTIs used for paging. N and Ns are signaled by gNB in paging configuration. R can be pre-defined or configured by gNB. In this case paging group/sub group ID 0 can be common paging group/sub group.

UE monitors j+1th P-RNTI, where j=(UE_ID/N*Ns) mod R. For example if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.

In an embodiment, Paging group/sub group ID of UE=1+[(UE_ID/N*Ns*R) mod P], where N is the number of paging frames and Ns is the number of POs per paging frame. N and Ns are signaled by gNB in paging configuration. R is the number of P-RNTIs used for paging. In this case paging group/sub group ID 0 can be common paging group/sub group.

UE monitors j+1th P-RNTI, where j=(UE_ID/N*Ns) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.

In an alternate embodiment, Paging group/sub group ID of UE=(UE_ID/N*R) mod P, where N is the number of paging frames. N and Ns are signaled by gNB in paging configuration. In this case paging group/sub group ID P can be common paging group/sub group. R is the number of P-RNTIs used for paging UE monitors j+1th P-RNTI, where j=(UE_ID/N) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.

In an alternate embodiment, Paging group/sub group ID of UE=1+[(UE_ID/N*R) mod P], where N is the number of paging frames. N and Ns are signaled by gNB in paging configuration. In this case paging group/sub group ID 0 can be common paging group. R is the number of P-RNTIs used for paging UE monitors j+1th P-RNTI, where j=(UE_ID/N) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.

In an alternate embodiment, Paging group/sub group ID of UE=(UE_ID/R) mod P. In this case paging group/sub group ID P can be common paging group. R is the number of P-RNTIs used for paging UE monitors j+1th P-RNTI, where j=(UE_ID) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.

In an alternate embodiment, Paging group/sub group ID of UE=1+[(UE_ID/R) mod P]. In this case paging group/sub group ID 0 can be common paging group. R is the number of P-RNTIs used for paging UE monitors j+1th P-RNTI, where j=(UE_ID) mod R. For example, if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.

In an embodiment, 'N*Ns' in above equations can be replaced by 'N*Ns*M' where parameter M indicates the number of groups/sub groups into which UEs are divided for wakeup signal or early paging indication monitoring.

UE determines its PF and PO as explained earlier and monitors the determined PO (i.e. one or more PDCCH monitoring occasions of PO) (930).

In case of CN paging, CN (i.e. AMF) sends UE ID to GNB along with the paging message. GNB determines the UE's paging group/sub group in same manner as determined by UE.

In case of RAN paging, the AMF provides to the NG-RAN node the Core Network Assistance Information. The Core Network Assistance Information includes the registration area configured for the UE, the Periodic Registration Update timer, and the UE Identity Index value (UE_ID), etc. GNB determines the UE's paging group/sub group in same manner as determined by UE.

gNB indicates paging group(s)/sub group (s) in short message or in DCI of PDCCH addressed to P-RNTI transmitted in PO (940). The paging group(s)/sub group (s) can be indicated in one of the following ways:

Option 1: Only one paging group/sub group ID is indicated (UE operation is shown in FIG. 9)

1-1: Paging group/sub group ID can be an optional field in DCI or short message.

UE monitors for PDCCH addressed to P-RNTI (as determined above) in its PO (930).

UE receives PDCCH addressed to P-RNTI (940). DCI includes scheduling information for paging message. After receiving the PDCCH addressed to P-RNTI, UE identifies whether a Paging group/sub group ID is included in the DCI (950).

If Paging group/sub group ID is absent, UE receives and decodes the TB according to the scheduling information for paging message (955).

If Paging group/sub group ID is present, UE identifies whether the Paging group ID in the DCI matches with UE's paging group ID (960). If UE belongs to the indicated paging group/sub group (i.e. paging group/sub group ID in DCI matches with UE's paging group/sub group ID), UE receives and decodes the TB according to the scheduling information for paging message (970). If Paging group/sub group ID is present and UE does not belong to the indicated paging group/sub group (i.e. paging group/sub group ID in DCI does not match with UE's paging group/sub group ID), UE does not receive and decode the TB (965).

In an embodiment, one paging group/sub group ID can be reserved to indicate paging for all paging groups/sub groups. If Paging group/sub group ID in PDCCH belongs to UE's paging group/sub group or is the reserved paging group/sub group ID, UE receives and decodes the TB according to the scheduling information for paging message. Otherwise, UE does not receive and decode the TB.

Option 2: List of paging group/sub group IDs is indicated
  2-1: List of Paging group/sub group IDs is optional in DCI or short message.
    UE monitors for PDCCH addressed to P-RNTI (determined above) in its PO.
    UE receives PDCCH addressed to P-RNTI. DCI includes scheduling information for paging message.
    If the List of Paging group/sub group IDs is absent, UE decodes the TB according to the scheduling information for paging message.
    If the List of Paging group/sub group IDs is present and UE belongs to one of the indicated paging group/sub group in the list, UE receives and decodes the TB according to the scheduling information for paging message. If the List of Paging group/sub group IDs is present and UE does not belong to one of the indicated paging group/sub group in the list, UE does not receive and decode the TB for paging message.
      In an embodiment, one paging group/sub group ID can be reserved to indicate paging for all paging groups/sub group. If UE belongs to one of the indicated paging group/sub group in the list or the list includes reserved paging group/sub group ID, UE receives and decodes the TB according to the scheduling information for paging message. Otherwise, UE does not receive and decode the TB for paging message Option 3: Paging group/sub group bitmap is included in DCI or short message
  3-1: Paging group/sub group bitmap can be optional field:
    Each bit in the bitmap corresponds to different paging group/sub group. The mapping between bits in bitmap and paging groups/sub groups can be pre-defined.
    The size of bitmap can be pre-defined. The size of bitmap can also be determined based on number of paging groups/sub group.
    UE monitors for PDCCH addressed to P-RNTI (as determined above) in its PO.
    UE receives PDCCH addressed to P-RNTI. DCI includes scheduling information for paging message.
    If Paging group/sub group bitmap is absent, UE decodes the TB according to the scheduling information for paging message.
    If Paging group/sub group bitmap is present and bit corresponding to UE's paging group/sub group is set (i.e. equals to 1) in bitmap, UE receives and decodes the TB according to the scheduling information for paging message. If Paging group/sub group bitmap is present and bit corresponding to UE's paging group/sub group is not set (i.e. equal to 0) in bitmap, UE does not receive and decode the TB for paging message.
      In an embodiment, one bit in bitmap can be reserved to indicate paging for all paging groups/sub groups. If bit corresponding to UE's paging group/sub group or bit corresponding to paging for all paging groups/sub groups is set (i.e. equals to 1) in bitmap, UE receives and decodes the TB according to the scheduling information for paging message. Otherwise, UE does not receive and decode the TB for paging message.

Method 6:
  Group the UEs into 'P' paging groups/sub groups (Grouping mechanism can be as described in method 1, or method 2, or method 3 or method 4 or method 5)
  POs in DRX cycle are distributed amongst the paging groups/sub groups
  Number of POs in DRX cycle=X=N*Ns, N is number of PFs, Ns is number of POs per PF.
  Number of POs per paging group/sub group=Y=X/P
  ith PO in DRX cycle belongs to 'i mod P'th paging group/sub group, wherein each PO in DRX cycle is sequentially indexed
  POs belonging to same paging group/sub group are then distributed to UEs based on UE ID
  UE's PO is the PO with index 'i' where I=UE's paging group/sub group id+P*(UE ID mod Y)
  Example
    X=8 POs in DRX cycle; P=4; Y=2
    Paging group/sub group 0: POs with index 0, 4 (0 for UE ID mod Y=0, 4 for UE ID mod Y=1)
    Paging group/sub group 1: POs with index 1, 5 (1 for UE ID mod Y=0, 5 for UE ID mod Y=1)
    Paging group/sub group 2: POs with index 2, 6 (2 for UE ID mod Y=0, 6 for UE ID mod Y=1)
    Paging group/sub group 3: POs with index 3, 7 (3 for UE ID mod Y=0, 7 for UE ID mod Y=1)
  UE monitors the determined PO.
  (Alternate)
    Group the UEs into 'P' paging groups/sub groups (Grouping mechanism can be as described in method 1, or method 2, or method 3 or method 4 or method 5)
    POs in DRX cycle are distributed amongst the paging groups/sub groups
    Number of POs in DRX cycle=X=N*Ns, N is number of PFs, Ns is number of POs per PF.
    Number of POs per paging group/sub group=Y=X/P
    Y POs starting from (paging group/sub group id 'Q' *P)th PO in DRX cycle belongs to paging group/sub group id Q; each PO in DRX cycle is sequentially indexed
    POs belonging to same paging group/sub group are then distributed to UEs based on UE ID
    UE's PO is the PO with index 'i' where i=P*UE's paging group/sub group id+UE ID mod Y Method 7:
  UE receives wakeup signal or early paging indication configuration from gNB for paging monitoring. Configuration can be received in system information or RRC signaling message. In an embodiment, the configuration is cell specific and UE applies the configuration to DL BWP in which UE monitors paging (e.g. the DL BWP is initial DL BWP when UE is in RRC IDLE or RRC_INACTIVE state). In an embodiment, the configuration is BWP specific i.e. separate configuration is provided for each BWP in which paging is supported. In an embodiment, the configuration is provided only for initial DL BWP and UE uses it for receiving wakeup signal or early paging indication in initial DL BWP. In this case UE does not monitor wakeup signal or early paging indication in other DL BWPs. The configuration indicates the time occasions (or wakeup signal monitoring occasions or early paging indication monitoring occasions) and/or frequency domain resources (i.e. PRBs). The time occasion can be in units of symbols or slots. If wakeup signal or early paging indication is sequence based, configuration indicates the wakeup signal or early paging indication sequence(s)

information used for wakeup signal or early paging indication transmission/reception by gNB/UE respectively. The length of one wakeup signal or early paging indication monitoring occasion in number of OFDM symbols, number of wakeup signal or early paging indication monitoring occasions per slot, number of slots carrying wakeup signal or early paging indication monitoring occasions, offset of first slot carrying wakeup signal or early paging indication monitoring occasions where offset is with respect to start of the PF or the start of PO. Note that wakeup signal or early paging indication precedes the PF/PO. In an embodiment wakeup signal or early paging indication can be a PDCCH addressed to pre-defined RNTI or an RNTI signaled by gNB for early paging indication. In this case the wakeup signal monitoring occasion or early paging indication monitoring occasions can also be referred as PDCCH monitoring occasions for early paging indication. The PDCCH monitoring occasions for early paging indication can be indicated by search space parameters. A list of search space configurations can be signaled by GNB. The search configuration to be used to determine the PDCCH monitoring occasions for early paging indication can be signaled by gNB. gNB can indicate search space ID of search space configuration to be used to determine the PDCCH monitoring occasions for early paging indication.

In an embodiment, there can be a set of one or more wakeup signal monitoring occasions or early paging indication monitoring occasions or PDCCH monitoring occasions for early paging indication. UE monitors wakeup signal or paging early indication or PDCCH for early paging indication in this set of monitoring occasions. Each wakeup signal monitoring occasion or early paging indication monitoring occasion or PDCCH monitoring occasion for early paging indication in the set is associated with an SSB. This set can be per paging frame or per paging occasion. If the set is per paging frame, UEs belonging to different PO of the paging frame will monitor same set of wakeup signal monitoring occasions or early paging indication monitoring occasions or PDCCH monitoring occasions for early paging indication. If the set is per PO, UEs belonging to different PO of the paging frame monitor different set of wakeup signal monitoring occasions or early paging indication monitoring occasions or PDCCH monitoring occasions for early paging indication. Depending on the configuration it is possible several POs or PFs may have the same set of monitoring occasions for wakeup signal or early paging indication or for PDCCH of early paging indication.

In an embodiment, the set of wakeup signal monitoring occasions or early paging indication monitoring occasions or PDCCH monitoring occasions for early paging indication consists of 'S*X' monitoring occasions. Parameter S and X are signaled by gNB. S is the number of transmitted SSBs and X is the number of monitoring occasions per SSB. If X is not signaled, X is assumed to be 1. In an embodiment, 'S' is the number of actual transmitted SSBs determined according to parameter ssb-PositionsInBurst signalled in SystemInformationBlock1 received from gNB. The SSBs are sequentially mapped to 'S*X' monitoring occasions such that each SSB is mapped to a 'X" monitoring occasions sequentially. For example, if there are 4 SSB and X equals 2, first two monitoring occasions in set are mapped to first transmitted SSB, next two monitoring occasions in set are mapped to $2^{nd}$ transmitted SSB, next two monitoring occasions in set are mapped to $3^{rd}$ transmitted SSB and so on.

In another embodiment, the set of wakeup signal monitoring occasions or early paging indication monitoring occasions or PDCCH monitoring occasions for early paging indication consists of 'S' monitoring occasions. Parameter S is signaled by gNB. S is the number of transmitted SSBs. In an embodiment, 'S' is the number of actual transmitted SSBs determined according to parameter ssb-PositionsInBurst signalled in SystemInformationBlock1 received from gNB. Each transmitted SSB is sequentially mapped to these monitoring occasions in ascending order of SSB index.

The monitoring occasions overlapping with UL symbols are considered invalid. UE can identify the UL symbols based on TDD configuration received from gNB. TDD configuration can be determined according to tdd-UL-DL-ConfigurationCommon received from gNB in system information. UE identifies its set of wakeup signal monitoring occasions or early paging indication monitoring occasions or PDCCH monitoring occasions for early paging indication from the valid monitoring occasions. In the subsequent description, monitoring occasions refer to valid monitoring occasions.

In an embodiment, the monitoring occasions starting from the slot which is at an 'offset' before the start of PF (or PO in another embodiment) and in between this slot and start of PF (or PO in another embodiment) are sequentially numbered/indexed. The 'S*X' or 'S' monitoring occasions in ascending order are then used for monitoring wakeup signal or early paging indication or PDCCH for early paging indication.

FIG. 10-17 illustrate various examples of set of monitoring occasions in accordance with methods of this disclosure. The examples illustrated in FIG. 10-17 are for illustration only. FIG. 10-17 does not limit the scope of this disclosure to any particular implementation of an electronic device.

Figure 10:
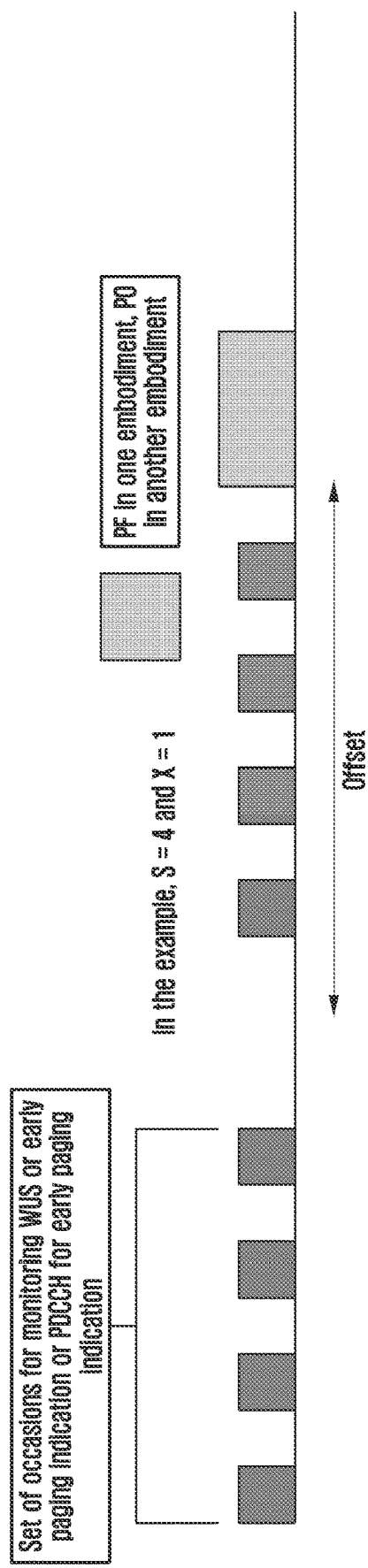
FIG. 10 illustrates an example of set of monitoring occasions in accordance with methods of this disclosure.

In an embodiment (as shown in FIG. 10) earliest set of 'S*X' valid monitoring occasions which is at an offset before the PF (in one embodiment) or PO (in another embodiment) are the monitoring occasions for monitoring wakeup signal or early paging indication or PDCCH for early paging indication. In an embodiment X is always 1.

Figure 11:
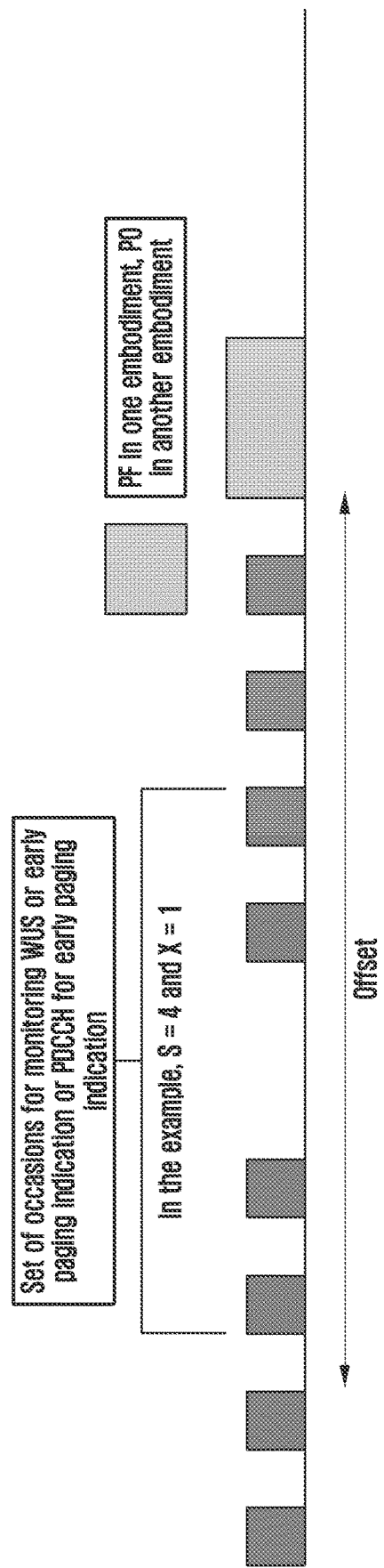
FIG. 11 illustrates an example of set of monitoring occasions in accordance with methods of this disclosure.

In an embodiment (as shown in FIG. 11) earliest set of 'S*X' valid monitoring occasions where the first monitoring occasion starts after an offset before the PF (in one embodiment) or PO (in another embodiment) are the monitoring occasions for monitoring wakeup signal or early paging indication or PDCCH for early paging indication. In an embodiment X is always 1.

Figure 12:
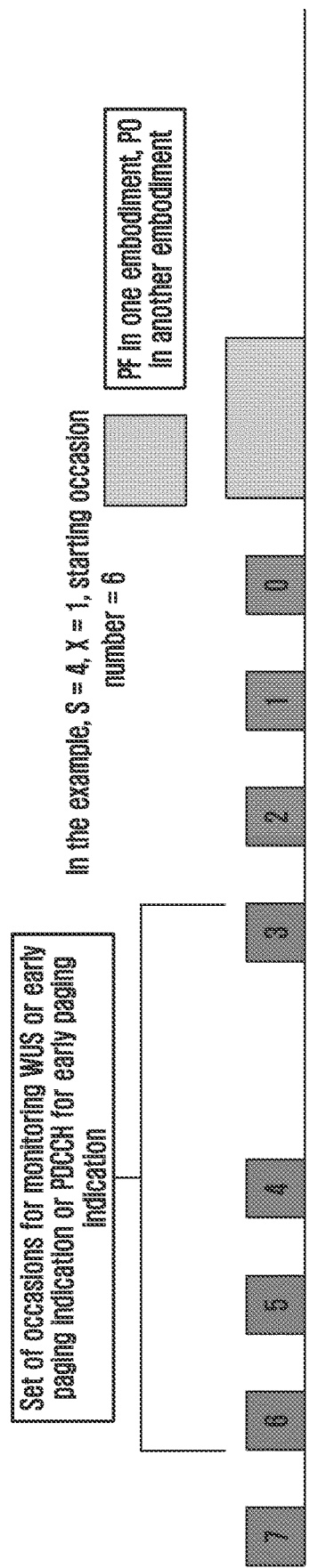
FIG. 12 illustrates an example of set of monitoring occasions in accordance with methods of this disclosure.

In another embodiment (as shown in FIG. 12), valid monitoring occasions before the PF (in one embodiment) or PO (in another embodiment) are sequentially numbered/indexed. A first occasion number is signaled by gNB. In case monitoring is per PO, starting occasion number is signaled for each PO of a PF. The earliest set of 'S*X' valid monitoring occasions from first occasion are the monitoring occasions for monitoring wakeup signal or early paging indication or PDCCH for early paging indication.

Figure 13:
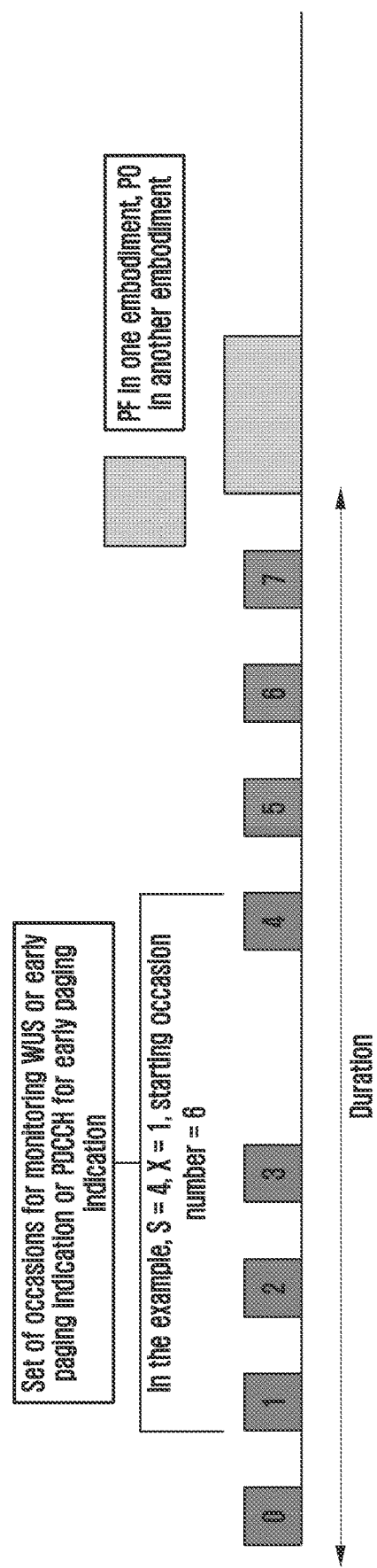
FIG. 13 illustrates an example of set of monitoring occasions in accordance with methods of this disclosure.

In another embodiment (as shown in FIG. 13), valid monitoring occasions before the PF (in one embodiment) or PO (in another embodiment) within a timer interval (duration) are sequentially numbered/indexed. A first occasion number is signaled by gNB. In case monitoring is per PO, starting occasion number is signaled for each PO of a PF. The earliest set of 'S*X' monitoring occasions from first occasion are the monitoring occasions for monitoring wakeup signal or early paging indication or PDCCH for early paging indication. The timer interval duration can be signaled by gNB or it can be timer interval between two PFs or it can be equal to SSB period or it can be equal to multiple of SSB period where SSB period is signaled by gNB.

Figure 14:
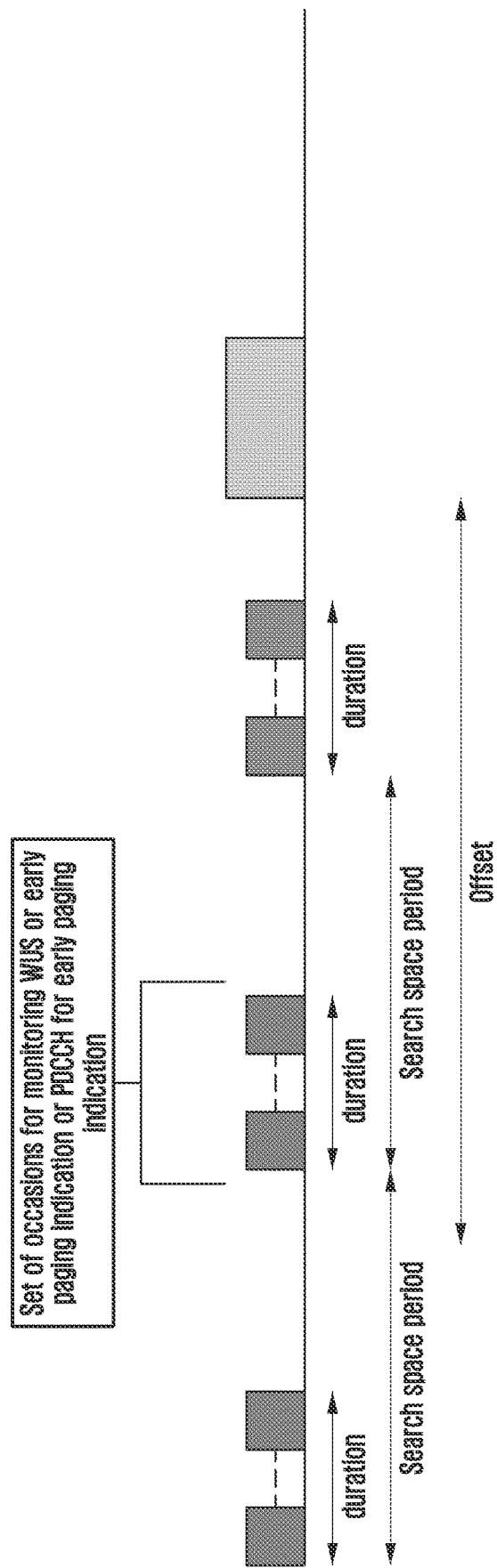
FIG. 14 illustrates an example of set of monitoring occasions in accordance with methods of this disclosure.
Figure 15:
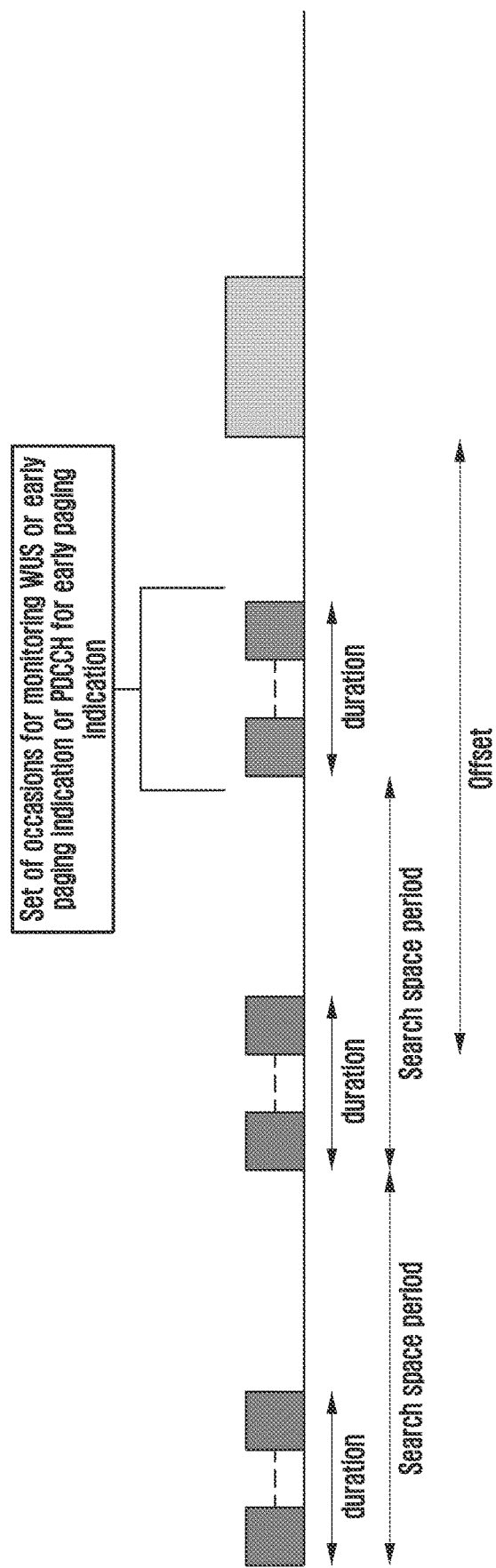
FIG. 15 illustrates an example of set of monitoring occasions in accordance with methods of this disclosure.

In another embodiment (as shown in FIG. 14 or FIG. 15), monitoring occasions for monitoring wakeup signal or early paging indication or PDCCH for early paging indication are the valid monitoring occasions in first 'duration' slots after an offset before the PF (in one embodiment) or PO (in another embodiment). Monitoring occasions according to search space occurs for duration slots periodically where duration and period are configured in search space configuration.

In another embodiment, monitoring occasions for monitoring wakeup signal or early paging indication or PDCCH for early paging indication are the 'S*X' consecutive valid monitoring occasions starting from first 'duration' slots after an offset before the PF (in one embodiment) or PO (in another embodiment). Monitoring occasions according to search space occurs for duration slots periodically where duration and period are configured in search space configuration.

Figure 16:
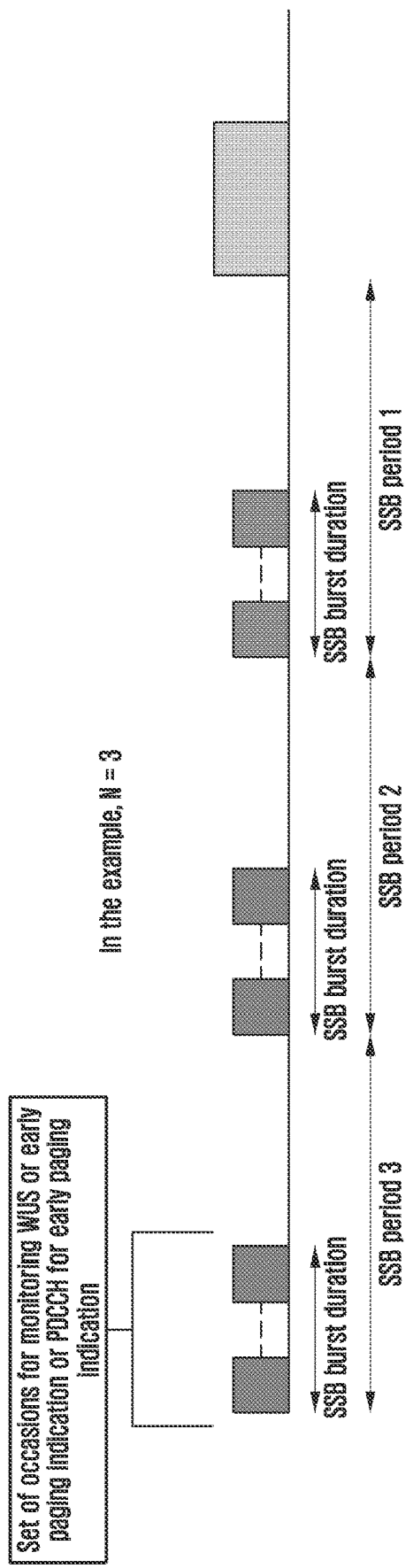
FIG. 16 illustrates an example of set of monitoring occasions in accordance with methods of this disclosure.
Figure 17:
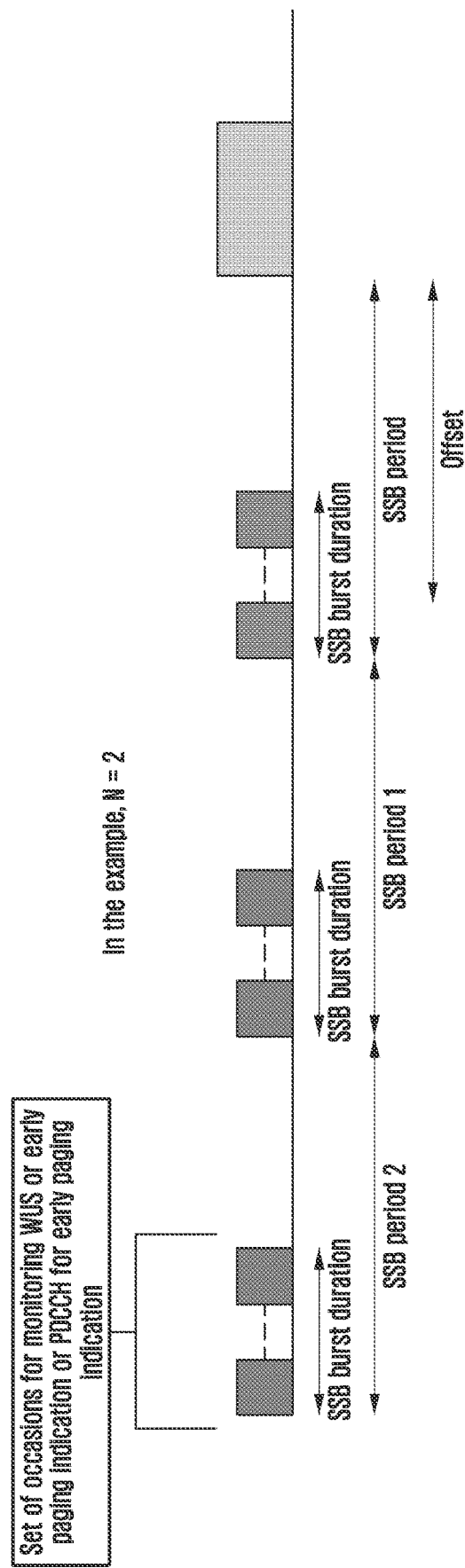
FIG. 17 illustrates an example of set of monitoring occasions in accordance with methods of this disclosure.

In another embodiment, monitoring occasion for wakeup signal or early paging indication or PDCCH for early paging indication is same as the occasions where SSBs are transmitted in time domain. In frequency domain the PRBs for monitoring occasions are FDMed with SSB PRBs. The exact PRBs are signaled for monitoring occasions are signaled by gNB. UE monitors wakeup signal or early paging indication or PDCCH for early paging indication in the monitoring occasions of Nth SSB period before the start of PF (in one embodiment) or PO (in another embodiment) as shown in FIG. 16. N can be pre-defined or signaled by gNB. Alternately, UE monitors wakeup signal or early paging indication or PDCCH for early paging indication in the monitoring occasions of Nth SSB period after an offset before the start of PF (in one embodiment) or PO (in another embodiment) as shown in FIG. 17. N can be pre-defined or signaled by gNB.

UE also receives the paging configuration from gNB and determines its PF/PO as explained earlier every DRX cycle.

UE determines the Wakeup signal occasion(s) or early paging indication monitoring occasions or PDCCH monitoring occasions for early paging indication corresponding to its determined PF/PO. If the wakeup signal is detected or early paging indication is received or PDCCH for early paging indication is received in determined monitoring occasions, UE monitor its PO or UE monitors the PDCCH addressed to P-RNTI in its PO. Otherwise UE does not monitor the PO. This operation is performed by UE for its PO every DRX cycle.

Method 8:

UE receives wakeup signal or early paging indication configuration from gNB for paging monitoring. Configuration can be received in system information or RRC signaling message. In an embodiment, the configuration is cell specific and UE applies the configuration to DL BWP in which UE monitors paging (e.g. the DL BWP is initial DL BWP when UE is in RRC IDLE or RRC_INACTIVE state). In an embodiment, the configuration is BWP specific i.e. separate configuration is provided for each BWP in which paging is supported. In an embodiment, the configuration is provided only for initial DL BWP and UE uses it for receiving wakeup signal or early paging indication in initial DL BWP. In this case UE does not monitor wakeup signal or early paging indication in other DL BWPs. The configuration indicates the time occasions (or wakeup signal monitoring occasions or early paging indication monitoring occasions) and/or frequency domain resources (i.e. PRBs). If wakeup signal or early paging indication is sequence based, configuration indicates the wakeup signal or early paging indication sequence(s) information used for wakeup signal or early paging indication transmission/reception by gNB/UE respectively. The length of one wakeup signal or early paging indication monitoring occasion in number of OFDM symbols, number of wakeup signal or early paging indication monitoring occasions per slot, number of slots carrying wakeup signal or early paging indication monitoring occasions, offset of first slot carrying wakeup signal or early paging indication monitoring occasions where offset is with respect to start of the PF or the start of PO. Note that wakeup signal or early paging indication precedes the PF/PO. In an embodiment wakeup signal or early paging indication can be a PDCCH addressed to pre-defined RNTI or an RNTI signaled by gNB for early paging indication. In this case the wakeup signal monitoring occasion or early paging indication monitoring occasions can also be referred as PDCCH monitoring occasions for early paging indication. The PDCCH monitoring occasions for early paging indication or wakeup signal can be indicated by search space parameters. A list of search space configurations can be signaled by GNB. The search configuration to be used for the PDCCH monitoring occasions for early paging indication can be signaled by gNB. gNB can indicate search space ID of search space configuration to be used for the PDCCH monitoring occasions for early paging indication.

In an embodiment, there can be a set of one or more wakeup signal monitoring occasions or early paging indication monitoring occasions or PDCCH monitoring occasions for early paging indication. UE monitors wakeup signal or paging early indication or PDCCH for early paging indication in this set of monitoring occasions. Each wakeup signal monitoring occasion or early paging indication monitoring occasion or PDCCH monitoring occasion for early paging indication in the set is associated with an SSB. This set can be per paging frame or per paging occasion. If the set is per paging frame, UEs belonging to different PO of the paging frame will monitor same set of wakeup signal monitoring occasions or early paging indication monitoring occasions or PDCCH monitoring occasions for early paging indication. If the set is per PO, UEs belonging to different PO of the paging frame monitor different set of wakeup signal monitoring occasions or early paging indication monitoring occasions or PDCCH monitoring occasions for early paging indication. Depending on the configuration it is possible several POs or PFs may have the same set of monitoring occasions for wakeup signal or early paging indication or for PDCCH of early paging indication.

In an embodiment, the set of wakeup signal monitoring occasions or early paging indication monitoring occasions or PDCCH monitoring occasions for early paging indication consists of 'S*X' monitoring occasions. Parameter S and X are signaled by gNB. S is the number of transmitted SSBs and X is the number of monitoring occasion per SSB. If X is not signaled, X is assumed to be 1. In an embodiment, 'S' is the number of actual transmitted SSBs determined according to parameter ssb-PositionsInBurst signalled in SystemInformationBlock1 received from gNB. The SSBs are sequentially mapped to 'S*X' monitoring occasions such that each SSB is mapped to a subset of 'X" monitoring occasions sequentially. For example, if there are 4 SSB and X equals 2, first two monitoring occasions in set are mapped to first transmitted SSB, next two monitoring occasions in set are mapped to $2^{nd}$ transmitted SSB, next two monitoring occasions in set are mapped to $3^{rd}$ transmitted SSB and so on.

In another embodiment, the set of wakeup signal monitoring occasions or early paging indication monitoring occasions or PDCCH monitoring occasions for early paging indication consists of 'S' monitoring occasions. Parameter S is signaled by gNB. S is the number of transmitted SSBs. In an embodiment, 'S' is the number of actual transmitted SSBs determined according to parameter ssb-PositionsInBurst signalled in SystemInformationBlock1 received from gNB. Each transmitted SSB is sequentially mapped to these monitoring occasions in ascending order of SSB index.

The monitoring occasions overlapping with UL symbols are considered invalid. UE can identify the UL symbols based TDD configuration received from gNB. TDD configuration can be determined according to tdd-UL-DL-ConfigurationCommon received from gNB in system information. UE identifies its set of wakeup signal monitoring occasions or early paging indication monitoring occasions or PDCCH monitoring occasions for early paging indication from the valid monitoring occasions.

In an embodiment, the valid wakeup signal monitoring occasions starting from the slot which is at an 'offset' before the start of PF (or PO in another embodiment) and in between this slot and start of PF (or PO in another embodiment) are sequentially numbered/indexed. The 'S*X' or 'S' monitoring occasions in ascending order are then used for monitoring wakeup signal or early paging indication or PDCCH for early paging indication.

In an embodiment (as shown in FIG. 10) earliest set of 'S*X' valid monitoring occasions which is at an offset before the PF (in one embodiment) or PO (in another embodiment) are the monitoring occasions for monitoring wakeup signal or early paging indication or PDCCH for early paging indication. In an embodiment X is always 1.

In an embodiment (as shown in FIG. 11) earliest set of 'S*X' valid monitoring occasions where the first monitoring occasion starts after an offset before the PF (in one embodiment) or PO (in another embodiment) are the monitoring occasions for monitoring wakeup signal or early paging indication or PDCCH for early paging indication. In an embodiment X is always 1.

In another embodiment (as shown in FIG. 12), valid monitoring occasions before the PF (in one embodiment) or PO (in another embodiment) are sequentially numbered/indexed. first occasion number is signaled by gNB. In case monitoring is per PO, starting occasion number is signaled for each PO of a PF. The earliest set of 'S*X' monitoring occasions from first occasion are the monitoring occasions for monitoring wakeup signal or early paging indication or PDCCH for early paging indication.

In another embodiment (as shown in FIG. 13), valid monitoring occasions before the PF (in one embodiment) or PO (in another embodiment) within a timer interval (duration) are sequentially numbered/indexed. first occasion number is signaled by gNB. In case monitoring is per PO, starting occasion number is signaled for each PO of a PF. The earliest set of 'S*X' monitoring occasions from first occasion are the monitoring occasions for monitoring wakeup signal or early paging indication or PDCCH for early paging indication. The timer interval duration can be signaled by gNB or it can be timer interval between two PFs or it can be equal to SSB period or it can be equal to multiple of SSB period where SSB period is signaled by gNB.

In another embodiment (as shown in FIG. 14 or FIG. 15), monitoring occasions for monitoring wakeup signal or early paging indication or PDCCH for early paging indication are the valid monitoring occasions in first 'duration' slots after an offset before the PF (in one embodiment) or PO (in another embodiment). Monitoring occasions according to search space occurs for duration slots periodically where duration and period are configured in search space configuration.

In another embodiment, monitoring occasions for monitoring wakeup signal or early paging indication or PDCCH for early paging indication are the 'S*X' consecutive valid monitoring occasions starting from first 'duration' slots after an offset before the PF (in one embodiment) or PO (in another embodiment). Monitoring occasions according to search space occurs for duration slots periodically where duration and period are configured in search space configuration.

In another embodiment, monitoring occasion for wakeup signal or early paging indication or PDCCH for early paging indication is same as the occasions where SSBs are transmitted in time domain. In frequency domain the PRBs for monitoring occasions are FDMed with SSB PRBs. The exact PRBs are signaled for monitoring occasions are signaled by gNB. UE monitors wakeup signal or early paging indication or PDCCH for early paging indication in the monitoring occasions of Nth SSB period before the start of PF (in one embodiment) or PO (in another embodiment) as shown in FIG. 16. N can be pre-defined or signaled by gNB. Alternately, UE monitors wakeup signal or early paging indication or PDCCH for early paging indication in the monitoring occasions of Nth SSB period after an offset before the start of PF (in one embodiment) or PO (in another embodiment) as shown in FIG. 17. N can be pre-defined or signaled by gNB.

UE also receives the paging configuration from gNB and determines its PF/PO as explained earlier every DRX cycle.

UE determines the Wakeup signal occasion(s) or early paging indication monitoring occasions or PDCCH monitoring occasions for early paging indication corresponding to its determined PF/PO. If the wakeup signal is detected or early paging indication is received or PDCCH for early paging indication is received in determined monitoring occasions, UE monitor its PO or UE monitors the PDCCH addressed to P-RNTI in its PO. Otherwise UE does not monitor the PO. This operation is performed by UE for its PO every DRX cycle.

Paging transmission/reception by gNB/UE in PO follows the operation in Method 1 or method 2 or method 3 or method 4 or method 5.

Method 9:

UE receives wakeup signal or early paging indication configuration from gNB for paging monitoring. Configuration can be received in system information or RRC signaling message. In an embodiment, the configuration is cell specific and UE applies the configuration to DL BWP in which UE monitors paging (e.g. the DL BWP is initial DL BWP when UE is in RRC IDLE or RRC_INACTIVE state). In an embodiment, the configuration is BWP specific i.e. separate configuration is provided for each BWP in which paging is supported. In an embodiment, the configuration is provided only for initial DL BWP and UE uses it for receiving wakeup signal or early paging indication in initial DL BWP. In this case UE does not monitor wakeup signal or early paging indication in other DL BWPs. The configuration indicates the time occasions (or wakeup signal monitoring occasions or early paging indication monitoring occasions) and/or frequency domain resources (i.e. PRBs). If wakeup signal or early paging indication is sequence based, configuration indicates the wakeup signal or early paging indication sequence(s) information used for wakeup signal or early paging indication transmission/reception by gNB/UE respectively. The length of one wakeup signal or early paging indication monitoring occasion in number of OFDM symbols, number of wakeup signal or early paging indication monitoring occasions per slot, number of slots carrying wakeup signal or early paging indication monitoring occasions, offset of first slot carrying wakeup signal or early paging indication monitoring occasions where offset is with respect to start of the PF or the start of PO. Note that wakeup signal or early paging indication precedes the PF/PO. In an embodiment wakeup signal or early paging indication can be a PDCCH addressed to pre-defined RNTI or an RNTI signaled by gNB for early paging indication. In this case the wakeup signal monitoring occasion or early paging indication monitoring occasions can also be referred as PDCCH monitoring occasions for early paging indication. The PDCCH monitoring occasions for early paging indication can be indicated by search space parameters. A list of search space configurations can be signaled by GNB. The search configuration to be used for the PDCCH monitoring occasions for early paging indication can be signaled by gNB. gNB can indicate search space ID of search space configuration to be used for the PDCCH monitoring occasions for early paging indication.

In an embodiment, there can be a set of one or more wakeup signal monitoring occasions or early paging indication monitoring occasions or PDCCH monitoring occasions for early paging indication. UE monitors wakeup signal or paging early indication or PDCCH for early paging indication in this set of monitoring occasions. Each wakeup signal monitoring occasion or early paging indication monitoring occasion or PDCCH monitoring occasion for early paging indication in the set is associated with an SSB. This set can be per paging frame or per paging occasion. If the set is per paging frame, UEs belonging to different PO of the paging frame will monitor same set of wakeup signal monitoring occasions or early paging indication monitoring occasions or PDCCH monitoring occasions for early paging indication. If the set is per PO, UEs belonging to different PO of the paging frame monitor different set of wakeup signal monitoring occasions or early paging indication monitoring occasions or PDCCH monitoring occasions for early paging indication. Depending on the configuration it is possible several POs or PFs may have the same set of monitoring occasions for wakeup signal or early paging indication or for PDCCH of early paging indication.

In an embodiment, the set of wakeup signal monitoring occasions or early paging indication monitoring occasions or PDCCH monitoring occasions for early paging indication consists of 'S*X' monitoring occasions. Parameter S and X are signaled by gNB. S is the number of transmitted SSBs and X is the number of monitoring occasion per SSB. If X is not signaled, X is assumed to be 1. In an embodiment, 'S' is the number of actual transmitted SSBs determined according to parameter ssb-PositionsInBurst signaled in SystemInformationBlock1 received from gNB. The SSBs are sequentially mapped to 'S*X' monitoring occasions such that each SSB is mapped to a subset of 'X' monitoring occasions sequentially. For example, if there are 4 SSB and X equals 2, first two monitoring occasions in set are mapped to first transmitted SSB, next two monitoring occasions in set are mapped to $2^{nd}$ transmitted SSB, next two monitoring occasions in set are mapped to $3^{rd}$ transmitted SSB and so on.

In another embodiment, the set of wakeup signal monitoring occasions or early paging indication monitoring occasions or PDCCH monitoring occasions for early paging indication consists of 'S' monitoring occasions. Parameter S is signaled by gNB. S is the number of transmitted SSBs. In an embodiment, 'S' is the number of actual transmitted SSBs determined according to parameter ssb-PositionsInBurst signaled in SystemInformationBlock1 received from gNB. Each transmitted SSB is sequentially mapped to these monitoring occasions in ascending order of SSB index.

The monitoring occasions overlapping with UL symbols are considered invalid. UE can identify the UL symbols based TDD configuration received from gNB. TDD configuration can be determined according to tdd-UL-DL-ConfigurationCommon received from gNB in system information. UE identifies its set of wakeup signal monitoring occasions or early paging indication monitoring occasions or PDCCH monitoring occasions for early paging indication from the valid monitoring occasions.

In an embodiment, the valid wakeup signal monitoring occasions starting from the slot which is at an 'offset' before the start of PF (or PO in another embodiment) and in between this slot and start of PF (or PO in another embodiment) are sequentially numbered/indexed. The 'S*X' or 'S' monitoring occasions in ascending order are then used for monitoring wakeup signal or early paging indication or PDCCH for early paging indication.

In an embodiment (as shown in FIG. 10) earliest set of 'S*X' valid monitoring occasions which is at an offset before the PF (in one embodiment) or PO (in another embodiment) are the monitoring occasions for monitoring wakeup signal or early paging indication or PDCCH for early paging indication. In an embodiment X is always 1.

In an embodiment (as shown in FIG. 11) earliest set of 'S*X' valid monitoring occasions where the first monitoring occasion starts after an offset before the PF (in one embodiment) or PO (in another embodiment) are the monitoring occasions for monitoring wakeup signal or early paging indication or PDCCH for early paging indication. In an embodiment X is always 1.

In another embodiment (as shown in FIG. 12), valid monitoring occasions before the PF (in one embodiment) or PO (in another embodiment) are sequentially numbered/indexed. first occasion number is signaled by gNB. In case monitoring is per PO, starting occasion number is signaled for each PO of a PF. The earliest set of 'S*X' monitoring occasions from first occasion are the monitoring occasions for monitoring wakeup signal or early paging indication or PDCCH for early paging indication.

In another embodiment (as shown in FIG. 13), valid monitoring occasions before the PF (in one embodiment) or PO (in another embodiment) within a timer interval (duration) are sequentially numbered/indexed. first occasion number is signaled by gNB. In case monitoring is per PO, starting occasion number is signaled for each PO of a PF. The earliest set of 'S*X' monitoring occasions from first occasion are the monitoring occasions for monitoring wakeup signal or early paging indication or PDCCH for early paging indication. The timer interval duration can be signaled by gNB or it can be timer interval between two PFs or it can be equal to SSB period or it can be equal to multiple of SSB period where SSB period is signaled by gNB.

In another embodiment (as shown in FIG. 14 or FIG. 15), monitoring occasions for monitoring wakeup signal or early paging indication or PDCCH for early paging indication are the valid monitoring occasions in first 'duration' slots after an offset before the PF (in one embodiment) or PO (in another embodiment). Monitoring occasions according to search space occurs for duration slots periodically where duration and period are configured in search space configuration.

In another embodiment, monitoring occasions for monitoring wakeup signal or early paging indication or PDCCH for early paging indication are the 'S*X' consecutive valid monitoring occasions starting from first 'duration' slots after an offset before the PF (in one embodiment) or PO (in another embodiment). Monitoring occasions according to search space occurs for duration slots periodically where duration and period are configured in search space configuration.

In another embodiment, monitoring occasion for wakeup signal or early paging indication or PDCCH for early paging indication is same as the occasions where SSBs are transmitted in time domain. In frequency domain the PRBs for monitoring occasions are FDMed with SSB PRBs. The exact PRBs are signaled for monitoring occasions are signaled by gNB. UE monitors wakeup signal or early paging indication or PDCCH for early paging indication in the monitoring occasions of Nth SSB period before the start of PF (in one embodiment) or PO (in another embodiment) as shown in FIG. 16. N can be pre-defined or signaled by gNB. Alternately, UE monitors wakeup signal or early paging indication or PDCCH for early paging indication in the monitoring occasions of Nth SSB period after an offset before the start of PF (in one embodiment) or PO (in another embodiment) as shown in FIG. 17. N can be pre-defined or signaled by gNB.

Multiple monitoring occasions for wakeup signal or early paging indication or PDCCH for early paging indication can also be frequency division multiplexed in frequency domain. All FDMed monitoring occasions can be associated with same SSB.

In an embodiment, wakeup signal monitoring occasions (or early paging indication monitoring occasions or PDCCH monitoring occasions for early paging indication and/or sequences are further mapped to wake up signal monitoring groups (can also be referred as paging group/sub group or early paging indication group/sub group).

UE receives the paging configuration from gNB and determines its PF/PO as explained earlier every DRX cycle.

UE determines the Wakeup signal monitoring occasion(s) or early paging indication monitoring occasions or PDCCH monitoring occasions for early paging indication corresponding to its determined PF/PO.

In an embodiment, UE determines the wakeup signal sequence and/or wakeup signal monitoring occasions to monitor corresponding to its wake up signal monitoring group or paging group/sub group or early paging indication group/sub group (and also common Wake up signal monitoring group or paging group/sub group or early paging indication group/sub group in an embodiment). The wake up signal monitoring group (or paging group/sub group or early paging indication group/sub group) can be determined by UE and gNB in same manner as explained in methods 1 to 5. If the wakeup signal sequence is detected in determined wakeup signal monitoring occasion(s) or early paging indication is received in early paging indication monitoring occasions or in PDCCH monitoring occasions for early paging indication or DCI in the received PDCCH for early paging indication indicates Wake up signal monitoring group or paging group/sub group or early paging indication group/sub group, UE monitor the PDCCH addressed to P-RNTI in its PO. Otherwise UE does not monitor the PO. This operation is performed by UE for its PO every DRX cycle. If there are multiple transmitted SSBs, UE does not have to monitor wakeup signal monitoring occasion(s) or early paging indication monitoring occasions or PDCCH monitoring occasions for early paging indication corresponding to each SSB. It may monitor wakeup signal monitoring occasion or early paging indication monitoring occasion or PDCCH monitoring occasion for early paging indication corresponding to best of suitable SSB (i.e. one above a pre-defined or configured SS-RSRP threshold).

Wake up signal monitoring group or paging group/sub group or early paging indication group/sub group determination Embodiment 1:

UEs are grouped into 'P' Wake up signal monitoring groups or paging groups/sub groups or early paging indication groups/sub groups. The parameter 'P' can be pre-defined. The parameter 'P' can be signaled by network (e.g. gNB can signal this in paging configuration or in the BWP configuration received in system information or RRC signaling message (e.g. RRC Release message or RRC Reconfiguration message)) or can be implicitly known.

The grouping is done based on paging arrival rate (also referred as paging rate i.e. number of pages per unit time/per interval). UE's paging arrival rate is informed to UE by core network (i.e. AMF using NAS message). The core network can determine UE's paging arrival rate based on past history of UE's paging, based on traffic characteristic, etc.

Mapping between Wake up signal monitoring groups or paging groups/sub groups or early paging indication groups/sub groups and paging arrival rates is informed to UE by GNB (e.g. in system information or in RRC signaling message or in paging configuration). The mapping between Wake up signal monitoring groups or paging groups/sub groups or early paging indication groups/sub groups and paging arrival rates can be BWP specific (separately signaled for each BWP supporting paging) or cell specific (i.e. common for all BWPs of cell). There can be one to one mapping between Wake up signal monitoring group or paging group/sub group or early paging indication group/sub group and paging arrival rate. Alternately, one Wake up signal monitoring group or paging group/sub group or early paging indication group/sub group can be associated with multiple paging arrival rates. Alternately, one Wake up signal monitoring group or paging group/sub group or early paging indication group/sub group can be associated with a range of paging arrival rates. The mapping information can be signaled as a list wherein A) each entry in the list consists of [Wake up signal monitoring group or paging group/sub group or early paging indication group/sub group identity, paging arrival rate]

B) each entry in the list consists of [Wake up signal monitoring group or paging group/sub group or early paging indication group/sub group identity, one or more paging arrival rates]

C) each entry in the list consists of [Wake up signal monitoring group or paging group/sub group or early paging indication group/sub group identity, paging arrival rate min, paging arrival rate max]. Wake up signal monitoring group or paging group/sub group or early paging indication group/sub group identity of UE whose paging arrival rate is between paging arrival rate min and paging arrival rate max.

D) each entry in the list consists of [paging arrival rate]. The ith entry in the list corresponds to Wake up signal monitoring group or paging group/sub group or early paging indication group/sub group identity 'i'. or The ith entry in the list corresponds to Wake up signal monitoring group or paging group/sub group or early paging indication group/sub group identity 'i+1'.

E) each entry in the list consists of [one or more paging arrival rates]. The ith entry in the list corresponds to Wake up signal monitoring group or paging group/sub group or early paging indication group/sub group identity 'i'. or The ith entry in the list corresponds to Wake up signal monitoring group or paging group/sub group or early paging indication group/sub group identity 'i+1'.

F) each entry in the list consists of [paging arrival rate min, paging arrival rate max]. Wake up signal monitoring group or paging group/sub group or early paging indication group/sub group identity of UE whose paging arrival rate is between paging arrival rate min and paging arrival rate max. The ith entry in the list corresponds to Wake up signal monitoring group or paging group/sub group or early paging indication group/sub group identity 'i'. or The ith entry in the list corresponds to Wake up signal monitoring group or paging group/sub group or early paging indication group/sub group identity 'i+1'.

In case of CN paging, CN (i.e. AMF) sends paging arrival rate of UE to GNB along with the paging message. gNB identifies the Wake up signal monitoring group or paging group/sub group or early paging indication group/sub group of UE based on mapping between Wake up signal monitoring groups or paging groups/sub groups or early paging indication groups/sub groups and paging arrival rate.

In case of RAN paging, the AMF provides to the NG-RAN node the Core Network Assistance Information. The Core Network Assistance Information includes the registration area configured for the UE, the Periodic Registration Update timer, and the UE Identity Index value, etc. Core Network Assistance Information includes UE's paging arrival rate. This is used by gNB to identify Wake up signal monitoring group or paging group/sub group or early paging indication group/sub group of UE for RAN paging. gNB identifies the Wake up signal monitoring group or paging group/sub group or early paging indication group/sub group of UE based on mapping between Wake up signal monitoring groups or paging groups/sub groups or early paging indication groups/sub groups and paging arrival rate. Alternately, UE can inform its Wake up signal monitoring group or paging group/sub group or early paging indication group/sub group to RAN before RRC connection is released.

In an embodiment, instead of paging arrival rate, paging probability (or paging probability threshold) can be used in operations(s) explained above. The same description is applicable by replacing paging arrival rate by paging probability (or paging probability threshold).

Wake up signal monitoring group or paging group/sub group or early paging indication group/sub group determination Embodiment 2:

UEs are grouped into 'P' Wake up signal monitoring groups or paging groups/sub groups or early paging indication groups/sub groups. The parameter 'P' can be pre-defined. The parameter 'P' can be signaled by network (e.g. gNB can signal this in paging configuration or in the BWP configuration received in system information or RRC signaling message) or can be implicitly known.

The grouping is done based on paging arrival rate (also referred as paging rate i.e. number of pages per unit time/per interval). UE's paging arrival rate is informed to CN by UE (i.e. using NAS message).

Mapping between Wake up signal monitoring groups or paging groups/sub groups or early paging indication groups/sub groups and paging arrival rates is informed to UE by GNB (e.g. in system information or in RRC signaling message or in paging configuration). The mapping between Wake up signal monitoring groups or paging groups/sub groups or early paging indication groups/sub groups and paging arrival rates can be BWP specific (separately signaled for each BWP supporting paging) or cell specific (i.e. common for all BWPs of cell). There can be one to one mapping between Wake up signal monitoring group or paging group/sub group or early paging indication group/sub group and paging arrival rate. Alternately, one Wake up signal monitoring group or paging group/sub group or early paging indication group/sub group can be associated with multiple paging arrival rates. Alternately, one Wake up signal monitoring group or paging group/sub group or early paging indication group/sub group can be associated with a range of paging arrival rates. The mapping information can be signaled as a list wherein A) each entry in the list consists of [Wake up signal monitoring group or paging group/sub group or early paging indication group/sub group identity, paging arrival rate]

B) each entry in the list consists of [Wake up signal monitoring group or paging group/sub group or early paging indication group/sub group identity, one or more paging arrival rates]

C) each entry in the list consists of [Wake up signal monitoring group or paging group/sub group or early paging indication group/sub group identity, paging arrival rate min, paging arrival rate max]. Wake up signal monitoring group or paging group/sub group or early paging indication group/sub group identity of UE whose paging arrival rate is between paging arrival rate min and paging arrival rate max.

D) each entry in the list consists of [paging arrival rate]. The ith entry in the list corresponds to Wake up signal monitoring group paging group/sub group or early paging indication group/sub group identity 'i'. or The ith entry in the list corresponds to Wake up signal monitoring group identity 'i+1'.

E) each entry in the list consists of [one or more paging arrival rates]. The ith entry in the list corresponds to Wake up signal monitoring group paging group/sub group or early paging indication group/sub group identity 'i'. or The ith entry in the list corresponds to Wake up signal monitoring group paging group/sub group or early paging indication group/sub group identity 'i+1'.

F) each entry in the list consists of [paging arrival rate min, paging arrival rate max]. Wake up signal monitoring group paging group/sub group or early paging indication group/sub group identity of UE whose paging arrival rate is between paging arrival rate min and paging arrival rate max. The ith entry in the list corresponds to Wake up signal monitoring group paging group/sub group or early paging indication group/sub group identity 'i'. or The ith entry in the list corresponds to Wake up signal monitoring group paging group/sub group or early paging indication group/sub group identity 'i+1'.

In case of CN paging, CN (i.e. AMF) sends paging arrival rate of UE to GNB along with the paging message. gNB identifies the Wake up signal monitoring group or paging group/sub group or early paging indication group/sub group of UE based on mapping between Wake up signal monitoring groups or paging groups/sub groups or early paging indication groups/sub groups and paging arrival rate.

In case of RAN paging, the AMF provides to the NG-RAN node the Core Network Assistance Information. The Core Network Assistance Information includes the registration area configured for the UE, the Periodic Registration Update timer, and the UE Identity Index value, etc. Core Network Assistance Information includes UE's paging arrival rate. This is used by gNB to identify Wake up signal monitoring group or paging group/sub group or early paging indication group/sub group of UE for RAN paging. gNB identifies the Wake up signal monitoring group or paging group/sub group or early paging indication group/sub group of UE based on mapping between Wake up signal monitoring groups or paging groups/sub groups or early paging indication groups/sub groups and paging arrival rate. Alternately, UE can inform its Wake up signal monitoring group or paging group/sub group or early paging indication group/sub group to RAN before RRC connection is released In an embodiment, instead of paging arrival rate, paging probability (or paging probability threshold) can be used in operations(s) explained above. The same description is applicable by replacing paging arrival rate by paging probability (or paging probability threshold).

Wake up signal monitoring group or paging group/sub group or early paging indication group/sub group determination Embodiment 3:

UEs are grouped into 'P' Wake up signal monitoring groups or paging groups/sub groups or early paging indication groups/sub groups. The parameter 'P' can be pre-defined. The parameter 'P' can be signaled by network (e.g. gNB can signal this in paging configuration or in the BWP configuration received in system information or RRC signaling message) or can be implicitly known.

The grouping is done by network (e.g. by AMF in CN). UE's Wake up signal monitoring group or paging group/sub group or early paging indication group/sub group is informed to UE by core network (i.e. AMF using NAS message). In an embodiment, UE's paging arrival rate (also referred as paging rate i.e. number of pages per unit time/per interval) or other assistance information (e.g. UE type or UE's power class, etc.) is informed to CN by UE (i.e. using NAS message) and CN uses it to determine UE's Wake up signal monitoring group or paging group/sub group or early paging indication group/sub group. In an embodiment, the grouping can be done by radio access network (e.g. gNB) and informed to UE In case of CN paging, CN (i.e. AMF) sends Wake up signal monitoring group or paging group/sub group or early paging indication group/sub group of UE to GNB along with the paging message.

In case of RAN paging, the AMF provides to the NG-RAN node (i.e. gNB) the Core Network Assistance Information. The Core Network Assistance Information includes the registration area configured for the UE, the Periodic Registration Update timer, and the UE Identity Index value, etc. Core Network Assistance Information includes UE's Wake up signal monitoring group or paging group/sub group or early paging indication group/sub group. Alternately, UE can inform its Wake up signal monitoring group or paging group/sub group or early paging indication group/sub group to RAN before RRC connection is released.

In an embodiment, instead of paging arrival rate, paging probability (or paging probability threshold) can be used in operations(s) explained above. The same description is applicable by replacing paging arrival rate by paging probability (or paging probability threshold).

Wake up signal monitoring group or paging group/sub group or early paging indication group/sub group determination Embodiment 4:

UEs are grouped into 'P' Wake up signal monitoring groups or paging groups/sub groups or early paging indication groups/sub groups. The parameter 'P' can be pre-defined. The parameter 'P' can be signaled by network (e.g. gNB can signal this in paging configuration or in the BWP configuration received in system information or RRC signaling message).

UE identify it's Wake up signal monitoring group or paging group/sub group or early paging indication group/sub group based on 'X' bits of its UE ID. The UE ID can be one of the following:

UE_ID: 5G-S-TMSI mod 1024

UE_ID: IMSI mod 1024

UE_ID can be any other UE identity $X = \log 2(P)$. For example, if there are 8 paging groups, $X=3$.

$Y = \log 2(N*Ns)$, where N is the number of paging frames and Ns is the number of POs per paging frame. N and Ns are signaled by gNB in paging configuration. X Lsbs starting from Y+1th Lsb of UE_ID indicates UE's Wake up signal monitoring group or paging group/sub group or early paging indication group/sub group or is the UE's Wake up signal monitoring group or paging group/sub group or early paging indication group/sub group identity. For example if N=16, Ns=4, P=8, (bit9bit8bit7) indicates UE's Wake up signal monitoring group or paging group/sub group or early paging indication group/sub group.

In an embodiment, Wake up signal monitoring group or paging group/sub group or early paging indication group/sub group ID of UE=(UE_ID/N*Ns) mod P, where N is the number of paging frames and Ns is the number of POs per paging frame. N and Ns are signaled by gNB in paging configuration. In this case Wake up signal monitoring group or paging group/sub group or early paging indication group/sub group ID P can be common Wake up signal monitoring group or paging group/sub group or early paging indication group/sub group. In an embodiment, 'N*Ns' in above equation can be replaced by 'N*Ns*L' where parameter L indicates the number of groups into which Ues are divided for PO monitoring.

In an embodiment, Wake up signal monitoring group or paging group/sub group or early paging indication group/sub group ID of UE=1+[(UE_ID/N*Ns) mod P], where N is the number of paging frames and Ns is the number of POs per paging frame. N and Ns are signaled by gNB in paging configuration. In this case Wake up signal monitoring group or paging group/sub group or early paging indication group/sub group ID 0 can be common Wake up signal monitoring group or paging group/sub group or early paging indication group/sub group. In an embodiment, 'N*Ns' in above equation can be replaced by 'N*Ns*L' where parameter L indicates the number of groups into which Ues are divided for PO monitoring.

In an alternate embodiment, Wake up signal monitoring group or paging group/sub group or early paging indication group/sub group ID of UE=(UE_ID/N) mod P, where N is the number of paging frames. N and Ns are signaled by gNB in paging configuration. In this case Wake up signal monitoring group or paging group/sub group or early paging indication group/sub group ID P can be common Wake up signal monitoring group or paging group/sub group or early paging indication group/sub group.

In an alternate embodiment, Wake up signal monitoring group or paging group/sub group or early paging indication group/sub group ID of UE=1+[(UE_ID/N) mod P], where N is the number of paging frames. N and Ns are signaled by gNB in paging configuration. In this case Wake up signal monitoring group or paging group/sub group or early paging indication group/sub group ID 0 can be common Wake up signal monitoring group or paging group/sub group or early paging indication group/sub group.

In an alternate embodiment, Wake up signal monitoring group or paging group/sub group or early paging indication group/sub group ID of UE=(UE_ID) mod P. In this case Wake up signal monitoring group or paging group/sub group or early paging indication group/sub group ID P can be common Wake up signal monitoring group or paging group/sub group or early paging indication group/sub group.

In an alternate embodiment, Wake up signal monitoring group or paging group/sub group or early paging indication group/sub group ID of UE=1+[(UE_ID) mod P]. In this case Wake up signal monitoring group or paging group/sub group or early paging indication group/sub group ID 0 can be common Wake up signal monitoring or paging group/sub group or early paging indication group/sub group.

In case of CN paging, CN (i.e. AMF) sends UE ID to GNB along with the paging message. GNB determines the UE's Wake up signal monitoring group or paging group/sub group or early paging indication group/sub group in same manner as determined by UE.

In case of RAN paging, the AMF provides to the NG-RAN node the Core Network Assistance Information. The Core Network Assistance Information includes the registration area configured for the UE, the Periodic Registration Update timer, and the UE Identity Index value (UE_ID), etc. GNB determines the UE's Wake up signal monitoring group or paging group/sub group or early paging indication group/sub group in same manner as determined by UE.

Wake up signal monitoring group or paging group/sub group or early paging indication group/sub group determination Embodiment 5:

UEs are grouped into 'P' Wake up signal monitoring groups or paging groups/sub groups or early paging indication groups/sub groups. The parameter 'P' can be pre-defined. The parameter 'P' can be signaled by network (e.g. gNB can signal this in paging configuration or in the BWP configuration received in system information or RRC signaling message).

UE identify it's Wake up signal monitoring group based on its UE ID. The UE ID can be one of the following:
UE_ID: 5G-S-TMSI mod 1024
UE_ID: IMSI mod 1024
UE_ID can be any other UE identity In an embodiment, wake up signal monitoring group or paging group/sub group or early paging indication group/sub group ID of UE=(UE_ID/N*Ns*R) mod P, where N is the number of paging frames, Ns is the number of POs per paging frame and R is the number of RNTIs used for wakeup signal or early paging indication. N and Ns are signaled by gNB in paging configuration. R can be pre-defined or configured by gNB. In this case Wake up signal monitoring group or paging group/sub group or early paging indication group/sub group ID 0 can be common Wake up signal monitoring group or paging group/sub group or early paging indication group/sub group.

For wakeup signal or early paging indication, UE monitors j+1th RNTI, where j=(UE_ID/N*Ns) mod R. For example, if R=2, if j equals zero, UE monitors PDCCH addressed to 1st RNTI, if j equals 1, UE monitors 2nd RNTI amongst the list of R RNTIs. The list of R RNTIs for wakeup signal or early paging indication can be pre-defined or configured by gNB.

In an embodiment, wake up signal monitoring group or paging group/sub group or early paging indication group/sub group ID of UE=1+[(UE_ID/N*Ns*R) mod P], where N is the number of paging frames and Ns is the number of POs per paging frame. N and Ns are signaled by gNB in paging configuration. R is the number of RNTIs used for wakeup signal or early paging indication. In this case wake up signal monitoring group or paging group/sub group or early paging indication group/sub group ID 0 can be common wake up signal monitoring group.

For wakeup signal or early paging indication UE monitors j+1th P-RNTI, where j=(UE_ID/N*Ns) mod R. For example, if R=2, if j equals zero, UE monitors PDCCH addressed to 1st RNTI, if j equals 1, UE monitors 2nd RNTI amongst the list of R RNTIs. The list of R RNTIs for wakeup signal or early paging indication can be pre-defined or configured by gNB.

In an alternate embodiment, wake up signal monitoring group or paging group/sub group or early paging indication group/sub group ID of UE=(UE_ID/N*R) mod P, where N is the number of paging frames. N and Ns are signaled by gNB in paging configuration. In this case wake up signal monitoring group or paging group/sub group or early paging indication group/sub group ID P can be common wake up signal monitoring group. R is the number of RNTIs used for wakeup signal or early paging indication For wakeup signal or early paging indication UE monitors j+1th RNTI, where j=(UE_ID/N) mod R. For example, if R=2, if j equals zero, UE monitors PDCCH addressed to 1st RNTI, if j equals 1, UE monitors 2nd RNTI amongst the list of R RNTIs. The list of R RNTIs for wakeup signal or early paging indication can be pre-defined or configured by gNB.

In an alternate embodiment, wake up signal monitoring group or paging group/sub group or early paging indication group/sub group ID of UE=1+[(UE_ID/N*R) mod P], where N is the number of paging frames. N and Ns are signaled by gNB in paging configuration. In this case wake up signal monitoring group or paging group/sub group or early paging indication group/sub group ID 0 can be common wake up signal monitoring group or paging group/sub group or early paging indication group/sub group. R is the number of RNTIs used for wakeup signal or early paging indication For wakeup signal or early paging indication UE monitors j+1th RNTI, where j=(UE_ID/N) mod R. For example, if R=2, if j equals zero, UE monitors PDCCH addressed to 1st RNTI, if j equals 1, UE monitors 2nd RNTI amongst the list of R RNTIs. The list of R RNTIs can be pre-defined or configured by gNB.

In an alternate embodiment, wake up signal monitoring group or paging group/sub group or early paging indication group/sub group ID of UE=(UE_ID/R) mod P. In this case wake up signal monitoring group ID P can be common paging group or paging group/sub group or early paging indication group/sub group. R is the number of P-RNTIs used for wakeup signal or early paging indication For wakeup signal or early paging indication UE monitors j+1th RNTI, where j=(UE_ID) mod R. For example, if R=2, if j equals zero, UE monitors PDCCH addressed to 1st RNTI, if j equals 1, UE monitors 2nd P-RNTI amongst the list of R RNTIs. The list of R RNTIs can be pre-defined or configured by gNB.

In an alternate embodiment, wake up signal monitoring group or paging group/sub group or early paging indication group/sub group ID of UE=1+[(UE_ID/R) mod P]. In this case wake up signal monitoring group or paging group/sub group or early paging indication group/sub group ID 0 can be common wake up signal monitoring group or paging group/sub group or early paging indication group/sub group. R is the number of P-RNTIs used for wakeup signal or early paging indication For wakeup signal or early paging indication UE monitors j+1th RNTI, where j=(UE_ID) mod R. For example, if R=2, if j equals zero, UE monitors PDCCH addressed to 1st RNTI, if j equals 1, UE monitors 2nd RNTI amongst the list of R RNTIs. The list of R RNTIs can be pre-defined or configured by gNB.

In an embodiment, 'N*Ns' in above equations can be replaced by 'N*Ns*L' where parameter L indicates the number of groups into which Ues are divided for PO monitoring.

In case of CN paging, CN (i.e. AMF) sends UE ID to GNB along with the paging message. GNB determines the UE's wake up signal monitoring group or paging group/sub group or early paging indication group/sub group in same manner as determined by UE.

In case of RAN paging, the AMF provides to the NG-RAN node the Core Network Assistance Information. The Core Network Assistance Information includes the registration area configured for the UE, the Periodic Registration Update timer, and the UE Identity Index value (UE_ID), etc. GNB determines the UE's wake up signal monitoring group or paging group/sub group or early paging indication group/sub group in same manner as determined by UE.

In this method, if UE detects the wakeup signal corresponding to common wakeup signal monitoring group:

gNB indicates wakeup signal monitoring group or paging group/sub group or early paging indication group/sub group in short message or in DCI of PDCCH addressed to P-RNTI transmitted in PO. The wakeup signal monitoring group (s) or paging groups/sub groups or early paging indication groups/sub groups can be indicated in one of the following ways:

Option 1: Only one wakeup signal monitoring group or paging group/sub group or early paging indication group/sub group ID is indicated 1-1: wakeup signal monitoring group or paging group/sub group or early paging indication group/sub group ID can be an optional field in DCI or short message.

UE monitors for PDCCH addressed to pre-defined P-RNTI in its PO.

(Alternate) UE monitors j+1th P-RNTI, where j=(UE_ID/N*Ns) mod R. For example if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.

(Alternate) UE monitors j+1th P-RNTI, where j=(UE_ID/N) mod R. For example if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.

(Alternate) UE monitors j+1th P-RNTI, where j=(UE_ID) mod R. For example if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.

UE receives PDCCH addressed to P-RNTI. DCI includes scheduling information for paging message.

If wakeup signal monitoring group ID or paging group/sub group or early paging indication group/sub group is absent, UE receives and decodes the TB according to the scheduling information for paging message.

If wakeup signal monitoring group or paging group/sub group or early paging indication group/sub group ID is present and UE belongs to the indicated wakeup signal monitoring group (i.e. wakeup signal monitoring group or paging group/sub group or early paging indication group/sub group ID in DCI matches with UE's wakeup signal monitoring group or paging group/sub group or early paging indication group/sub group ID), UE receives and decodes the TB according to the scheduling information for paging message. If wakeup signal monitoring group or paging group/sub group or early paging indication group/sub group ID is present and UE does not belong to the indicated wakeup signal monitoring group or paging group/sub group or early paging indication group/sub group (i.e. wakeup signal monitoring group or paging group/sub group or early paging indication group/sub group ID in DCI does not match with UE's wakeup signal monitoring group or paging group/sub group or early paging indication group/sub group ID), UE does not decode the TB.

In an embodiment, One wakeup signal monitoring group or paging group/sub group or early paging indication group/sub group ID can be reserved to indicate paging for all paging groups. If wakeup signal monitoring group or paging group/sub group or early paging indication group/sub group ID in PDCCH belongs to UE's wakeup signal monitoring group or paging group/sub group or early paging indication group/sub group or is the reserved wakeup signal monitoring group or paging group/sub group or early paging indication group/sub group ID, UE receives and decodes the TB according to the scheduling information for paging message. Otherwise, UE does not receive and decode the TB for paging message.

1-2: Multiple P-RNTIs can be used:

UE monitors for PDCCH addressed to P-RNTI 1 (first P-RNTI) and legacy P-RNTI (second P-RNTI) in its PO. In an embodiment, if camped cell supports wakeup signal monitoring group(s) or paging groups/sub groups or early paging indication groups/sub groups and UE supports wakeup signal monitoring groups or paging groups/sub groups or early paging indication groups/sub groups, UE monitors PDCCH addressed to P-RNTI 1. Otherwise UE monitors PDCCH addressed to legacy P-RNTI.

wakeup signal monitoring group or paging group/sub group or early paging indication group/sub group ID is included in DCI/short message of PDCCH addressed to P-RNTI1.

wakeup signal monitoring group or paging group/sub group or early paging indication group/sub group ID is not included in DCI/short message of PDCCH addressed to legacy P-RNTI.

If UE receives PDCCH addressed to P-RNTI 1 and if UE belongs to indicated wakeup signal monitoring group or paging group/sub group or early paging indication group/sub group (i.e. wakeup signal monitoring group or paging group/sub group or early paging indication group/sub group ID in DCI matches with UE's paging group or paging group/sub group or early paging indication group/sub group ID) in DCI/short message of PDCCH addressed to P-RNTI1, UE decodes the TB according to the scheduling information for paging message. If UE does not belong to the indicated wakeup signal monitoring group (i.e. wakeup signal monitoring group or paging group/sub group or early paging indication group/sub group ID in DCI does not match with UE's wakeup signal monitoring group or paging group/sub group or early paging indication group/sub group ID), UE does not decode the TB.

In an embodiment, One wakeup signal monitoring group or paging group/sub group or early paging indication group/sub group ID can be reserved to indicate paging for all paging groups. If wakeup signal monitoring group ID in PDCCH belongs to UE's paging group or is the reserved wakeup signal monitoring group or paging group/sub group or early paging indication group/sub group ID, UE receives and decodes the TB according to the scheduling information for paging message. Otherwise, UE does not receive and decode the TB.

If UE receives PDCCH addressed to legacy P-RNTI, UE receives and decodes the paging message.

Option 2: List of wakeup signal monitoring group or paging group/sub group or early paging indication group/sub group IDs is indicated 2-1: List of wakeup signal monitoring group or paging group/sub group or early paging indication group/sub group IDs is optional in DCI or short message.

UE monitors for PDCCH addressed to pre-defined P-RNTI in its PO.

(Alternate) UE monitors j+1th P-RNTI, where j=(UE_ID/N*Ns) mod R. For example if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.

(Alternate) UE monitors j+1th P-RNTI, where j=(UE_ID/N) mod R. For example if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.

(Alternate) UE monitors j+1th P-RNTI, where j=(UE ID) mod R. For example if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.

UE receives PDCCH addressed to P-RNTI. DCI includes scheduling information for paging message.

If the List of wakeup signal monitoring group or paging group/sub group or early paging indication group/sub group IDs is absent, UE receives and decodes the TB according to the scheduling information for paging message.

If the List of wakeup signal monitoring group or paging group/sub group or early paging indication group/sub group IDs is present and UE belongs to one of the indicated wakeup signal monitoring group or paging group/sub group or early paging indication group/sub group in the list, UE receives and decodes the TB according to the scheduling information for paging message. If the List of wakeup signal monitoring group or paging group/sub group or early paging indication group/sub group IDs is present and UE does not belong to one of the indicated wakeup signal monitoring group or paging group/sub group or early paging indication group/sub group in the list, UE does not receive and decode the TB.

In an embodiment, One wakeup signal monitoring group or paging group/sub group or early paging indication group/sub group ID can be reserved to indicate paging for all wakeup signal monitoring groups or paging groups/sub groups or early paging indication groups/sub groups. If UE belongs to one of the indicated wakeup signal monitoring group or paging group/sub group or early paging indication group/sub group in the list or the list includes reserved wakeup signal monitoring group or paging group/sub group or early paging indication group/sub group ID, UE receives and decodes the TB according to the scheduling information for paging message. Otherwise, UE does not receive and decode the TB 2-2: Multiple P-RNTIs can be used:
UE monitors for PDCCH addressed to P-RNTI 1 and legacy P-RNTI in its PO. In an embodiment, if camped cell supports wakeup signal monitoring group(s) or paging groups/sub groups or early paging indication groups/sub groups and UE supports wakeup signal monitoring groups or paging groups/sub groups or early paging indication groups/sub groups, UE monitors PDCCH addressed to P-RNTI 1. Otherwise UE monitors PDCCH addressed to legacy P-RNTI.

List of wakeup signal monitoring group or paging group/sub group or early paging indication group/sub group IDs is included in DCI/short message of PDCCH addressed to P-RNTI1.

List of wakeup signal monitoring group or paging group/sub group or early paging indication group/sub group IDs is not included in DCI/short message of PDCCH addressed to legacy P-RNTI.

If UE receives PDCCH addressed to P-RNTI 1 and if UE belongs to one of the indicated wakeup signal monitoring group or paging group/sub group or early paging indication group/sub group in DCI/short message of PDCCH addressed to P-RNTI1, UE decodes the TB according to the scheduling information for paging message. If UE does not belong to one of the indicated wakeup signal monitoring group or paging group/sub group or early paging indication group/sub group, UE does not decode the TB In an embodiment, One wakeup signal monitoring group or paging group/sub group or early paging indication group/sub group ID can be reserved to indicate paging for all wakeup signal monitoring groups or paging groups/sub groups or early paging indication groups/sub groups. If UE belongs to one of the indicated wakeup signal monitoring group or paging group/sub group or early paging indication group/sub group in the list or the list includes reserved wakeup signal monitoring group or paging group/sub group or early paging indication group/sub group ID, UE decodes the TB according to the scheduling information for paging message. Otherwise, UE does not decode the TB If UE receives PDCCH addressed to legacy P-RNTI, UE receives and decodes the paging message.

Option 3: wakeup signal monitoring group or paging group/sub group or early paging indication group/sub group bitmap is included in DCI or short message 3-1: wakeup signal monitoring group or paging group/sub group or early paging indication group/sub group bitmap can be optional field:

Each bit in the bitmap corresponds to different wakeup signal monitoring group or paging group/sub group or early paging indication group/sub group. The mapping between bits in bitmap and wakeup signal monitoring groups or paging groups/sub groups or early paging indication groups/sub groups can be pre-defined.

The size of bitmap can be pre-defined. The size of bitmap can also be determined based on number of wakeup signal monitoring groups or paging groups/sub groups or early paging indication groups/sub groups.

UE monitors for PDCCH addressed to pre-defined P-RNTI in its PO.

(Alternate) UE monitors j+1th P-RNTI, where j=(UE_ID/N*Ns) mod R. For example if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.

(Alternate) UE monitors j+1th P-RNTI, where j=(UE_ID/N) mod R. For example if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.

(Alternate) UE monitors j+1th P-RNTI, where j=(UE_ID) mod R. For example if R=2, if j equals zero, UE monitors PDCCH addressed to 1st P-RNTI, if j equals 1, UE monitors 2nd P-RNTI amongst the list of R P-RNTIs. The list of R P-RNTIs can be pre-defined or configured by gNB.

UE receives PDCCH addressed to P-RNTI. DCI includes scheduling information for paging message.

If wakeup signal monitoring group or paging group/sub group or early paging indication group/sub group bitmap is absent, UE receives and decodes the TB according to the scheduling information for paging message.

If wakeup signal monitoring group or paging group/sub group or early paging indication group/sub group bitmap is present and bit corresponding to UE's wakeup signal monitoring group or paging group/sub group or early paging indication group/sub group is set (i.e. equals to 1) in bitmap, UE receives and decodes the TB according to the scheduling information for paging message. If wakeup signal monitoring group or paging group/sub group or early paging indication group/sub group bitmap is present and bit corresponding to UE's wakeup signal monitoring group is not set (i.e. equals to 0) in bitmap, UE does not decode the TB.

In an embodiment, One bit in bitmap can be reserved to indicate paging for all wakeup signal monitoring groups or paging groups/sub groups or early paging indication groups/sub groups. If bit corresponding to UE's paging group or bit corresponding to paging for all wakeup signal monitoring groups is set (i.e. equals to 1) in bitmap, UE decodes the TB according to the scheduling information for paging message. Otherwise, UE does not decode the TB 3-2: Multiple P-RNTIs can be used:
UE monitors for PDCCH addressed to P-RNTI 1 and legacy P-RNTI in its PO. In an embodiment, if camped cell supports wakeup signal monitoring group(s) or paging groups/sub groups or early paging indication groups/sub groups and UE supports wakeup signal monitoring group(s) or paging groups/sub groups or early paging indication groups/sub groups, UE monitors PDCCH addressed to P-RNTI 1. Otherwise UE monitors PDCCH addressed to legacy P-RNTI.

wakeup signal monitoring group bitmap is included in DCI/short message of PDCCH addressed to P-RNTI1.

wakeup signal monitoring group or paging group/sub group or early paging indication group/sub group bitmap is not included in DCI/short message of PDCCH addressed to legacy P-RNTI.

If UE receives PDCCH addressed to P-RNTI 1 and bit corresponding to UE's wakeup signal monitoring group or paging group/sub group or early paging indication group/sub group is set in bitmap in DCI/short message of PDCCH addressed to P-RNTI1, UE decodes the TB according to the scheduling information for paging message. If bit corresponding to UE's wakeup signal monitoring group or paging group/sub group or early paging indication group/sub group is not set in bitmap, UE does not decode the TB In an embodiment, One bit in bitmap can be reserved to indicate paging for all wakeup signal monitoring groups or paging groups/sub groups or early paging indication groups/sub groups. If bit corresponding to UE's paging group or bit corresponding to paging for all wakeup signal monitoring groups or paging groups/sub groups or early paging indication groups/sub groups is set (i.e. equals to 1) in bitmap, UE receives and decodes the TB according to the scheduling information for paging message. Otherwise, UE does not receive and decode the TB If UE receives PDCCH addressed to legacy P-RNTI, UE receives and decodes the paging message.

In an embodiment, wherein PDCCH is transmitted in monitoring occasion for wakeup signal or early paging indication, UE determines the PDCCH monitoring occasions for early paging indication corresponding to its PO. UEs are grouped into 'P' groups (wakeup signal monitoring group or early paging indication group or paging groups). Groups can also be referred as sub groups. The parameter 'P' can be signaled by network (e.g. gNB can signal this in paging configuration or in the BWP configuration received in system information or RRC signaling message) or can be implicitly known.

gNB indicates wake up signal monitoring group (can also be referred as paging group or early paging indication group) in DCI of wakeup signal or early paging indication. These group(s) can be indicated in one of the following ways:

Option 1: Only one group ID is indicated. Group ID identifies a wake up signal monitoring group (can also be referred as paging group or early paging indication group)

group ID can be an optional field or can be always present.

UE monitors for PDCCH addressed to RNTI in monitoring occasions for wakeup signal or early paging indication. RNTI is pre-defined or signaled by gNB for wakeup signal or early paging indication (alternate) UE monitors j+1th RNTI, where j=(UE_ID/N*Ns) mod R. For example, if R=2, if j equals zero, UE monitors PDCCH addressed to 1st RNTI, if j equals 1, UE monitors 2nd RNTI amongst the list of R RNTIs. The list of R RNTIs can be pre-defined or configured by gNB. The configuration can be using system information or RRC signaling.

(Alternate) UE monitors j+1th RNTI, where j=(UE_ID/N) mod R. For example, if R=2, if j equals zero, UE monitors PDCCH addressed to 1st RNTI, if j equals 1, UE monitors 2nd RNTI amongst the list of RNTIs. The list of R RNTIs can be pre-defined or configured by gNB. The configuration can be using system information or RRC signaling.

(Alternate) UE monitors j+1th RNTI, where j=(UE_ID) mod R. For example, if R=2, if j equals zero, UE monitors PDCCH addressed to 1st RNTI, if j equals 1, UE monitors 2nd RNTI amongst the list of R RNTIs. The list of R RNTIs can be pre-defined or configured by gNB. The configuration can be using system information or RRC signaling.

UE receives PDCCH addressed to RNTI in monitoring occasions for wakeup signal or early paging indication.

If group ID is absent in DCI of wakeup signal or early paging indication, UE monitors its PO i.e. monitors PDCCH addressed to P-RNTI in its PO.

If group ID is present in DCI of wakeup signal or early paging indication and UE belongs to the indicated group (i.e. group ID in DCI matches with UE's group ID), UE monitors its PO i.e. monitors PDCCH addressed to P-RNTI in its PO.

If group ID is present and UE does not belong to the indicated group (i.e. group ID in DCI does not match with UE's group ID), UE does not monitors its PO.

In an embodiment, one group ID (common group ID) can be reserved to indicate early paging indication for all groups. For example, if there is SI update or emergency notification this group ID can be included in DCI. If group ID in DCI of wakeup signal or early paging indication belongs to UE's paging group or is the reserved paging group ID, UE monitors its PO i.e. monitors PDCCH addressed to P-RNTI in its PO.

In an embodiment, a bit in DCI of wakeup signal or early paging indication may indicate that paging message scheduled by PDCCH addressed to P-RNTI in PO is for RAN paging only. If UE is in RRC IDLE and this bit is set (i.e. equals to 1) and common group ID is supported, and common group ID is not included in DCI, UE does not monitor its PO. If UE is in RRC IDLE and this bit is set (i.e. equals to 1) and common group ID is not supported, UE does not monitor its PO.

In an embodiment, a bit in DCI of wakeup signal or early paging indication may indicate that paging message scheduled by PDCCH addressed to P-RNTI in PO is for CN paging only. If UE is in RRC IDLE and this bit is not set (i.e. equals to 0) and common group ID is supported, and common group ID is not included in DCI, UE does not monitor its PO. If UE is in RRC IDLE and this bit is not set (i.e. equals to 0) and common group ID is not supported, UE does not monitor its PO Option 2: List of group IDs is indicated. Group ID identifies a wake up signal monitoring group (can also be referred as paging group or early paging indication group)
  2-1: List of group IDs can be optional in DCI of wakeup signal or early paging indication.
    UE monitors for PDCCH addressed to RNTI in monitoring occasions for wakeup signal or early paging indication. RNTI is pre-defined or signaled by gNB for wakeup signal or early paging indication.
      (Alternate) UE monitors j+1th RNTI, where j=(UE_ID/N*Ns) mod R. For example, if R=2, if j equals zero, UE monitors PDCCH addressed to 1st RNTI, if j equals 1, UE monitors 2nd RNTI amongst the list of R RNTIs. The list of R RNTIs can be pre-defined or configured by gNB.
      (Alternate) UE monitors j+1th RNTI, where j=(UE_ID/N) mod R. For example, if R=2, if j equals zero, UE monitors PDCCH addressed to 1st RNTI, if j equals 1, UE monitors 2nd RNTI amongst the list of R RNTIs. The list of R RNTIs can be pre-defined or configured by gNB.
      (Alternate) UE monitors j+1th RNTI, where j=(UE_ID) mod R. For example, if R=2, if j equals zero, UE monitors PDCCH addressed to 1st RNTI, if j equals 1, UE monitors 2nd RNTI amongst the list of RNTIs. The list of R RNTIs can be pre-defined or configured by gNB.
    UE receives PDCCH addressed to RNTI in monitoring occasions for wakeup signal or early paging indication If the List of group IDs is absent in DCI of wakeup signal or early paging indication, UE monitors its PO i.e. monitors PDCCH addressed to P-RNTI in its PO.
    If the List of group IDs is present and UE belongs to one of the indicated group in the list, UE monitors its PO i.e. monitors PDCCH addressed to P-RNTI in its PO. If the List of group IDs is present and UE does not belong to one of the indicated group in the list, UE does not monitors its PO.
      In an embodiment, one group ID (common group ID) can be reserved to indicate early paging indication for all groups. For example, if there is SI update or emergency notification this group ID can be included in DCI. If UE belongs to one of the indicated group in the list or the list includes reserved group ID, UE monitors its PO i.e. monitors PDCCH addressed to P-RNTI in its PO. Otherwise, UE does not monitors its PO.
      In an embodiment, a bit in DCI of wakeup signal or early paging indication may indicate that paging message scheduled by PDCCH addressed to P-RNTI in PO is for RAN paging only. If UE is in RRC IDLE and this bit is set (i.e. equals to 1) and common group ID is supported, and common group ID is not included in DCI, UE does not monitor its PO. If UE is in RRC IDLE and this bit is set (i.e. equals to 1) and common group ID is not supported, UE does not monitor its PO.
      In an embodiment, a bit in DCI of wakeup signal or early paging indication may indicate that paging message scheduled by PDCCH addressed to P-RNTI in PO is for CN paging only. If UE is in RRC IDLE and this bit is not set (i.e. equals to 0) and common group ID is supported, and common group ID is not included in DCI, UE does not monitor its PO. If UE is in RRC IDLE and this bit is not set (i.e. equals to 0) and common group ID is not supported, UE does not monitor its PO Option 3: group bitmap is included in DCI of wakeup signal or early paging indication
  Each bit in the bitmap corresponds to different group. The mapping between bits in bitmap and groups can be pre-defined. For example, if there are P paging groups/subgroups, k=paging group/sub group ID mod P, kth most significant bit in bitmap corresponds to that paging group/sub group ID, where bits in bitmap are numbered sequentially from most significant bit to least significant bit. For example, if there are P paging groups/subgroups, k=paging group/sub group ID mod P, kth least significant bit in bitmap corresponds to that paging group/sub group ID, where bits in bitmap are numbered sequentially from least significant bit to most significant bit
  The size of bitmap can be pre-defined. The size of bitmap can also be determined based on number of groups.
  UE monitors for PDCCH addressed to RNTI in monitoring occasions for wakeup signal or early paging indication. RNTI is pre-defined or signaled by gNB for wakeup signal or early paging indication.
    (Alternate) UE monitors j+1th RNTI, where j=(UE_ID/N*Ns) mod R. For example, if R=2, if j equals zero, UE monitors PDCCH addressed to 1st RNTI, if j equals 1, UE monitors 2nd RNTI amongst the list of R RNTIs. The list of R RNTIs can be pre-defined or configured by gNB. The configuration can be using system information or RRC signaling.
    (Alternate) UE monitors j+1th RNTI, where j=(UE_ID/N) mod R. For example, if R=2, if j equals zero, UE monitors PDCCH addressed to 1st RNTI, if j equals 1, UE monitors 2nd RNTI amongst the list of RRNTIs. The list of R RNTIs can be pre-defined or configured by gNB. The configuration can be using system information or RRC signaling.
    (Alternate) UE monitors j+1th RNTI, where j=(UE_ID) mod R. For example, if R=2, if j equals zero, UE monitors PDCCH addressed to 1st RNTI, if j equals 1, UE monitors 2nd RNTI amongst the list of R RNTIs. The list of R RNTIs can be pre-defined or configured by gNB. The configuration can be using system information or RRC signaling.
  UE receives PDCCH addressed to RNTI in monitoring occasions for wakeup signal or early paging indication
  In an embodiment, If group bitmap is absent in DCI of wakeup signal or early paging indication, UE monitors its PO i.e. monitors PDCCH addressed to P-RNTI in its PO.
  If group bitmap is present and bit corresponding to UE's group is set (i.e. equals to 1) in bitmap, UE monitors its PO i.e. monitors PDCCH addressed to P-RNTI in its PO. If group bitmap is present and bit corresponding to UE's group is not set (i.e. equals to 0) in bitmap, UE does not monitor its PO.

In an embodiment, one bit in bitmap can be reserved to indicate paging for all paging groups. If bit corresponding to UE's paging group or bit corresponding to paging for all paging groups is set (i.e. equals to 1) in bitmap, UE monitors its PO i.e. monitors PDCCH addressed to P-RNTI in its PO. Otherwise, UE does not monitor its PO In an embodiment, one bit in bitmap can be reserved to indicate early paging indication for all groups. For example, if there is SI update or emergency notification this bit can be set to 1. In an embodiment, this bit can be separately included in DCI instead of bitmap If bit corresponding to UE's group or bit corresponding to common group is set to 1 in bitmap, UE monitors its PO i.e. monitors PDCCH addressed to P-RNTI in its PO. Otherwise, UE does not monitors its PO.

In an embodiment, a bit in DCI of wakeup signal or early paging indication may indicate that paging message scheduled by PDCCH addressed to P-RNTI in PO is for RAN paging only. If UE is in RRC IDLE and this bit is set to 1 and common group is supported, and common group bit is not set (i.e. equal to 0) or not included in DCI, UE does not monitor its PO. If UE is in RRC IDLE and this bit is set (i.e. equals to 1) and common group is not supported, UE does not monitor its PO.

In an embodiment, a bit in DCI of wakeup signal or early paging indication may indicate that paging message scheduled by PDCCH addressed to P-RNTI in PO is for CN paging only. If UE is in RRC IDLE and this bit is not set (i.e. equals to 0) and common group is supported, and common group bit is not set (i.e. equals to 0) or is not included in DCI, UE does not monitor its PO. If UE is in RRC IDLE and this bit is not set (i.e. equals to 0) and common group is not supported, UE does not monitor its PO Alternately, instead of gNB indicating group(s) in DCI of PDCCH addressed to RNTI transmitted in in monitoring occasion for wakeup signal or early paging indication, different RNTI can be reserved for different group/sub group. gNB uses PDCCH addressed to RNTI specific to group/sub group to which the UE(s) being paged/wakeup belongs. UE monitors PDCCH addressed to RNTI corresponding to its group/sub group. In an embodiment, one group/sub group ID or RNTI can be reserved to indicate paging/wakeup for all groups/sub groups. UE monitors PDCCH addressed to RNTI of its group/sub group and RNTI of common group/sub group, in monitoring occasion for wakeup signal or early paging indication.

In an embodiment, in inactive state, Wake up signal monitoring group or paging group/sub group or early paging indication group/sub group can be independently decided by RAN and indicated to UE during RRC connection release (can be update during RAN update).

Alt 1: In inactive state, UE monitor PDCCH addressed to RNTI for paging group/sub group indicated by RAN (i.e. UE will check for its paging group/sub group (assigned by RAN) in DCI of early paging indication). In idle state, UE monitor PDCCH addressed to RNTI for paging group/sub group indicated by CN (i.e. UE will check for its paging group/sub group (assigned by CN) in DCI of early paging indication).

Alt 2: In inactive state, UE monitor PDCCH addressed to RNTI for paging groups/sub groups indicated by RAN and CN. In idle state, UE monitor PDCCH addressed to P-RNTI for paging group/sub group indicated by CN (i.e. UE will check for its paging group/sub group (assigned by CN) in DCI of early paging indication).

Alt 3: if paging group/sub group is assigned by RAN, UE monitor PDCCH addressed to RNTI for paging group/sub group indicated by RAN (i.e. UE will check for its paging group/sub group (assigned by RAN) in DCI of early paging indication). If paging group/sub group is not assigned by RAN and If paging group/sub group is assigned by CN, UE monitor PDCCH addressed to RNTI for paging group/sub group indicated by CN (i.e. UE will check for its paging group/sub group (assigned by CN) in DCI of early paging indication).

In an embodiment, wherein PDCCH is transmitted in monitoring occasion for wakeup signal or early paging indication, UE determines the PDCCH monitoring occasions for early paging indication corresponding to its PF as explained earlier. UEs are grouped into 'P' groups/sub groups (wakeup signal monitoring groups/sub groups or early paging indication groups/sub groups or paging groups/sub groups). The parameter 'P' can be signaled by network (e.g. gNB can signal this in paging configuration or in the BWP configuration received in system information or RRC signaling message) or can be implicitly known. gNB indicates wake up signal monitoring group (can also be referred as paging group/sub group or early paging indication group/sub group) in DCI of wakeup signal or early paging indication. In DCI of wakeup signal or early paging indication, P bits are included for each PO of the PF, where each bit corresponding to a different group/sub group. Mapping between bits and groups/sub groups is pre-defined. P bits corresponding to a PO may be skipped if none of them are set to 1. UE monitors for PDCCH addressed to RNTI in monitoring occasions for wakeup signal or early paging indication. RNTI is pre-defined or signaled by gNB for wakeup signal or early paging indication. UE receives PDCCH addressed to RNTI in monitoring occasions for wakeup signal or early paging indication. UE check for its bit (i.e. corresponding to its group) in 'P' bits corresponding to its PO. If set (e.g. set to 1) UE monitor PDCCH addressed to P-RNTI in its PO. Otherwise not. In an embodiment, RAN paging indication per PO can be included in DCI of wakeup signal or early paging indication. If the UE is in RRC IDLE and RAN paging indication is included or set to 1 in DCI, UE does not monitor its PO irrespective of whether the bit corresponding to its group is set or not.

In another embodiment, wherein PDCCH is transmitted in monitoring occasion for wakeup signal or early paging indication, UE determines the PDCCH monitoring occasions for early paging indication corresponding to its PF as explained earlier. UEs are grouped into 'P' groups/sub groups (wakeup signal monitoring groups/sub groups or early paging indication groups/sub groups or paging groups/sub groups). The parameter 'P' can be signaled by network (e.g. gNB can signal this in paging configuration or in the BWP configuration received in system information or RRC signaling message) or can be implicitly known. gNB indicates wake up signal monitoring group/sub group (can also be referred as paging group/sub group or early paging indication group/sub group) in DCI of wakeup signal or early paging indication. In DCI of wakeup signal or early paging indication, P bits are included for each PO of the PF, where each bit corresponding to a different group/sub group. Mapping between bits and groups/sub groups is pre-defined.

P bits corresponding to a PO may be skipped if none of them are set to 1. In addition to group specific bits, DCI also include a bit (can be per PO) which is common for all UEs. UE monitors for PDCCH addressed to RNTI in monitoring occasions for wakeup signal or early paging indication. RNTI is pre-defined or signaled by gNB for wakeup signal or early paging indication. UE receives PDCCH addressed to RNTI in monitoring occasions for wakeup signal or early paging indication. UE check for its bit (i.e. corresponding to its group) in 'P' bits corresponding to its PO and also the common bit. If either of them is set (e.g. set to 1) UE monitor PDCCH addressed to P-RNTI in its PO. Otherwise not. In an embodiment, RAN paging indication per PO can be included in DCI of wakeup signal or early paging indication. If the UE is in RRC IDLE and RAN paging indication is included or set to 1 in DCI, UE does not monitor its PO irrespective of whether the bit corresponding to its group is set or not.

In another embodiment, wherein PDCCH is transmitted in monitoring occasion for wakeup signal or early paging indication, UE determines the PDCCH monitoring occasions for early paging indication corresponding to its PF as explained earlier. In DCI of wakeup signal or early paging indication, one bit is included for each PO of the PF. UE monitors for PDCCH addressed to RNTI in monitoring occasions for wakeup signal or early paging indication. RNTI is pre-defined or signaled by gNB for wakeup signal or early paging indication. UE receives PDCCH addressed to RNTI in monitoring occasions for wakeup signal or early paging indication. UE check for the bit corresponding to its PO. If set (e.g. set to 1) UE monitor PDCCH addressed to P-RNTI in its PO. Otherwise not. In an embodiment, RAN paging indication per PO can be included in DCI of wakeup signal or early paging indication. If the UE is in RRC IDLE and RAN paging indication is included or set to 1 in DCI, UE does not monitor its PO irrespective of whether the bit corresponding to its PO is set or not.

In an embodiment, LSBs of SFN of PF or SFN of PF and/or PO index can be included in DCI of wakeup signal or paging early indication. In the received DCI, UE can check whether the information corresponding to its PF/PO is included or not by checking received LSBs of SFN of PF or SFN of PF and/or PO index with the corresponding info of its PF/PO. In one example, DCI may include group info (bit map/group id/list of group IDs etc) and [LSB of SFN of PF/SFN of PF and/or PO index]. If LSB of SFN/SFN of UE's PF does not match or PO index does not match with corresponding info of its PF/PO, UE ignores the group info. In another example, DCI may include multiple group info (bit map/group id/list of group IDs etc) and [LSB of SFN of PF/SFN of PF and/or PO index] as shown below PF/PO Info 1: LSB of SFN of PF/SFN of PF and/or PO Index Corresponding Group info (bitmap, etc. as explained earlier)

PF/PO Info 2: LSB of SFN of PF/SFN of PF and/or PO Index

Corresponding Group info (bitmap, etc. as explained earlier)

And so on . . .

Number of PF/PO info can be indicated

In this case UE checks for its group in group info corresponding to PF/PO info which matches with UE's PF/PO info.

If there are multiple PDCCH monitoring occasions for wakeup signal or paging early indication corresponding to its PF (in one embodiment) or PO (in another embodiment), if UE has received PDCCH in one of them, it is not required to monitor the remaining PMOs Note that depending on configuration, there can be more than one PDCCH monitoring occasion per SSB in set of PDCCH monitoring occasions of wakeup signal paging early indication. UE may monitor PDCCH monitoring occasion corresponding to a suitable SSB (best SSB or SSB whose SS-RSRP is above a threshold)

Upon determining to monitor PDCCH addressed to P-RNTI in its PO, in an embodiment the Paging transmission/reception by gNB/UE in PO follows the operation in Method 1 or method 2 or method 3 or method 4 or method 5. In this case wakeup signal monitoring group/early paging indication group for monitoring wakeup signal/early paging indication and paging group for PO monitoring can be different.

Upon determining to monitor PDCCH addressed to P-RNTI in its PO, in another embodiment the Paging transmission/reception by gNB/UE in PO follows existing operation.

Handling on Demand SI Request in Connected

The timer onDemandSIB-RequestProhibitTimer (T350) is introduced to prohibit frequent transmission of SI request in connected.

According to current RRC procedure, T350 is started upon reception of SIB1 as shown in following table 3.

TABLE 3

Actions upon reception of the SIB1
Upon receiving the SIB1 the UE shall:
:
\* 1> if in RRC_CONNECTED while T311 is not running:
:
\*\* 2> if the UE has a stored valid version of a SIB, that the UE requires to operate within the cell in accordance with sub-clause 5.2.2.1:
   \*\*\* 3> use the stored version of the required SIB;
\*\* 2> else if the UE has an active BWP configured with common search space configured with the field searchSpaceOtherSystemInformation and the UE has not stored a valid version of a SIB, , of one or several required SIB(s), or according to the request from upper layers:
   \*\*\* 3> for the SI message(s) that, according to the si-SchedulingInfo, contain at least one required SIB and for which si-BroadcastStatus is set to broadcasting:
      \*\*\*\* 4> acquire the SI message(s) corresponding to the requested SIB(s);
   \*\*\* 3> if onDemandSIB-Request is set to true and timer T350 is not running:
      \*\*\*\* 4> for the SI message(s) that, according to the si-SchedulingInfo, contain at least one required SIB and for which si-BroadcastStatus is set to notBroadcasting:
         \*\*\*\*\* 5> start timer T350 with the timer value set to the onDemandSIB-RequestProhibitTimer;

TABLE 3-continued

***** 5> trigger a request to acquire the required SIB(s) as defined in sub-clause 5.2.2.3.5;
** 2> else if the UE has an active BWP not configured with common search space configured with the field searchSpaceOtherSystemInformation and the UE has not stored a valid version of a SIB, , of one or several required SIB(s), or according to the request from upper layers:
*** 3> if onDemandSIB-Request is set to true and timer T350 is not running:
**** 4> start timer T350 with the timer value set to the onDemandSIB-RequestProhibitTimer;
**** 4> trigger a request to acquire the required SIB(s);

In RRC CONNECTED state, SI request is not always triggered upon reception of SIB1. For example, UE acquires SIB1 in current modification period at time 'T' and later at time 'T+X' within the same modification period, some service is started and UE needs to acquire SIB corresponding to that service. In this case UE does not re-acquire SIB1 as it already has the SIB1 acquired in current modification period. In this case UE initiates dedicated SI request, and it neither checks timer T350 nor start this timer. This is not the correct operation.

Thus, it is proposed to define the timer checking and starting condition as following table 4 in this disclosure:

TABLE 4

Request for on demand system information in RRC_CONNECTED
The UE shall:
* 1> if the UE is in RRC_CONNECTED with an active BWP not configured with common search space with the field searchSpaceOtherSystemInformation and the UE has not stored a valid version of a SIB, , of one or several required SIB(s), or according to the request from upper layers:
** 2> for the SI message(s) that, according to the si-SchedulingInfo in the stored SIB1, contain at least one required SIB:
*** 3> if onDemandSIB-Request is set to true and if timer T350 is not running:
**** 4> initiate transmission of the DedicatedSIBRequest message;
* 1> else if the UE is in RRC_CONNECTED with an active BWP configured with common search space with the field searchSpaceOtherSystemInformation and the UE has not stored a valid version of a SIB, , of one or several required SIB(s), or according to the request from upper layers:
** 2> for the SI message(s) that, according to the si-SchedulingInfo in the stored SIB1, contain at least one required SIB and for which si-BroadcastStatus is set to broadcasting:
*** 3> acquire the SI message(s);
** 2> for the SI message(s) that, according to the si-SchedulingInfo in the stored SIB1, contain at least one required SIB and for which si-BroadcastStatus is set to notBroadcasting:
*** 3> acquire the SI message(s);
** 2> for the SI message(s) that, according to the si-SchedulingInfo in the stored SIB1, contain at least one required SIB and for which si-BroadcastStatus is set to notBroadcasting:
*** 3> if onDemandSIB-Request is set to true and if timer T350 is not running:
**** 4>start timer T350 with the timer value set to the onDemandSIB-RequestProhibitTimer;
**** 4> initiate transmission of the DedicatedSIBRequest message;
**** 4> acquire the requested SI message(s) corresponding to the requested SIB(s).

Figure 18:
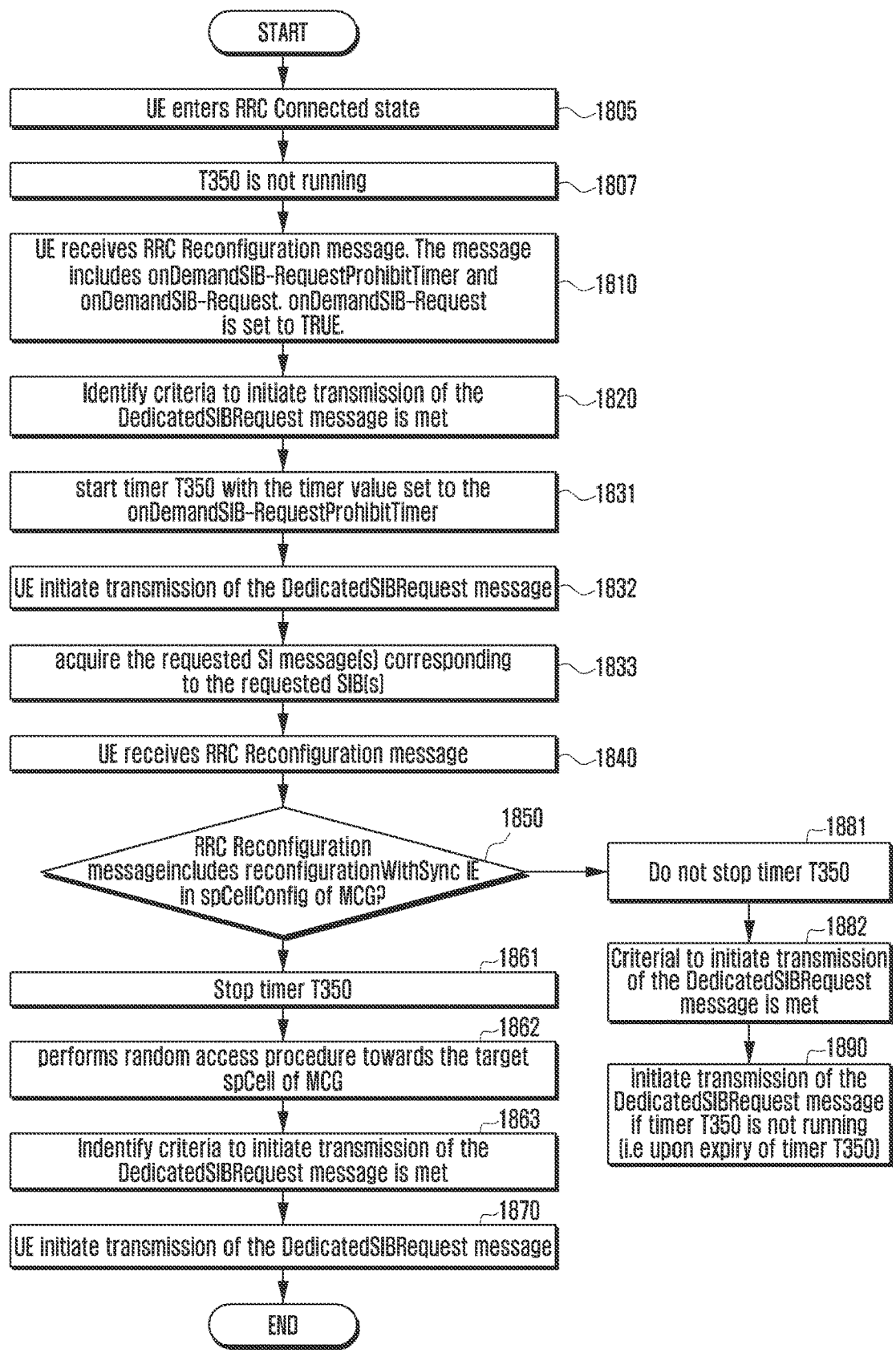
FIG. 18 illustrates an example flow of UE operation on on-demand SI request in accordance with a method of this disclosure.

Scenario:
The Timer T350 is running at the time of reception of handover command. UE needs to send SI request in target cell. In this case timer T350 which was started in source cell continues to run and hence SI request in target cell can be delayed.
Proposed UE Operation:
FIG. 18 illustrates an example flow of UE operation on on-demand SI request in accordance with a method of this disclosure. The embodiment of the flow illustrated in FIG. 18 is for illustration only. FIG. 18 does not limit the scope of this disclosure to any particular implementation of an electronic device.

At step 1805, UE enters RRC_CONNECTED state from RRC IDLE/RRC_INACTIVE.
When the UE enters the RRC_CONNECTED state, timer T350 may not be running (1807).
At step 1810, UE receives RRCReconfiguration message for reconfiguration from source SpCell. The message includes onDemandSIB-RequestProhibitTimer and onDemandSIB-Request. onDemandSIB-Request is set to TRUE.
At step 1820, UE identifies whether one of the following criteria for SI request in RRC_CONNECTED is met:
if onDemandSIB-Request is set to true; and if UE is in RRC_CONNECTED with an active BWP configured with common search space with the field searchSpaceOtherSystemInformation; and if UE does not have a stored valid version of a SIB, of one or several required SIB(s) for operation or of one or several required SIB(s) requested by upper layers and the SI message(s) that, according to the si-SchedulingInfo in the stored SIB1, contain at least one required SIB and for which si-BroadcastStatus is set to notBroadcasting:
OR
if onDemandSIB-Request is set to true; and if UE is in RRC_CONNECTED with an active BWP not configured with common search space with the field searchSpaceOtherSystemInformation; and if UE does not have a stored valid version of a SIB, of one or several required SIB(s) for operation or of one or several required SIB(s) requested by upper layers.

if timer T350 is not running:
UE start timer T350 with the timer value set to the onDemandSIB-RequestProhibitTimer (1831);
UE initiate transmission of the DedicatedSIBRequest message in accordance with 5.2.2.3.6 (1832);
acquire the requested SI message(s) corresponding to the requested SIB(s) (1833)

At step 1840, UE receives RRCReconfiguration message.
At step 1850, UE identifies whether RRCReconfiguration message includes reconfigurationWithSync IE in spCellConfig of MCG.

If the reconfiguration message includes reconfigurationWithSync IE in spCellConfig of MCG:
UE stops T350 (1861).
UE performs random access procedure towards the target spCell of MCG (1862)
Upon completion of random access procedure in target SpCell if the criteria (as in step 1820) for SI request in RRC_CONNECTED is met (1863):
UE start timer T350 with the timer value set to the onDemandSIB-RequestProhibitTimer;
UE initiate transmission of the DedicatedSIBRequest message (1870);
acquire the requested SI message(s) corresponding to the requested SIB(s)
Else (reconfiguration message does not include reconfigurationWithSync IE in spCellConfig of MCG):
UE does not stop T350 (1881).
if the criteria for SI request in RRC_CONNECTED is met (1882):
if timer T350 is not running:
UE initiate transmission of the DedicatedSIBRequest message (1890)

Alternate:
In an embodiment, the operation can be as follows:
UE receives RRCReconfiguration message.
UE identifies whether RRCReconfiguration message includes reconfigurationWithSync IE in spCellConfig of MCG.
If the reconfiguration message includes reconfigurationWithSync IE in spCellConfig of MCG:
Timer T350 if running in source cell is not stopped upon receiving RRCReconfiguration message.
UE performs random access procedure towards the target spCell of MCG
Upon completion of random access procedure in target SpCell, UE stops T350.
Upon completion of random access procedure in target SpCell if the criteria for SI request in RRC_CONNECTED is met:
UE start timer T350 with the timer value set to the onDemandSIB-RequestProhibitTimer;
UE initiate transmission of the DedicatedSIBRequest message (1870);
acquire the requested SI message(s) corresponding to the requested SIB(s)
Else (reconfiguration message does not include reconfigurationWithSync IE in spCellConfig of MCG):
UE does not stop T350.
if the criteria for SI request in RRC_CONNECTED is met:
if timer T350 is not running:
UE initiate transmission of the DedicatedSIBRequest message Criteria for Selecting RA Type for SDT
Criteria to Determine Whether to Use 4 Step RA for SDT or not UE first selects the UL carrier (NUL or SUL) as in existing system. UE selects the UL BWP configured with RA resources for SDT.

The UE performs SDT using 4 step RA if at least the following conditions are met.

Cond 1: the upper layer request resumption of an RRC connection and the resumption request is for mobile originating calls and the resume cause is mo-Data;
Cond 2: the UE supports SDT;
Cond 3: If the volume data available for transmission<=configured threshold. Threshold is signaled by gNB (e.g. in SI or RRC signaling)
Cond 4: if RSRP of downlink path loss reference is greater than or equal to a configured threshold. Threshold is signaled by gNB (e.g. in SI or RRC signaling). (This condition may be optional in an embodiment)
Cond 5: UE has a stored value of the nextHopChainingCount provided in the RRCRelease message with suspend indication during the preceding suspend procedure;
Cond 6: Data is available for transmission for only those DRBs for which SDT is enabled.
Cond 7: Criteria to use CG resources for SDT is not met
Cond 8: if the BWP is configured with only 4-step RA type Random Access Resources for SDT; or if the BWP is configured with both 2-step and 4-step RA type Random Access Resources for SDT and the RSRP of the downlink pathloss reference is not above a configured threshold Considering RSRP threshold as in condition 4 can ensure that SDT is likely to succeed and SDT procedure is avoided when UE is in poor channel condition. The RSRP threshold in condition 4 can be separately configured for 2 step RA based SDT and 4 step RA based SDT. Volume of data is the total amount of data available (in bytes) of DRBs for which SDT is enabled. The size of RLC headers and MAC headers are not included in computing amount of data available. So basically it is the number of PDCP PDUs multiplies by size of each PDCP PDU. For a DRB whether SDT can be used or not can be signaled by gNB in RRC signaling.

Criteria to Determine Whether to Use 2 Step RA for SDT or not

UE selects the UL carrier (NUL or SUL) as in as in existing system. UE selects the UL BWP configured with RA resources for SDT.

The UE performs SDT using 2 step RA if at least the following conditions are met.

Cond 1: the upper layer request resumption of an RRC connection and the resumption request is for mobile originating calls and the resume cause is mo-Data;
Cond 2: the UE supports SDT;
Cond 3: If the volume data available for transmission<=configured threshold. Threshold is signaled by gNB (e.g. in SI or RRC signaling)
Cond 4: if RSRP of downlink path loss reference is greater than or equal to a configured threshold. Threshold is signaled by gNB (e.g. in SI or RRC signaling). (This condition may be optional in an embodiment)
Cond 5: UE has a stored value of the nextHopChainingCount provided in the RRCRelease message with suspend indication during the preceding suspend procedure;
Cond 6: Data is available for transmission for only those DRBs for which SDT is enabled.

Cond 7: Criteria to use CG resources for SDT is not met

Cond 8: if the BWP is configured with only 2-step RA type Random Access Resources for SDT; or if the BWP is configured with both 2-step and 4-step RA type Random Access Resources for SDT and the RSRP of the downlink pathloss reference is above a configured threshold.

Considering RSRP threshold as in condition 4 can ensure that SDT is likely to succeed and SDT procedure is avoided when UE is in poor channel condition. The RSRP threshold in condition 4 can be separately configured for 2 step RA based SDT and 4 step RA based SDT. Volume of data is the total amount of data available (in bytes) of DRBs for which SDT is enabled. The size of RLC headers and MAC headers are not included in computing amount of data available. So basically it is the number of PDCP PDUs multiplies by size of each PDCP PDU. For a DRB whether SDT can be used or not can be signaled by gNB in RRC signaling.

Criteria to Determine Whether to Use CG Based SDT or not

The UE performs SDT using CG resources if at least the following conditions are met.

Cond 1: the upper layer request resumption of an RRC connection and the resumption request is for mobile originating calls and the resume cause is mo-Data;
  Cond 2: the UE supports SDT;
  Cond 3: If the volume data available for transmission<=configured threshold
  Cond 4: if RSRP of downlink path loss reference is greater than or equal to a configured threshold (This may be optional in an embodiment)
  Cond 5: UE has a stored value of the nextHopChainingCount provided in the RRCRelease message with suspend indication during the preceding suspend procedure;
  Cond 6: Data is available for transmission for only those DRBs for which SDT is enabled.
  Cond 7: CG resources for SDT are signaled during the preceding suspend procedure and UE is in same cell from which it has received CG resources for SDT
  Cond 8: UE has a valid TA value
  Cond 9:
    a) If SUL is supported in the cell and if the RSRP of the downlink pathloss reference is less than rsrp-ThresholdSSB-SUL and CG resources for SDT are configured for SUL; or
    b) If SUL is supported in the cell and if the RSRP of the downlink pathloss reference is not less than rsrp-ThresholdSSB-SUL and CG resources for SDT are configured for NUL; or
    c) If SUL is not supported in the cell and CG resources for SDT are configured for NUL Considering RSRP threshold as in condition 4 can ensure that SDT is likely to succeed and SDT procedure is avoided when UE is in poor channel condition.

Other Conditions:

In addition to above if a sub set of SSBs are mapped to CG occasions following condition may also need to be considered:

UE has at least one SSB with SS-RSRP above a threshold, amongst the SSBs associated with CG resources for the selected UL carrier.

Also if SUL is supported in the cell and if the RSRP of the downlink pathloss reference is not less than rsrp-ThresholdSSB-SUL, SUL can still be used in a cell as SUL typically has more UL coverage than NUL. So CG based SDT can also be used when (provided other conditions 1 to 8 are met):

If SUL is supported in the cell and if the RSRP of the downlink pathloss reference is not less than rsrp-ThresholdSSB-SUL and CG resources for SDT are not configured for NUL but configured for SUL.

RA Type Selection

1. RA procedure is initiated for small data transmission.
2. UE selects the UL carrier (NUL or SUL).
3. UE selects the UL BWP configured with RA resources for SDT. In a embodiment the BWP is Initial UL BWP.
4:

If the BWP is configured with only 2-step RA type Random Access Resources for SDT
  2 step RA is selected for SDT
  if the BWP is configured with only 4-step RA type Random Access Resources for SDT
  4 step RA is selected for SDT
  if the BWP is configured with both 2-step and 4-step RA type Random Access Resources for SDT and the RSRP of the downlink pathloss reference is above a configured threshold.
    2 step RA is selected.
  Else
    4 step RA is selected for SDT RA Type Selection (Alternate)

1. RA procedure is initiated for small data transmission.
2. UE selects the UL carrier (NUL or SUL).
3. UE selects the UL BWP configured with RA resources for SDT. In an embodiment the BWP is Initial UL BWP.

If the BWP is configured with 2-step RA type Random Access Resources for SDT and the RSRP of the downlink pathloss reference is above a configured threshold
  2 step RA is selected for SDT
Else if the BWP is configured with 4-step RA type Random Access Resources for SDT
  4 step RA is selected for SDT
Else
  do not perform SDT. Initiate normal resume procedure.

Figure 19:
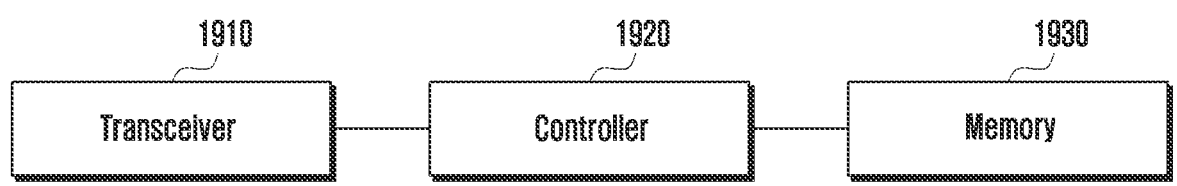
FIG. 19 is a block diagram of a terminal according to an embodiment of the disclosure.

FIG. 19 is a block diagram of a terminal according to an embodiment of the disclosure.

Referring to FIG. 19, a terminal includes a transceiver 1910, a controller 1920 and a memory 1930. The controller 1920 may refer to a circuitry, an application-specific integrated circuit (ASIC), or at least one processor. The transceiver 1910, the controller 1920 and the memory 1930 are configured to perform the operations of the UE described above. Although the transceiver 1910, the controller 1920 and the memory 1930 are shown as separate entities, they may be realized as a single entity like a single chip. Or, the transceiver 1910, the controller 1920 and the memory 1930 may be electrically connected to or coupled with each other.

The transceiver 1910 may transmit and receive signals to and from other network entities, e.g., a base station.

The controller 1920 may control the terminal to perform functions according to one of the embodiments described above. For example, the controller 1920 controls the transceiver 1910 and/or memory 1930 to perform paging related operations according to various embodiments of the disclosure.

In an embodiment, the operations of the terminal may be implemented using the memory 1930 storing corresponding program codes. Specifically, the terminal may be equipped with the memory 1930 to store program codes implementing desired operations. To perform the desired operations, the controller 1920 may read and execute the program codes stored in the memory 1930 by using at least one processor or a central processing unit (CPU).

Figure 20:
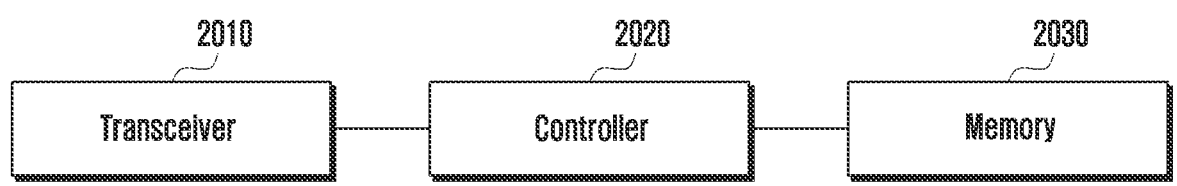
FIG. 20 is a block diagram of a base station according to an embodiment of the disclosure.

FIG. 20 is a block diagram of a base station according to an embodiment of the disclosure.

Referring to FIG. 20, a base station includes a transceiver 2010, a controller 2020 and a memory 2030. The controller 2020 may refer to a circuitry, an application-specific integrated circuit (ASIC), or at least one processor. The transceiver 2010, the controller 2020 and the memory 2030 are configured to perform the operations of the base station described above. Although the transceiver 2010, the controller 2020 and the memory 2030 are shown as separate entities, they may be realized as a single entity like a single chip. Or, the transceiver 2010, the controller 2020 and the memory 2030 may be electrically connected to or coupled with each other.

The transceiver 2010 may transmit and receive signals to and from other network entities, e.g., a terminal.

The controller 2020 may control the base station to perform functions according to one of the embodiments described above. For example, the controller 2020 controls the transceiver 2010 and/or memory 2030 to perform paging related operations according to various embodiments of the disclosure.

In an embodiment, the operations of the base station may be implemented using the memory 2030 storing corresponding program codes. Specifically, the base station may be equipped with the memory 2030 to store program codes implementing desired operations. To perform the desired operations, the controller 2020 may read and execute the program codes stored in the memory 2030 by using at least one processor or a central processing unit (CPU).

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

The invention claimed is:

1. A method performed by a terminal in a wireless communication system, the method comprising:
   receiving, from a source base station, a first radio resource control (RRC) reconfiguration message including information on a configuration for an on-demand system information block (SIB) request, wherein the information on the configuration includes a value of a prohibit timer associated with the on-demand SIB request;
   transmitting, to the source base station, a first dedicated SIB request message based on the information on the configuration for the on-demand SIB request;
   starting a timer T350 with a timer value set to the value of the prohibit timer associated with the on-demand SIB request;
   receiving, from the source base station, a second RRC reconfiguration message;
   identifying whether the second RRC reconfiguration message includes information on a reconfiguration with synchronization for a special cell of a target base station;
   stopping the timer, in case that the second RRC reconfiguration message includes the information on the reconfiguration with synchronization for the special cell of the target base station; and
   transmitting, to the target base station, a second dedicated SIB request message.

2. The method of claim 1,
   wherein the second dedicated SIB request message is transmitted, upon a random access procedure with the target base station is completed.

3. The method of claim 1, the method further comprising:
   receiving, from the target base station, at least one SIB as a response to the second dedicated SIB request message.

4. The method of claim 1, the method further comprising:
   starting the timer T350 associated with the second dedicated SIB request message.

5. A method in a wireless communication system, the method comprising:
   transmitting, by a source base station to a terminal, a first radio resource control (RRC) reconfiguration message including information on a configuration for an on-demand system information block (SIB) request, the information on the configuration for the on-demand SIB request including a value of a prohibit timer associated with the on-demand SIB request;
   receiving, by the source base station from the terminal, a first dedicated SIB request message based on the information on the configuration for the on-demand SIB request;
   starting, by the terminal, a timer T350 with a timer value set to the value of the prohibit timer associated with the on-demand SIB request;
   transmitting, by the source base station to the terminal, a second RRC reconfiguration message including information on a reconfiguration with synchronization for a special cell of a target base station;
   stopping, by the terminal, the timer T350 based on the second RRC reconfiguration message; and
   transmitting, by the terminal to the target base station, a second dedicated SIB request message.

6. A terminal in a wireless communication system, the terminal comprising:
   a transceiver; and
   a controller coupled with the transceiver and configured to:
      receive, from a source base station, a first radio resource control (RRC) reconfiguration message including information on a configuration for an on-demand system information block (SIB) request, wherein the information on the configuration includes a value of a prohibit timer associated with the on-demand SIB request,
      transmit, to the source base station, a first dedicated SIB request message based on the information on the configuration for the on-demand SIB request,
      start a timer T350 with a timer value set to the value of the prohibit timer associated with the on-demand SIB request,
      receive, from the source base station, a second RRC reconfiguration message,
      identify whether the second RRC reconfiguration message includes information on a reconfiguration with synchronization for a special cell of a target base station,
      stop the timer T350, in case that the second RRC reconfiguration message includes the information on the reconfiguration with synchronization for the special cell of the target base station, and transmit, to the target base station, a second dedicated SIB request message.

7. The terminal of claim 6, wherein the second dedicated SIB request message is transmitted, upon a random access procedure with the target base station is completed.

8. The terminal of claim 6, wherein the controller is further configured to receive, from the target base station, at least one SIB as a response to the second dedicated SIB request message.

9. The terminal of claim 6, wherein the controller is further configured to start the timer T350 associated with the second dedicated SIB request message.

10. A wireless communication system comprising a terminal and a base station, wherein the base station comprises:

a transceiver; and a controller coupled with the transceiver and configured to:

transmit, to a terminal, a first radio resource control (RRC) reconfiguration message including information on a configuration for an on-demand system information block (SIB) request, the information on the configuration for the on-demand SIB request including a value of a prohibit timer associated with the on-demand SIB request, receive, from the terminal, a first dedicated SIB request message based on the configuration for the on-demand SIB request, and transmit, to the terminal, a second RRC reconfiguration message including information on a reconfiguration with synchronization for a special cell of a target base station, wherein the terminal comprises:

a transceiver; and a controller coupled with the transceiver and configured to:

start a timer T350 with a timer value set to the value of the prohibit timer associated with the on-demand SIB request, stop the timer T350 based on the second RRC reconfiguration message, and transmit, to the target base station, a second dedicated SIB request message.

* * * * *